(12) United States Patent
Kobrin et al.

(10) Patent No.: US 8,584,703 B2
(45) Date of Patent: Nov. 19, 2013

(54) DEVICE WITH DIAPHRAGM VALVE

(75) Inventors: Boris Kobrin, Dublin, CA (US); Iuliu I. Blaga, Fremont, CA (US); William Nielsen, San Jose, CA (US); Shize D. Qi, Fremont, CA (US); Ezra Van Gelder, Palo Alto, CA (US)

(73) Assignee: IntegenX Inc., Pleasanton, CA (US)

( * ) Notice: Subject to any disclaimer, the term of this patent is extended or adjusted under 35 U.S.C. 154(b) by 346 days.

(21) Appl. No.: 12/949,623

(22) Filed: Nov. 18, 2010

(65) Prior Publication Data

US 2011/0126911 A1 Jun. 2, 2011

Related U.S. Application Data

(60) Provisional application No. 61/265,579, filed on Dec. 1, 2009, provisional application No. 61/377,635, filed on Aug. 27, 2010.

(51) Int. Cl.
*F16K 11/20* (2006.01)
(52) U.S. Cl.
USPC .............................................. 137/597; 251/61
(58) Field of Classification Search
USPC .............................................. 137/597; 251/61
See application file for complete search history.

(56) References Cited

U.S. PATENT DOCUMENTS

| | | |
|---|---|---|
| 3,190,310 A | 6/1965 | Honsinger |
| 3,352,643 A | 11/1967 | Ando et al. |
| 3,433,257 A | 3/1969 | Jensen |
| 3,568,692 A | 3/1971 | Metzger et al. |
| 3,610,274 A | 10/1971 | Levesque et al. |
| 3,801,352 A | 4/1974 | Furuuchi et al. |
| 4,029,842 A | 6/1977 | Yoshida et al. |
| 4,113,665 A | 9/1978 | Law et al. |
| 4,364,731 A | 12/1982 | Norling et al. |
| 4,558,845 A | 12/1985 | Hunkapiller |
| 4,703,913 A | 11/1987 | Hunkapiller |
| 4,847,120 A | 7/1989 | Gent |

(Continued)

FOREIGN PATENT DOCUMENTS

| | | |
|---|---|---|
| CA | 2433145 A1 | 5/2002 |
| EP | 0459241 B1 | 12/1991 |

(Continued)

OTHER PUBLICATIONS

U.S. Appl. No. 13/075,165, filed Mar. 29, 2011, Eberhart et al.

(Continued)

*Primary Examiner* — John K Fristoe, Jr.
*Assistant Examiner* — Reinaldo Sanchez-Medina

(57) ABSTRACT

This invention provides composite plastic articles and methods of making them. The articles can be fluidic or microfluidic devices having fluidic conduits and, optionally, pneumatic conduits that regulate flow in the fluidic conduits. The articles comprise a first substrate coated with a layer of a material that comprises, or onto which have been introduced, reactive groups. For example, the substrate can be a plastic coated with an oxide or a siloxane onto which hydroxyl groups have been introduced. These articles are covalently bonded with other articles comprising reactive groups on their surfaces, for example, polysiloxanes treated to have silanol groups. Certain articles have specified locations on their surfaces that are not bonded to the other piece. For example, the coating can be removed from these locations before bonding. Such locations can be useful as functional elements of various devices, such as valve seats in valves of microfluidic devices.

18 Claims, 26 Drawing Sheets

(56) References Cited

U.S. PATENT DOCUMENTS

| | | | |
|---|---|---|---|
| 4,852,851 | A * | 8/1989 | Webster .................. 251/61.1 |
| 4,963,498 | A | 10/1990 | Hillman et al. |
| 5,085,757 | A | 2/1992 | Karger et al. |
| 5,275,645 | A | 1/1994 | Ternoir et al. |
| 5,364,759 | A | 11/1994 | Caskey et al. |
| 5,376,252 | A | 12/1994 | Ekström et al. |
| 5,378,535 | A | 1/1995 | Moncur et al. |
| 5,387,505 | A | 2/1995 | Wu |
| 5,453,163 | A | 9/1995 | Yan |
| 5,482,836 | A | 1/1996 | Cantor et al. |
| 5,523,231 | A | 6/1996 | Reeve |
| 5,571,410 | A | 11/1996 | Swedberg et al. |
| 5,587,128 | A | 12/1996 | Wilding et al. |
| 5,635,358 | A | 6/1997 | Wilding et al. |
| 5,639,428 | A | 6/1997 | Cottingham |
| 5,681,946 | A | 10/1997 | Reeve |
| 5,705,628 | A | 1/1998 | Hawkins |
| 5,705,813 | A | 1/1998 | Apffel et al. |
| 5,726,026 | A | 3/1998 | Wilding et al. |
| 5,741,462 | A | 4/1998 | Nova et al. |
| 5,750,015 | A | 5/1998 | Soane et al. |
| 5,770,029 | A | 6/1998 | Nelson et al. |
| 5,775,371 | A | 7/1998 | Pan et al. |
| 5,776,748 | A | 7/1998 | Singhvi et al. |
| 5,830,662 | A | 11/1998 | Soares et al. |
| 5,842,787 | A | 12/1998 | Kopf-sill et al. |
| 5,856,174 | A | 1/1999 | Lipshutz et al. |
| 5,863,502 | A | 1/1999 | Southgate et al. |
| 5,872,010 | A | 2/1999 | Karger et al. |
| 5,885,470 | A | 3/1999 | Parce et al. |
| 5,898,071 | A | 4/1999 | Hawkins |
| 5,900,130 | A | 5/1999 | Benvegnu |
| 5,908,552 | A | 6/1999 | Zimmerman et al. |
| 5,922,591 | A | 7/1999 | Anderson et al. |
| 5,942,443 | A | 8/1999 | Parce et al. |
| 5,948,684 | A | 9/1999 | Weigl et al. |
| 5,971,158 | A | 10/1999 | Yager et al. |
| 5,994,064 | A | 11/1999 | Staub et al. |
| 6,001,229 | A | 12/1999 | Ramsey |
| 6,007,690 | A | 12/1999 | Nelson et al. |
| 6,007,775 | A | 12/1999 | Yager |
| 6,010,607 | A | 1/2000 | Ramsey |
| 6,048,100 | A | 4/2000 | Thrall et al. |
| 6,056,860 | A | 5/2000 | Amigo et al. |
| 6,073,482 | A | 6/2000 | Moles |
| 6,074,827 | A | 6/2000 | Nelson et al. |
| 6,103,199 | A | 8/2000 | Bjornson et al. |
| 6,110,343 | A | 8/2000 | Ramsey et al. |
| 6,120,184 | A | 9/2000 | Laurence et al. |
| 6,136,212 | A | 10/2000 | Mastrangelo et al. |
| 6,168,948 | B1 | 1/2001 | Anderson et al. |
| 6,176,962 | B1 | 1/2001 | Soane et al. |
| 6,190,616 | B1 | 2/2001 | Jovanovich et al. |
| 6,197,595 | B1 | 3/2001 | Anderson et al. |
| 6,207,031 | B1 | 3/2001 | Adourian et al. |
| 6,235,471 | B1 | 5/2001 | Knapp et al. |
| 6,238,538 | B1 | 5/2001 | Parce et al. |
| 6,251,343 | B1 | 6/2001 | Dubrow et al. |
| 6,280,589 | B1 | 8/2001 | Manz et al. |
| 6,319,476 | B1 | 11/2001 | Victor, Jr. et al. |
| 6,321,791 | B1 | 11/2001 | Chow |
| 6,322,683 | B1 | 11/2001 | Wolk et al. |
| 6,342,142 | B1 | 1/2002 | Ramsey |
| 6,348,318 | B1 | 2/2002 | Valkirs |
| 6,379,929 | B1 | 4/2002 | Burns et al. |
| 6,387,234 | B1 | 5/2002 | Yeung et al. |
| 6,387,707 | B1 | 5/2002 | Seul et al. |
| 6,403,338 | B1 | 6/2002 | Knapp et al. |
| 6,408,878 | B2 | 6/2002 | Unger et al. |
| 6,423,536 | B1 | 7/2002 | Jovanovich et al. |
| 6,429,025 | B1 | 8/2002 | Parce et al. |
| 6,432,191 | B2 | 8/2002 | Schutt |
| 6,432,290 | B1 | 8/2002 | Harrison et al. |
| 6,454,924 | B2 | 9/2002 | Jedrzejewski et al. |
| 6,489,112 | B1 | 12/2002 | Hadd et al. |
| 6,521,188 | B1 | 2/2003 | Webster |
| 6,524,456 | B1 | 2/2003 | Ramsey et al. |
| 6,527,003 | B1 | 3/2003 | Webster |
| 6,531,041 | B1 | 3/2003 | Cong et al. |
| 6,531,282 | B1 | 3/2003 | Dau et al. |
| 6,532,997 | B1 | 3/2003 | Bedingham et al. |
| 6,533,914 | B1 | 3/2003 | Liu |
| 6,534,262 | B1 | 3/2003 | Mckernan et al. |
| 6,537,757 | B1 | 3/2003 | Langmore et al. |
| 6,544,734 | B1 | 4/2003 | Briscoe et al. |
| 6,551,839 | B2 | 4/2003 | Jovanovich et al. |
| 6,581,441 | B1 | 6/2003 | Paul |
| 6,581,899 | B2 | 6/2003 | Williams |
| 6,605,454 | B2 | 8/2003 | Barenburg et al. |
| 6,613,525 | B2 | 9/2003 | Nelson et al. |
| 6,614,228 | B2 | 9/2003 | Hofmann et al. |
| 6,618,679 | B2 | 9/2003 | Loehrlein |
| 6,623,613 | B1 | 9/2003 | Mathies et al. |
| 6,627,446 | B1 | 9/2003 | Roach et al. |
| 6,629,820 | B2 | 10/2003 | Kornelsen |
| 6,632,619 | B1 | 10/2003 | Harrison et al. |
| 6,632,655 | B1 | 10/2003 | Mehta et al. |
| 6,663,833 | B1 | 12/2003 | Stave et al. |
| 6,685,442 | B2 | 2/2004 | Chinn et al. |
| 6,685,809 | B1 | 2/2004 | Jacobson et al. |
| 6,705,345 | B1 | 3/2004 | Bifano |
| 6,752,922 | B2 | 6/2004 | Huang et al. |
| 6,764,648 | B1 | 7/2004 | Roach et al. |
| 6,782,746 | B1 | 8/2004 | Hasselbrink et al. |
| 6,786,708 | B2 | 9/2004 | Brown et al. |
| 6,787,111 | B2 | 9/2004 | Roach et al. |
| 6,793,753 | B2 | 9/2004 | Unger et al. |
| 6,802,342 | B2 | 10/2004 | Fernandes et al. |
| 6,803,019 | B1 | 10/2004 | Bjornson et al. |
| 6,807,490 | B1 | 10/2004 | Perlin |
| 6,824,663 | B1 | 11/2004 | Boone |
| 6,829,753 | B2 | 12/2004 | Lee et al. |
| 6,833,246 | B2 | 12/2004 | Balasubramanian |
| 6,852,287 | B2 | 2/2005 | Ganesan |
| 6,870,185 | B2 | 3/2005 | Roach et al. |
| 6,885,982 | B2 | 4/2005 | Harris et al. |
| 6,899,137 | B2 | 5/2005 | Unger et al. |
| 6,923,907 | B2 | 8/2005 | Hobbs et al. |
| 6,929,030 | B2 | 8/2005 | Unger et al. |
| 6,951,632 | B2 | 10/2005 | Unger et al. |
| 6,953,058 | B2 | 10/2005 | Fernandes et al. |
| 6,960,437 | B2 | 11/2005 | Enzelberger et al. |
| 6,994,986 | B2 | 2/2006 | Swartz et al. |
| 7,005,292 | B2 | 2/2006 | Wilding et al. |
| 7,005,493 | B2 | 2/2006 | Huang et al. |
| 7,015,030 | B1 | 3/2006 | Fouillet et al. |
| 7,046,357 | B2 | 5/2006 | Weinberger et al. |
| 7,049,558 | B2 | 5/2006 | Baer et al. |
| 7,063,304 | B2 | 6/2006 | Leys |
| 7,087,380 | B2 | 8/2006 | Griffiths et al. |
| 7,097,809 | B2 | 8/2006 | Van Dam et al. |
| 7,118,910 | B2 | 10/2006 | Unger et al. |
| 7,157,228 | B2 | 1/2007 | Hashmi et al. |
| 7,169,557 | B2 | 1/2007 | Rosenblum et al. |
| 7,198,759 | B2 | 4/2007 | Bryning et al. |
| 7,211,388 | B2 | 5/2007 | Cash et al |
| 7,232,656 | B2 | 6/2007 | Balasubramanian et al. |
| 7,244,961 | B2 | 7/2007 | Jovanovich et al. |
| 7,258,774 | B2 | 8/2007 | Chou et al. |
| 7,279,146 | B2 | 10/2007 | Nassef et al. |
| 7,282,361 | B2 | 10/2007 | Hodge |
| 7,312,085 | B2 | 12/2007 | Chou et al. |
| 7,312,611 | B1 | 12/2007 | Harrison et al. |
| 7,323,305 | B2 | 1/2008 | Leamon et al. |
| 7,361,471 | B2 | 4/2008 | Gerdes et al. |
| 7,377,483 | B2 | 5/2008 | Iwabuchi et al. |
| 7,384,695 | B2 | 6/2008 | Treadway |
| 7,416,165 | B2 | 8/2008 | Ohmi et al. |
| 7,438,856 | B2 | 10/2008 | Jedrzejewski et al. |
| 7,445,926 | B2 | 11/2008 | Mathies et al. |
| 7,488,603 | B2 | 2/2009 | Gjerde et al. |
| 7,501,237 | B2 | 3/2009 | Solus et al. |
| 7,526,741 | B2 | 4/2009 | Lee et al. |
| 7,537,886 | B1 | 5/2009 | Nazarenko et al. |

(56) References Cited

U.S. PATENT DOCUMENTS

| | | | |
|---|---|---|---|
| 7,575,865 B2 | 8/2009 | Leamon et al. | |
| 7,607,641 B1 * | 10/2009 | Yuan | 251/331 |
| 7,608,160 B2 | 10/2009 | Zhou et al. | |
| 7,645,580 B2 | 1/2010 | Barber et al. | |
| 7,691,614 B2 | 4/2010 | Senapathy | |
| 7,745,207 B2 | 6/2010 | Jovanovich et al. | |
| 7,763,453 B2 | 7/2010 | Clemmens et al. | |
| 7,766,033 B2 | 8/2010 | Mathies et al. | |
| 7,799,553 B2 | 9/2010 | Mathies et al. | |
| 7,803,281 B2 | 9/2010 | Davies | |
| 7,817,273 B2 | 10/2010 | Bahatt et al. | |
| 7,832,429 B2 | 11/2010 | Young et al. | |
| 7,863,357 B2 | 1/2011 | Madabhushi et al. | |
| 7,867,713 B2 | 1/2011 | Nasarabadi | |
| 7,885,770 B2 | 2/2011 | Gill et al. | |
| 7,892,856 B2 | 2/2011 | Grate et al. | |
| 7,942,160 B2 | 5/2011 | Jeon et al. | |
| 7,943,305 B2 | 5/2011 | Korlach et al. | |
| 7,959,875 B2 | 6/2011 | Zhou et al. | |
| 7,972,561 B2 | 7/2011 | Viovy et al. | |
| 7,976,789 B2 | 7/2011 | Kenis et al. | |
| 7,976,795 B2 | 7/2011 | Zhou et al. | |
| 8,007,746 B2 | 8/2011 | Unger et al. | |
| 8,018,593 B2 | 9/2011 | Tan et al. | |
| 8,037,903 B2 | 10/2011 | Wang et al. | |
| 8,053,192 B2 | 11/2011 | Bignell et al. | |
| 8,196,603 B2 * | 6/2012 | Wilke et al. | 137/597 |
| 2001/0041357 A1 | 11/2001 | Fouillet et al. | |
| 2002/0022587 A1 | 2/2002 | Ferguson et al. | |
| 2002/0025529 A1 | 2/2002 | Quake et al. | |
| 2002/0025576 A1 | 2/2002 | Northrup et al. | |
| 2002/0047003 A1 | 4/2002 | Bedingham et al. | |
| 2002/0048536 A1 | 4/2002 | Bergh et al. | |
| 2002/0051992 A1 | 5/2002 | Bridgham et al. | |
| 2002/0058332 A1 | 5/2002 | Quake et al. | |
| 2002/0068357 A1 | 6/2002 | Mathies et al. | |
| 2002/0098097 A1 | 7/2002 | Singh | |
| 2002/0110900 A1 | 8/2002 | Jovanovich et al. | |
| 2002/0119480 A1 | 8/2002 | Weir et al. | |
| 2002/0119482 A1 | 8/2002 | Nelson et al. | |
| 2002/0127736 A1 | 9/2002 | Chou et al. | |
| 2002/0139084 A1 | 10/2002 | Tobolka | |
| 2002/0144738 A1 | 10/2002 | Unger et al. | |
| 2002/0148992 A1 | 10/2002 | Hayenga et al. | |
| 2002/0157951 A1 | 10/2002 | Foret et al. | |
| 2002/0160361 A1 | 10/2002 | Loehrlein et al. | |
| 2003/0008308 A1 | 1/2003 | Enzelberger et al. | |
| 2003/0021734 A1 | 1/2003 | Vann et al. | |
| 2003/0029724 A1 | 2/2003 | Derand et al. | |
| 2003/0070677 A1 | 4/2003 | Handique et al. | |
| 2003/0077839 A1 | 4/2003 | Takei | |
| 2003/0095897 A1 | 5/2003 | Grate et al. | |
| 2003/0217923 A1 | 11/2003 | Harrison et al. | |
| 2004/0003997 A1 | 1/2004 | Anazawa et al. | |
| 2004/0013536 A1 | 1/2004 | Hower et al. | |
| 2004/0014091 A1 | 1/2004 | Duck et al. | |
| 2004/0018611 A1 | 1/2004 | Ward et al. | |
| 2004/0021068 A1 | 2/2004 | Staats | |
| 2004/0037739 A1 | 2/2004 | Mcneely et al. | |
| 2004/0038385 A1 | 2/2004 | Langlois et al. | |
| 2004/0053290 A1 | 3/2004 | Terbrueggen et al. | |
| 2004/0063217 A1 | 4/2004 | Webster et al. | |
| 2004/0072278 A1 | 4/2004 | Chou et al. | |
| 2004/0086870 A1 | 5/2004 | Tyvoll et al. | |
| 2004/0086872 A1 | 5/2004 | Childers et al. | |
| 2004/0132170 A1 | 7/2004 | Storek et al. | |
| 2004/0151629 A1 | 8/2004 | Pease et al. | |
| 2004/0185484 A1 | 9/2004 | Costa et al. | |
| 2004/0197845 A1 | 10/2004 | Hassibi et al. | |
| 2004/0200724 A1 | 10/2004 | Fujii et al. | |
| 2004/0209354 A1 | 10/2004 | Mathies et al. | |
| 2004/0224380 A1 | 11/2004 | Chou et al. | |
| 2005/0026300 A1 | 2/2005 | Samper et al. | |
| 2005/0047967 A1 | 3/2005 | Chuang et al. | |
| 2005/0053952 A1 | 3/2005 | Hong et al. | |
| 2005/0142663 A1 | 6/2005 | Parthasarathy et al. | |
| 2005/0161326 A1 | 7/2005 | Morita et al. | |
| 2005/0161669 A1 | 7/2005 | Jovanovich et al. | |
| 2005/0224134 A1 | 10/2005 | Yin et al. | |
| 2005/0224352 A1 | 10/2005 | Harrison et al. | |
| 2005/0241941 A1 | 11/2005 | Parce et al. | |
| 2005/0255000 A1 | 11/2005 | Yamamoto et al. | |
| 2005/0255003 A1 | 11/2005 | Summersgill et al. | |
| 2005/0255007 A1 | 11/2005 | Yamada et al. | |
| 2005/0266582 A1 | 12/2005 | Modlin et al. | |
| 2005/0287572 A1 | 12/2005 | Mathies et al. | |
| 2006/0027456 A1 | 2/2006 | Harrison et al. | |
| 2006/0057209 A1 | 3/2006 | Chapman et al. | |
| 2006/0073484 A1 | 4/2006 | Mathies et al. | |
| 2006/0076068 A1 | 4/2006 | Young et al. | |
| 2006/0140051 A1 | 6/2006 | Kim et al. | |
| 2006/0163143 A1 | 7/2006 | Chirica et al. | |
| 2006/0186043 A1 | 8/2006 | Covey et al. | |
| 2006/0260941 A1 | 11/2006 | Tan et al. | |
| 2006/0263789 A1 | 11/2006 | Kincaid | |
| 2006/0266645 A1 | 11/2006 | Chen et al. | |
| 2006/0292032 A1 | 12/2006 | Hataoka et al. | |
| 2007/0015179 A1 | 1/2007 | Klapperich et al. | |
| 2007/0017812 A1 | 1/2007 | Bousse | |
| 2007/0031865 A1 | 2/2007 | Willoughby | |
| 2007/0034025 A1 | 2/2007 | Pant et al. | |
| 2007/0105163 A1 | 5/2007 | Grate et al. | |
| 2007/0113908 A1 | 5/2007 | Lee et al. | |
| 2007/0122819 A1 | 5/2007 | Wu et al. | |
| 2007/0175756 A1 | 8/2007 | Nguyen et al. | |
| 2007/0184463 A1 | 8/2007 | Molho et al. | |
| 2007/0202531 A1 | 8/2007 | Grover | |
| 2007/0237686 A1 | 10/2007 | Mathies et al. | |
| 2007/0238109 A1 | 10/2007 | Min et al. | |
| 2007/0248958 A1 | 10/2007 | Jovanovich et al. | |
| 2007/0289941 A1 | 12/2007 | Davies | |
| 2007/0297947 A1 | 12/2007 | Sommers et al. | |
| 2008/0014576 A1 | 1/2008 | Jovanovich et al. | |
| 2008/0014589 A1 | 1/2008 | Link et al. | |
| 2008/0047836 A1 | 2/2008 | Strand et al. | |
| 2008/0064610 A1 | 3/2008 | Lipovsek et al. | |
| 2008/0124723 A1 | 5/2008 | Dale et al. | |
| 2008/0138809 A1 | 6/2008 | Kapur et al. | |
| 2008/0164155 A1 | 7/2008 | Pease et al. | |
| 2008/0179255 A1 | 7/2008 | Jung et al. | |
| 2008/0179555 A1 | 7/2008 | Landers et al. | |
| 2008/0237146 A1 | 10/2008 | Harrison et al. | |
| 2008/0242560 A1 | 10/2008 | Gunderson et al. | |
| 2008/0257437 A1 | 10/2008 | Fernandes et al. | |
| 2008/0281090 A1 | 11/2008 | Lee et al. | |
| 2008/0302732 A1 | 12/2008 | Soh et al. | |
| 2008/0311585 A1 | 12/2008 | Gao et al. | |
| 2009/0004494 A1 | 1/2009 | Blenke et al. | |
| 2009/0011959 A1 | 1/2009 | Costa et al. | |
| 2009/0023603 A1 | 1/2009 | Selden et al. | |
| 2009/0035770 A1 | 2/2009 | Mathies et al. | |
| 2009/0053799 A1 | 2/2009 | Chang-yen et al. | |
| 2009/0056822 A1 | 3/2009 | Young et al. | |
| 2009/0060797 A1 | 3/2009 | Mathies et al. | |
| 2009/0084679 A1 | 4/2009 | Harrison et al. | |
| 2009/0092970 A1 | 4/2009 | Williams | |
| 2009/0134069 A1 | 5/2009 | Handique | |
| 2009/0137413 A1 | 5/2009 | Mehta et al. | |
| 2009/0148933 A1 | 6/2009 | Battrell et al. | |
| 2009/0178934 A1 | 7/2009 | Jarvius et al. | |
| 2009/0181411 A1 | 7/2009 | Battrell et al. | |
| 2009/0253181 A1 | 10/2009 | Vangbo et al. | |
| 2009/0269504 A1 | 10/2009 | Liao | |
| 2009/0286327 A1 | 11/2009 | Cho et al. | |
| 2009/0311804 A1 | 12/2009 | Mcbrady et al. | |
| 2009/0314972 A1 | 12/2009 | Mcavoy et al. | |
| 2009/0325277 A1 | 12/2009 | Shigeura et al. | |
| 2010/0068723 A1 | 3/2010 | Jovanovich et al. | |
| 2010/0111770 A1 | 5/2010 | Hwang et al. | |
| 2010/0129810 A1 | 5/2010 | Greiner et al. | |
| 2010/0165784 A1 | 7/2010 | Jovanovich et al. | |
| 2010/0172898 A1 | 7/2010 | Doyle et al. | |
| 2010/0173398 A1 | 7/2010 | Peterman | |
| 2010/0197507 A1 | 8/2010 | Rothberg et al. | |

(56) References Cited

U.S. PATENT DOCUMENTS

| | | |
|---|---|---|
| 2010/0210008 A1 | 8/2010 | Strand et al. |
| 2010/0221726 A1 | 9/2010 | Zenhausern et al. |
| 2010/0224255 A1 | 9/2010 | Mathies et al. |
| 2010/0228513 A1 | 9/2010 | Roth et al. |
| 2010/0233696 A1 | 9/2010 | Joseph et al. |
| 2010/0243916 A1 | 9/2010 | Maurer et al. |
| 2010/0252123 A1 | 10/2010 | Mathies et al. |
| 2010/0266432 A1 | 10/2010 | Pirk et al. |
| 2010/0285578 A1 | 11/2010 | Selden et al. |
| 2010/0285606 A1 | 11/2010 | Philips et al. |
| 2010/0285975 A1 | 11/2010 | Mathies et al. |
| 2010/0291666 A1 | 11/2010 | Collier et al. |
| 2010/0303687 A1* | 12/2010 | Blaga et al. .............. 422/504 |
| 2010/0304355 A1 | 12/2010 | Shuler et al. |
| 2010/0326826 A1 | 12/2010 | Harrison et al. |
| 2011/0003301 A1 | 1/2011 | Raymond et al. |
| 2011/0005932 A1 | 1/2011 | Jovanovich et al. |
| 2011/0008813 A1 | 1/2011 | Dilleen et al. |
| 2011/0020920 A1 | 1/2011 | Mathies et al. |
| 2011/0027913 A1 | 2/2011 | Bau et al. |
| 2011/0038758 A1 | 2/2011 | Akaba et al. |
| 2011/0045505 A1 | 2/2011 | Warthoe et al. |
| 2011/0053784 A1 | 3/2011 | Unger et al. |
| 2011/0070578 A1 | 3/2011 | Bell et al. |
| 2011/0124049 A1 | 5/2011 | Li et al. |
| 2011/0126910 A1 | 6/2011 | May |
| 2011/0127222 A1 | 6/2011 | Chang-yen et al. |
| 2011/0136179 A1 | 6/2011 | Bin/lee et al. |
| 2011/0137018 A1 | 6/2011 | Chang-yen et al. |
| 2011/0171086 A1 | 7/2011 | Prins et al. |
| 2011/0172403 A1 | 7/2011 | Harrold et al. |
| 2011/0189678 A1 | 8/2011 | Mcbride et al. |
| 2011/0206576 A1 | 8/2011 | Woudenberg et al. |
| 2011/0212440 A1 | 9/2011 | Viovy et al. |
| 2011/0212446 A1 | 9/2011 | Wang et al. |
| 2011/0223605 A1 | 9/2011 | Bienvenue et al. |

FOREIGN PATENT DOCUMENTS

| | | |
|---|---|---|
| EP | 0637999 A1 | 2/1995 |
| EP | 0527905 B1 | 11/1995 |
| EP | 1065378 B1 | 4/2002 |
| EP | 1411340 A2 | 4/2004 |
| EP | 1411340 A3 | 5/2004 |
| EP | 1345697 B1 | 6/2007 |
| EP | 1658890 B1 | 5/2008 |
| EP | 1345551 B1 | 4/2009 |
| EP | 2345739 A2 | 7/2011 |
| JP | 2007-506430 A | 7/1995 |
| JP | 408327594 A | 12/1996 |
| JP | 2001-500966 A | 1/2001 |
| JP | 2001-521818 A | 11/2001 |
| JP | 2002-370200 A | 12/2002 |
| JP | 2003-536058 A | 12/2003 |
| JP | 2004-025159 A | 1/2004 |
| JP | 2004-108285 A | 4/2004 |
| JP | 2004-180594 A | 7/2004 |
| JP | 2005-323519 A | 11/2005 |
| JP | 2005-337415 | 12/2005 |
| JP | 2005-345463 A | 12/2005 |
| JP | 2007-155491 A | 6/2007 |
| JP | 2008-513022 A | 5/2008 |
| WO | WO 93/22053 A1 | 4/1993 |
| WO | WO 96/04547 A1 | 2/1996 |
| WO | WO 96/14934 A1 | 5/1996 |
| WO | WO 98/10277 A1 | 3/1998 |
| WO | WO 98/52691 A1 | 11/1998 |
| WO | WO 98/53300 A2 | 11/1998 |
| WO | WO 98/53300 A3 | 2/1999 |
| WO | WO 99/22868 A1 | 5/1999 |
| WO | WO 99/36766 A1 | 7/1999 |
| WO | WO 99/40174 A1 | 8/1999 |
| WO | WO 00/40712 A1 | 7/2000 |
| WO | WO 00/60362 A1 | 10/2000 |
| WO | WO 00/61198 A1 | 10/2000 |
| WO | WO 01/32930 A1 | 5/2001 |
| WO | WO 01/38865 A1 | 5/2001 |
| WO | WO 01/85341 A1 | 11/2001 |
| WO | WO 02/41995 A1 | 5/2002 |
| WO | WO 02/43615 A2 | 6/2002 |
| WO | WO 02/43864 A2 | 6/2002 |
| WO | WO 02/043864 A3 | 8/2002 |
| WO | WO 02/43615 A3 | 3/2003 |
| WO | WO 03/044528 A2 | 5/2003 |
| WO | WO 03/085379 A2 | 10/2003 |
| WO | WO 03/085379 A3 | 12/2003 |
| WO | WO 2004/038363 A2 | 5/2004 |
| WO | WO 03/044528 A3 | 6/2004 |
| WO | WO 2004/061085 A2 | 7/2004 |
| WO | WO 2004/061085 A3 | 10/2004 |
| WO | WO 2004/098757 A2 | 11/2004 |
| WO | WO 2004/038363 A3 | 12/2004 |
| WO | WO 2005/075081 A1 | 8/2005 |
| WO | WO 2005/091820 A2 | 10/2005 |
| WO | WO 2005/108620 A2 | 11/2005 |
| WO | WO 2005/118867 A2 | 12/2005 |
| WO | WO 2005/121308 A1 | 12/2005 |
| WO | WO 2006/032044 A2 | 3/2006 |
| WO | WO 2005/108620 A3 | 4/2006 |
| WO | WO 2004/098757 A3 | 5/2006 |
| WO | WO 2005/091820 A3 | 10/2006 |
| WO | WO 2006/032044 A3 | 1/2007 |
| WO | WO 2007/002579 A2 | 1/2007 |
| WO | WO 2007/064635 A1 | 6/2007 |
| WO | WO 2007/082480 A1 | 7/2007 |
| WO | WO 2007/109375 A2 | 9/2007 |
| WO | WO 2005/118867 A3 | 12/2007 |
| WO | WO 2008/012104 A2 | 1/2008 |
| WO | WO 2008/024319 A2 | 2/2008 |
| WO | WO 2008/024319 A3 | 4/2008 |
| WO | WO 2008/039875 A1 | 4/2008 |
| WO | WO 2008/012104 A3 | 5/2008 |
| WO | WO 2008/115626 A2 | 9/2008 |
| WO | WO 2007/109375 A3 | 10/2008 |
| WO | WO 2008/115626 A3 | 11/2008 |
| WO | WO 2009/008236 A1 | 1/2009 |
| WO | WO 2009/015296 A1 | 1/2009 |
| WO | WO 2007/002579 A3 | 9/2009 |
| WO | WO 2009/108260 A2 | 9/2009 |
| WO | WO 2009/129415 A1 | 10/2009 |
| WO | WO 2009/108260 A3 | 12/2009 |
| WO | WO 2010/041174 A1 | 4/2010 |
| WO | WO 2010/041231 A2 | 4/2010 |
| WO | WO 2010/042784 A2 | 4/2010 |
| WO | WO 2010/042784 A3 | 7/2010 |
| WO | WO 2010/041231 A3 | 9/2010 |
| WO | WO 2010/109392 A1 | 9/2010 |
| WO | WO 2010/130762 A2 | 11/2010 |
| WO | WO 2010/141921 A1 | 12/2010 |
| WO | WO 2011/003941 A1 | 1/2011 |
| WO | WO 2010/130762 A3 | 2/2011 |
| WO | WO 2011/012621 A1 | 2/2011 |
| WO | WO 2011/034621 A2 | 3/2011 |
| WO | WO 2011/084703 A2 | 7/2011 |
| WO | WO 2011/034621 A3 | 11/2011 |

OTHER PUBLICATIONS

U.S. Appl. No. 13/113,968, filed May 23, 2011, Majlof et al.

Armani, et al. Re-configurable fluid circuits by PDMS elastomer micromachining. Proceedings of IEEE Micro Electro Mechanical Systems: MEMS. 1999; 222-227.

European search report and search opinion dated Jun. 6, 2011 for Application No. 10011511.2.

International search report and written opinion dated Jun. 9, 2011 for PCT Application No. US2011/30973.

Notice of allowance dated Jun. 9, 2011 for U.S. Appl. No. 12/831,949.

U.S. Appl. No. 13/287,398, filed Nov. 2, 2011, Jovanovich et al.

Chinese office action dated Jul. 8, 2011 for CN 200580035911.7. (In Chinese with English translation).

International search report and written opinion dated Jan. 5, 2012 for PCT Application No. US2011/048527.

(56) References Cited

OTHER PUBLICATIONS

International search report and written opinion dated Oct. 26, 2011 for PCT Application No. US11/38180.
International written opinion dated Oct. 6, 2010 for PCT Application No. US10/37545.
International written opinion report dated Jul. 30, 2010 for PCT Application No. US2010/36464.
Japanese office action dated May 27, 2011 for Application No. 2007-532553 (in Japanese with English translation).
Japanese office action dated Jul. 28, 2011 for Application No. 2008-553535 (in Japanese with English translation).
U.S. Appl. No. 12/026,510, filed Feb. 5, 2008, Jovanovich et al.
U.S. Appl. No. 12/526,015, filed Nov. 3, 2010, Jovanovich et al.
U.S. Appl. No. 12/815,685, filed Jun. 15, 2010, Jovanovich et al.
U.S. Appl. No. 12/820,390, filed Jun. 22, 2010, Harrison et al.
U.S. Appl. No. 12/845,650, filed Jul. 28, 2010, Jovanovich et al.
U.S. Appl. No. 12/852,370, filed Aug. 6, 2010, Harrison et al.
Amendment and Request for Correction of Inventorship mailed Jan. 10, 2008 in U.S. Appl. No. 10/750,533.
Anderson, et al. A miniature integrated device for automated multistep genetic assays. Nucleic Acids Research. 2000;28:e60.
Bings, et al. Microfluidic Devices Connected to Fused-Silica Capillaries with Minimal Dead Dead Volume. Analytical Chemistry. 1999;71(15):3292-3296.
Blazej, et al. Microfabricated bioprocessor for integrated nanoliter-scale Sanger DNA sequencing. Proc. Natl. Acad. Sci. USA 2006;103:7240-7245.
Blazej, et al. Polymorphism Ratio Sequencing: A New Approach for Single Nucleotide Polymorphism Discovery and Genotyping. Genome Research. 2003;13:287-293.
Brenner, et al. Gene expression analysis by massively parallel signature sequencing (MPSS) on microbead arrays. Nature Biotechnology. 2000;18(6):630-634.
Buchholz, et al. The use of light scattering for precise characterization of polymers for DNA sequencing by capillary electrophoresis. Electrophoresis. 2001;22:4118-4128.
Caplus abstract of Krohkin et al. Modified silica as a stationary phase for ion chromatography. Journal of Chromatography A. 1995;706:93-8.
Chan, et al. Microfabricated Polymer Devices for Automated Sample Delivery of Peptides for Analysis by Electrospray Ionization Tandem Mass Spectrometry. Analytical Chemistry. 1999;71(20):4437-4444.
Chiem, et al. Microchip systems for immunoassay: an integrated immunoreactor with electrophoretic separation for serum theophylline determination. Clinical Chemistry.1998;44(3):591-598.
Chiem, et al. Room temperature bonding of micromachined glass devices for capillary electrophoresis. Sensors and Actuators. 2000;B63(3):147-152.
Coleman, et al. A sequential injection microfluidic mixing strategy. Microfluidics and Nanofluidics. 2005;319-327.
Curcio, et al. Continuous Segmented-Flow Polymerase Chain Reaction for High-Throughput Miniaturized DNA Amplification. Analytical Chemistry. 2003;75(1):1-7.
Datasheet Cycle Sequencing, Retrieved from the internet, URL:http// answers.com/topic/cycle sequencing. Printed Sep. 3, 2010, pp. 1-2.
Diehl, et al. BEAMing: single-molecule PCR on microparticles in water-in-oil emulsions. Nature Methods. 2006;3(7):551-9.
Doherty, et al. Sparsely Cross-linked "Nanogel" Matrices as Fluid, Mechanically Stablized Polymer Networks for High-Throughput Microchannel DNA Sequencing. Analytical Chemistry. 2004;76:5249-5256.
Doherty, et al. Sparsely cross-linked "nanogels" for microchannel DNA sequencing. Electrophoresis. 2003;24(24):4170-4180.
Dorfman, et al. Contamination-Free Continuous Flow Microfluidic Polymerase Chain Reaction for Quantitative and Clinical Applications. Analytical Chemistry. 2005;77(11):3700-3704.
Doyle, et al. Self-Assembled Magnetic Matrices for DNA Separation Chips. Science. 2000;295:2237.
Dressman, et al. Transforming single DNA molecules into fluorescent magnetic particles for detection and enumeration of genetic variations. Proc Natl Acad Sci USA. 2003;100(15):8817-8822.
Emrich, et al. Microfabricated 384-Lane Capillary Array Electrophoresis Bioanalyzer for Ultrahigh-Throughput Genetic Analysis. Analytical Chemistry. 2002;74(19):5076-5083.
Ericson, et al. Electroosmosis- and Pressure-Driven Chromatography in Chips Using Continuous Beds. Analytical Chemistry. 2000;72(1):81-87.
European search report dated Dec. 18, 2009 for Application No. 03808583.3.
European search report dated Sep. 1, 2010 for Application No. 5804847.1.
Ewing, et al. Base-Calling of Automated Sequencer Traces Using Phred. I. Accuracy Assessment. Genome Research. 1998;8:175-185.
Ewing, et al. Base-Calling of Automated Sequencer Traces Using Phred. II. Error probabilities. Genome Research. 1998;8:186-194.
Figeys, et al. A Microfabricated Device for Rapid Protein Identification by Microelectrospray Ion Trap Mass Spectrometry. Analytical Chemistry. 1997;69(16):3153-3160.
Figeys, et al. An Integrated Microfluidics-Tandem Mass Spectrometry System for Automated Protein Analysis. Analytical Chemistry. 1998;70(18):3728-3734.
Figeys, et al. Microfabricated Device Coupled with an Electrospray Ionization Quadrupole Time-of-Flight Mass Spectrometer: Protein Identifications Based on Enhanced-Resolution Mass Spectrometry and Tandem Mass Spectrometry Data. Rapid Communications In Mass Spectrometry. 1998;12:1435-1444.
Figeys, et al. Nanoflow Solvent Gradient Delivery from a Microfabricated Device for Protein Identifications by Electrospray Ionization Mass Spectrometry. Analytical Chemistry. 1998;70(18):3721-3727.
Francis, et al. Flow analysis based on a pulsed flow of solution: theory, instrumentation and applications. Talanta. 2002;58(6):1029-1042.
Ghadessy, et al. Directed evolution of polymerase function by compartmentalized self-replication. Proc Natl Acad Sci USA. 2001;98:4552-4557.
Giddings, et al. A software system for data analysis in automated DNA sequencing. Genome Research. 1998;8:644-665.
Goll, et al. Microvalves with bistable buckled polymer diaphragms. Journal of Micromechanics and Microengineering. 1996;6:77-79.
Grover, et al. An integrated microfluidic processor for single nucleotide polymorphism-based DNA computing. Lab on a Chip. 2005;5(10):1033-1040.
Grover, et al. Development and multiplexed control of latching pneumatic valves using microfluidic logical structures. Lab on a chip. 2006;6:623-631.
Grover, et al. Monolithic membrane valves and diaphragm pumps for practical large-scale integration into glass microfluidic devices. Sensors and Actuators. 2003;B89:315-323.
Grover, et al. Practical Valves and Pumps for Large-Scale Integration into Microfludic Analysis Devices. Micro Total Analysis Systems. 2002;1:136-138.
Hansen, et al. A robust and scalable microfluidic metering method that allows protein crystal growth by free interface diffusion. Proc Natl Acad Sci USA. 2002;99(26):16531-16536.
Harrison, et al. Micromachining a Miniaturized Capillary Electrophoresis-Based Chemical Analysis System on a Chip. Science. 1993;261(5123):895-897.
Hayes, et al. EDGE: A Centralized Resource for the Comparison, Analysis, and Distribution of Toxicogenomic Information. Molecular Pharmacology. 2005;67(4):1360-1368.
Hultman, et al. Bidirectional Solid-Phase Sequencing of In Vitro-Amplified Plasmid DNA. BioTechniques. 1991;10(1):84-93.
International Preliminary Report for corresponding PCT Application No. PCT/CA2000/01421 dated Feb. 14, 2002.
International Preliminary Report for corresponding PCT Application No. PCT/US2005/018678 dated Nov. 13, 2007.
International Preliminary Report for corresponding PCT Application No. PCT/US2005/033347 dated Mar. 20, 2007.
International Preliminary Report for corresponding PCT Application No. PCT/US2007/007381 dated Sep. 23, 2008.

(56) References Cited

OTHER PUBLICATIONS

International Preliminary Report for corresponding PCT Application No. PCT/US2007/02721 dated Aug. 5, 2008.
International Preliminary Report for corresponding PCT Application No. PCT/US2007/061573 dated Aug. 26, 2008.
International search report dated Oct. 6, 2010 for PCT Application No. US10/37545.
International search report dated Apr. 5, 2001 for PCT Application No. CA2000/01421.
International search report dated May 14, 2010 for PCT Application No. US2009/06640.
International search report dated Jul. 11, 2008 for PCT Application No. US07/61573.
International search report dated Jul. 30, 2010 for PCT Application No. US2010/36464.
International search report dated Aug. 18, 2009 for PCT Application No. US09/00419.
International search report dated Aug. 23. 2006 for PCT Application No. US2005/033347.
International search report dated Aug. 26, 2004 PCT Application No. US2003/41466.
International search report dated Sep. 25, 2007 for PCT Application No. US2007/02721.
International Search Report for PCT/US2005/033347.
Jacobson, et al. Electrokinetic Focusing in Microfabricated Channel Structures. Anal. Chem., 1997, 69 (16), pp. 3212-3217.
Japanese Office Action dated Dec. 21, 2010 for Application No. JP2001-540363 (in Japanese with English translation).
Japanese Office Action dated Apr. 27, 2010 for Application No. JP2001-540363 (in Japanese with English translation).
Ju, et al. Fluorescence energy transfer dye-labeled primers for DNA sequencing and analysis. Proc. Natl. Acad. Sci. USA. 1995;92:4347-4351.
Kan, et al. A novel thermogelling matrix for microchannel DNA sequencing based on poly-N-alkoxyalkylaclylamide copolymers. Electrophoresis. 2003;24(24):4161-4169.
Koh, et al. Integrating Polymerase Chain Reaction, Valving, and Electrophoresis in a Plastic Device for Bacterial Detection. Analytical Chemistry. 2003;75(17):4591-4598.
Kopp, et al. Chemical Amplification Continuous-Flow PCR on a Chip. Science. 1998;280:1046-1048.
Lagally, et al. Fully integrated PCR-capillary electrophoresis microsystem for DNA analysis. Lab on a Chip. 2001;1(2):102-107.
Lagally, et al. Integrated Portable Genetic Analysis Microsystem for Pathogen/Infectious Disease Detection. Analytical Chemistry. 2004;76:3162-3170.
Lagally, et al. Monolithic integrated microfluidic DNA amplification and capillary electrophoresis analysis system. Sensors and Actuators. 2000;B63(3):138-146.
Lagally, et al. Single-Molecule DNA Amplification and Analysis in an Integrated Microfluidic Device. Analytical Chemistry. 2001;73(3): 565-570.
Lazar, et al. Subattomole-Sensitivity Microchip Nanoelectrospray Source with Time-of-Flight Mass Spectrometry Detection. Analytical Chemistry. 1999;71(17):3627-3631.
Li, et al. Integration of Microfabricated Devices to Capillary Electrophoresis-Electrospray Mass Spectrometry Using a Low Dead Volume Connection: Application to Rapid Analyses of Proteolytic Digests. Analytical Chemistry. 1999;71(15):3036-3045.
Li, et al. Rapid and sensitive separation of trace level protein digests using microfabricated devices coupled to a quadrupole—time-of-flight mass spectrometer. Electrophoresis. 2000;21:198-210.
Li, et al. Separation and Identification of Peptides from Gel-Isolated Membrane Proteins Using a Microfabricated Device for Combined Capillary Electrophoresis/Nanoelectrospray Mass Spectrometry. Analytical Chemistry. 2000;72(3):599-609.
Licklider, et al. A Micromachined Chip-Based Electrospray Source for Mass Spectrometry. Analytical Chemistry. 2000;72(2):367-375.
Lisec, et al. A bistable pneumatic microswitch for driving fluidic components. Sensors and Actuators. 1996;A54:746-749.
Liu, et al. Automated parallel DNA sequencing on multiple channel microchips. Proc. Natl. Acad. Sci. USA. 2000;97(10):5369-5374.
Liu, et al. Optimization of High-Speed DNA Sequencing on Microfabricated Capillary Electrophoresis Channels. Analytical Chemistry. 1999;71:566-573.
Margulies, et al. Genome sequencing in microfabricated high-density picolitre reactors. Nature. 2005;437(7057):376-80. (Abstact only).
Melin, et al. A Passive 2-Dimensional Liquid Sample Micromixer. 7th International Conference on Miniaturized Chemical and Biochemical Analysis Systems. 2003;167-170.
MillGat pump user manual, version 2.12, published 2005, pp. 1-28.
Mitra, et al. Digital genotyping and haplotyping with polymerase colonies. Proc Natl Acad Sci USA. 2003.100(10):15926-5931.
Norris, et al. Fully-integrated, multiplexed STR-based human identification using a single microfluidic chip and automated instrument. Available at http://www.promega.com/geneticidproc/ussymp20proc/oralpresentations/landersbienvenue.pdf. Accessed Jun. 2, 2010.
Obeid, et al. Microfabricated Device for DNA and RNA Amplification by Continuous-Flow Polymerase Chain Reaction and Reverse Transcription-Polymerase Chain Reaction with Cycle Number Selection. Analytical Chemistry. 2003;75(2): 288-295.
Ocvirk, et al. High Performance Liquid Chromatography Partially Integrated onto a Silicon Chip. Analytical Methods and Instrumentation. 1995;2:74-82.
Ocvirk, et al. Optimization of confocal epifluorescence microscopy for microchip-based miniaturized total analysis systems. The Analyst. 1998;123:1429-1434.
Office Action Final dated Feb. 19, 2008 issued in U.S. Appl. No. 10/540,658.
Office Action Final dated Feb. 6, 2008 issued in U.S. Appl. No. 11/139,018.
Office Action mailed Apr. 27, 2007 in U.S. Appl. No. 11/139,018, filed May 25, 2005.
Office Action mailed Jul. 2, 2007 in U.S. Appl. No. 10/540,658, filed Jun. 23, 2005.
Office Action mailed Jul. 12, 2007 in U.S. Appl. No. 10/750,533, filed Dec. 29, 2003.
Ohori, et al. Partly disposable three-way mirovalve for a medical micro total analysis system (muTAS). Sensors and Actuators. 1998;A64(1): 57-62.
Oleschuk, et al. Trapping of Bead-Based Reagents within Microfluidic Systems: On-Chip Solid-Phase Extraction and Electrochromatography. Analytical Chemistry. 2000;72:585-590.
Olsen, et al. Immobilization of DNA Hydrogel Plugs In Microfluidic Channels. Analytical Chemistry. 2002;74:1436-1441.
Paegel, et al. High-throughput DNA sequencing with a 96-lane capillary array electrophoresis bioprocessor. Proc Natl Acad Sci USA. 2002;99:574-579.
Paegel, et al. Microchip Bioprocessor for Integrated Nanovolume Sample Purification and DNA Sequencing. Analytical Chemistry. 2002;74(19):5092-5098.
Paegel, et al. Microfluidic devices for DNA sequencing: sample preparation and electrophoretic analysis. Current Opinion in Biotechnology. 2003;14(1):42-50.
Paegel, et al. Turn Geometry for Minimizing Band Broadening in Microfabricated Capillary Electrophoresis Channels. Analytical Chemistry. 2000;72:3030-3037.
PCT Notification of Transmittal of the International Search Report and The Written Opinion of the International Searching Authority, or the Declaration, mailed Jun. 17, 2008, Application No. PCT/US2007/082568 (UCALP067WO).
Peterson, et al. Enzymatic Microreactor-on-a-Chip: Protein Mapping Using Trypsin Immobilized on Porous Polymer Monoliths Molded in Channels of Microfluidic Devices. Analytical Chemistry. 2002;74:4081-4088.
Ramsey, et al. Generating Electrospray from Microchip Devices Using Electroosmotic Pumping. Analytical Chemistry. 1997;69(6):1174-1178.
Rohr, et al. Porous polymer monoliths: Simple and efficient mixers prepared by direct polymerization in the channels of microfluidic chips. Electrophoresis. 2001;22:3959-3967.

(56) References Cited

OTHER PUBLICATIONS

Rye, et al. High-sensitivity two-color detection of double-stranded DNA with a confocal fluorescence gel scanner using ethidium homodimer and thiazole orange. Nucleic Acids Research. 1991;19(2):327-333.
Scherer, et al. High-Pressure Gel Loader for Capillary Array Electrophoresis Microchannel Plates. Biotechniques. 2001;31(5):1150-1154.
Schomburg, et al. Design Optimization of Bistable Microdiaphragm Valves. Sensors and Actuators. 1998;A64:259-264.
Seifar, et al. Capillary electrochromatography with 1.8-mum ODS-modified porous silica particles. Journal of Chromatography. 1998; A808:71-77.
Simpson, et al. High-throughput genetic analysis using microfabricated 96-sample capillary array electrophoresis microplates. Proc Natl Acad Sci USA. 1998;95:2256-2261.
Simpson, et al. Microfabrication Technology for the Production of Capillary Array Electrophoresis Chips. Biomedical Microdevices. 1998;1:7-26.
Soper, et al. Sanger DNA Sequencing Reactions Performed in a Solid-Phase Nanoreactor Directly Coupled to Capillary Gel Electrophoresis. Analytical Chemistry. 1998;70:4036-4043.
Spiering, et al. Novel microstructures and technologies applied in chemical analysis techniques. 1997 International Conference on Solid-State Sensors and Actuators. 1997;1:511-514.
Takao, et al. A Pneumatically Actuated Full In-Channel Microvalve With MOSFET-Like Function in Fluid Channel Networks. Journal of Microelectromechanical Systems. 2002;11(5):421-426.
Takao, et al. Microfluidic Integrated Circuits for Signal Processing Using Analogous Relationship Betweeen Pneumatic Microvalve and MOSFET. Journal of Microelectromechanical Systems. 2003;12(4):497-505.
Thomas, et al. Application of Genomics to Toxicology Research. Environmental Health Perspectives. 2002;110(6):919-923.
Thorsen, et al. Microfluidic Large-Scale Integration. Science. 2002;298(5593):580-584.
Tice, et al. Formation of Droplets and Mixing in Multiphase Microfluidics at Low Values of the Reynolds and the Capillary Numbers. Langmuir. 2003;19:9127-9133.
Unger, et al. Monolithic Microfabricated Valves and Pumps by Multilayer Soft Lithography. Science. 2000;288:113-116.
Van Der Moolen, et al. A Micromachined Injection Device for CZE: Application to Correlation CZE. Analytical Chemistry. 1997;69(20):4220-4225.
Van Der Moolen, et al. Correlation Capillary Zone Electrophoresis, a Novel Technique to Decrease Detection Limits. Chromatographia. 1995;40(7/8):368-374.
Vazquez, et al. Electrophoretic Injection within Microdevices. Analytical Chemistry. 2002;74:1952-1961.
Veenstra, et al. The design of an in-plane compliance structure for microfluidical systems. Sensors and Actuators. 2002;B81:377-383.
Waller, et al. Quantitative Immunocapture PCR Assay for Detection of *Campylobacter jejuni* in Foods. Applied Environmental Microbiology. 2000; 66(9):4115-4118.
Weimer, et al. Solid-Phase Capture of Proteins, Spores, and Bacteria. Applied Environmental Microbiology. 2001;67(3):1300-1307.
Wen, et al. Microfabricated isoelectric focusing device for direct electrospray ionization-mass spectrometry. Electrophoresis. 2000;21:191-197.
Wikipedia brochure for defining stocahstic process. Sep. 2, 2009.
Williams, et al. Amplification of complex gene libraries by emulsion PCR. Nature Methods. 2006;3(7):545-50.
Woolley, et al. Functional Integration of PCR Amplification and Capillary Electrophoresis in a Microfabricated DNA Analysis Device. Analytical Chemistry. 1996;68(23):4081-4086.
Wright, et al. Behavior and Use of Nonaqueous Media without Supporting Electrolyte in Capillary Electrophoresis and Capillary Electrochromatography. Analytical Chemistry. 1997;69(16):3251-3259.
Xiang, et al. An Integrated Microfabricated Device for Dual Microdialysis and On-Line ESI-Ion Trap Mass Spectrometry for Analysis of Complex Biological Samples. Analytical Chemistry. 1999;71(8):1485-1490.
Xue, et al. Integrated Multichannel Microchip Electrospray Ionization Mass Spectrometry: Analysis of Peptides from On-Chip Tryptic Digestion of Melittin. Rapid Communications in Mass Spectrometry. 1997;11:1253-1256.
Xue, et al. Multichannel Microchip Electrospray Mass Spectrometry. Analytical Chemistry. 1997;69(3):426-430.
Yang, et al. A MEMS thermopneumatic silicone rubber membrane valve. Sensors and Actuators. 1998;A64(1):101-108.
Yu, et al. Preparation of Monolithic Polymers with Controlled Porous Properties for Microfluidic Chip Applications Using Photoinitiated Free Radial Polymerization. Journal of Polymer Science. 2002;40:755-769.
Yu, et al. Towards stationary phases for chromatography on a microchip: Molded porous polymer monoliths prepared in capillaries by photoinitiated in situ polymerization as separation media for electrochromatography. Electrophoresis. 2000;21:120-127.
Zhang, et al. A Microdevice with Integrated Liquid Junction for Facile Peptide and Protein Analysis by Capillary Electrophoresis/ Electrospray Mass Spectrometry. Analytical Chemistry. 2000;72(5):1015-1022.
Zhang, et al. Microfabricated Devices for Capillary Electrophoresis-Electrospray Mass Spectrometry. Analytical Chemistry. 1999;71(15):3258-3264.
International search report and written opinion dated Mar. 24, 2011 for PCT Application No. US2010/058227.
International search report and written opinion dated Sep. 1, 2010 for PCT Application No. US2010/040490.
U.S. Appl. No. 90/011,453, filed Jan. 21, 2011, Mathias et al.
European search report and search opinion dated Aug. 17, 2011 for Application No. 08799648.4.
Notice of allowance dated Sep. 8, 2011 for U.S. Appl. No. 12/820,390.
U.S. Appl. No. 13/202,877, filed Aug. 23, 2011, Vangbo et al.
U.S. Appl. No. 13/202,884, filed Aug. 23, 2011, Jovanovich et al.
Bennett, et al. Toward the 1,000 dollars human genome. Pharmacogenomics, 6 (4) 373-382. (Jun. 2005).
Chinese office action dated Jan. 31, 2011 for CN 200580035911.7. (In Chinese with English translation).
Erratum for Margulies, et al. Genome sequencing in microfabricated high-density picolitre reactors. Nature. 2005;437(7057):376-80.: Margulies, et al. Nature. 441(7089):120. (May 4, 2006).
International search report dated Sep. 1, 2010 for PCT/US2010/ 040490.
U.S. Appl. No. 13/349,832, filed Jan. 13, 2012, Eberhart et al.
U.S. Appl. No. 13/367,326, filed Feb. 6, 2012, Jovanovich et al.
U.S. Appl. No. 13/384,753, filed Jan. 18, 2012, Stern et al.
3M. Material safety data sheet. Abrasion resistant coating. Issue date Sep. 17, 2008. www.3M.com.
Allowed Claims dated May 6, 2010 for U.S. Appl. No. 11/726,701.
Allowed Claims dated Jul. 1, 2010 for U.S. Appl. No. 11/139,018.
Allowed Claims dated Aug. 13, 2008 for U.S. Appl. No. 10/750,533.
Auroux, et al. Micro Total Analysis Systems 2. Analytical Standard Operations and Applications. Anal. Chem. 2002; 2637-2652.
Belgrader, et al. A Minisonicator to Rapidly Disrupt Bacterial Spores for DNA Analysis. Anal. Che. 1999; 4232-4236.
Belgrader, et al. PCR Detection of Bacteria in Seven Minutes. Science Magazin. 1999; 284(5413):449-450.
Belgrader, et al. Rapid PCR for Identity Testing Using a Battery-Powered Miniature Thermal Cycler. J Forensic Sci. 1998; 315-319.
Birnboim. A Rapid Alkaline Extraction Method for the Isolation of Plasmid DNA. Methods of Enzymology. 1983; 100:243-255.
Blazej, et al. Inline injection microdevice for attomole-scale sanger DNA sequencing. Anal Chem. Jun. 15, 2007;79(12):4499-506. Epub May 12, 2007.
Burns, et al. An Integrated Nanoliter DBA Analysis Device. Science Magazine. 1998; 484-487.
Call, et al. Detecting and genotyping *Escherichia coli* 0157:H7 using multiplexed PCR and nucleic acid microarrays. International Journal of Food Microbiology. 2001; 67:71-80.

(56) References Cited

OTHER PUBLICATIONS

Cameron, et al. High Internal Phase Emulsions (HIPEs) Structure, Properties and Use in Polymer Preparation. University of Strathclyde. 1995; 163214.

Canadian Office Action dated Jun. 10, 2011 for CA Application No. 2512071.

Capanu, et al. Design Fabrication and Testing of a Bistable Electromagnetically Actuated Microvalve. Journal of Microeclectromechanical System. 2000; 9:181-189.

Chandler, et al. Automated immunomagnetic separation and microarray detection of *E. coli* 0157:H7 from poultry carcass rinse. International Journal of Food Microbiology. 2001; 70:143-154.

Charlieu, et al. 3' Alu PCR: a simple and rapid method to isolate human polymorphic markers. Nucleic Acids Res. Mar. 25, 1992;20(6):1333-7.

Chinese office action dated Jan. 18, 2012 for CN 200980108368.7. (In Chinese with English translation).

Chinese Office Action dated Jan. 25, 2008 for Application No. 2003801100666.

Chinese office action dated Feb. 24, 2010 for CN Application No. 200780018073.1.

Chow, et al. Low temperature polymer-based substrates bonding using PDMS for microfluidic applications. Centre for Micro and Nano Systems, The Chinese University of Hong Kong. 2009; 1-6.

Chow, et al. Microfluidic channel fabrication by PDMS-interface bonding. Smart materials and structuresm Institute of Physics, UK. 2005; 1-9.

Delehanty, et al. A Microarray Immunoassay for Simultaneous Detection of Proteins and Bacteria. Anal. Chem. 2002; 74:5681-5687.

Dodson, et al. Fluidics Cube for Biosensor Miniaturization. Anal. Chem. 2001; 3776-3780.

Duffy, et al. Rapid Prototyping of Microfluidic Systems in Poly(dimethylsiloxane). Anal. Chem. 1998; 4974-4984.

European office action dated Apr. 7, 2011 for EP Application No. 05804847.1.

Gau, et al. A MEMS based amperometric detector for *E. coli* bacteria using self-assembled monolayers. Biosensors & Bioelectronic. 2001; 16:745755.

Hansen, et al. Polymerase chain reaction assay for the detection of *Bacillus cereus* group cells. FEMS Microbology Letters. 2001; 202:209-213.

Hartmann, et al. Direct immobilization of antibodies on phthalocyaninato-polysiloxane photopolymers. Thin Solid Films. 1994; 245:206-210.

Hartmann, et al. One-step immobilization of immunoglobulin G and potential of the method for application in immunosensors. Sensors and Actuators. 1995; 28 (2):143-149.

He, et al. Fabrication of Nanocolumns for Liquid Chromatography. Anal. Chem. 1998; 3790-3797.

Hjerten. High-performance electrophoresis : Elimination of electroendosmosis and solute adsorption. J. Chromotography. 1985; 347:191-198.

Hosokawa, et al. A Pneumatically-Actuated Three-Way Microvalve Fabricated with Polydimcthylsiloxanc Using the Membrane Transfer Technique. J. Micinicch. Microcng. 2000; 10:415-420.

International search report and written opinion dated Oct. 29, 2007 for PCT/US2005/018678.

International search report and written opinion dated Mar. 16, 2012 for PCT/US2011/048528.

International search report and written opinion dated Jul. 15, 2008 for PCT/US2007/007381.

Jacobson, et al. High-Speed Separations on a Microchip. Anal. Chem. 1994; 1114-1118.

Jacobson, et al. Integrated Microdevice for DNA Restriction Fragment Analysis Anal. Chem. 1996; 720-723.

Japanese office action dated Jan. 5, 2012 for Application No. 2007-532553 (in Japanese with English translation).

Japanese Office Action dated Jan. 13, 2010 for JP Application No. 2005508628.

Japanese office action dated Mar. 1, 2011 for JP Application. No. 2007-515379.

Japanese Office Action dated Aug. 10, 2010 for JP Application No. 2005508628.

Kamei, et al. Integrated Amorphous Silicon Photodiode Detector for Microfabricaqted Capillary Electrophoresis Devices. Micro Total Analysis Systems. 2002; 257-259.

Kamei, et al. Integrated hydrogenated amorphous Si photodiode detector for microfluidic bioanalytical devices. Anal Chem. Oct. 15, 2003;75(20):5300-5.

Kimura, et al. Restriction-Site-Specific PCR as a Rapid Test to Detect Enterohemorrhagic *Escherichia coli* 0157:H7 Strains in Environmental Samples. Applied and Environmental Microbiology. Jun. 2000; 25132519.

Koch, et al. Optical flow-cell multichannel immunosensor for the detection of biological warfare agents. Biosens Bioelectron. Jan. 2000;14(10-11):779-84.

Kong, et al. Rapid detection of six types of bacterial pathogens in marine waters by multiplex PCR. Water Research. 2002; 36: 2802-2812.

Korean office action dated Mar. 5, 2012 for KR 10-2007-7008423. (In Korean with English translation).

Kourentzi, et al. Microbial identification by immunohybridization assay of artificial RNA labels. Journal of Microbiological Methods. 2002; 49:301-306.

Kuhnert, et al. Detection System for *Escherichia coli*-Specific Virulence Genes: Absence of Virulence Determinants in B and C Strains. applied and Environmental Microbiology. 1997:703-709.

Ligler, et al. Integrating Waveguide Biosensor. Anal Chem. Feb. 1, 2002;74(3):713-9.

Manz, et al. Miniaturized Total Chemical Analysis Systems: A Novel Concept for Chemical Sensing. Sensors & Actuators. 1990; 244-248.

McLaughlin, et al. Molecular Approaches to the Identification of Streptococci. Methods in Molecular Medicine. 1998; 15:117-139.

Medintz, et al. Genotyping Energy-Transfer Cassette Labeled Short Tandem Repeat Amplicons with Capillary Array Electrophoresis Microchannel Plates. Clinical Chemistry. 2001; 1614-1621.

Medintz, et al. High-Performance Genetic Analysis Using Microfabricated Capillary Array Electroporesis Microplates. Electrophoresis. 2001; 38453856.

Medintz, et al. High-Performance Multiplex SNP Analysis of Three Hemochmromatosis-Related Mutations with Capillary Array Electrophoresis Microplates. Genome Research. 2001; 413-421.

Medintz, et al. Novel Energy Transfer Fluorescence Labeling Cassette. BioTechniques. 2002; 32(2):270.

Nataro, et al. Diarrheagenic *Escherichia coli*. Clinical MicroBiology Reviews. Jan. 1998;142-201.

Notice of Allowance dated May 6, 2010 for U.S. Appl. No. 11/726,701.

Notice of Allowance dated Jul. 1, 2010 for U.S. Appl. No. 11/139,018.

Notice of Allowance dated Aug. 13, 2008 for U.S. Appl. No. 10/750,533.

Office action dated Jan. 7, 2011 for U.S. Appl. No. 12/844,544.
Office action dated Jan. 20, 2010 for U.S. Appl. No. 11/978,224.
Office action dated Feb. 22, 2010 for U.S. Appl. No. 11/139,018.
Office action dated Mar. 2, 2008 for U.S. Appl. No. 10/540,658.
Office action dated Mar. 29, 2012 for U.S. Appl. No. 12/789,186.
Office action dated Mar. 30, 2012 for U.S. Appl. No. 12/795,515.
Office action dated Apr. 11, 2012 for U.S. Appl. No. 11/139,018.
Office action dated Apr. 29, 2009 for U.S. Appl. No. 11/139,018.
Office action dated Aug. 27, 2008 for U.S. Appl. No. 11/139,018.
Office action dated Oct. 8, 2008 for U.S. Appl. No. 10/540,658.
Office action dated Oct. 25, 2010 for U.S. Appl. No. 11/978,224.
Office action dated Nov. 6, 2009 for U.S. Appl. No. 11/139,018.
Office action dated Dec. 11, 2009 for U.S. Appl. No. 11/726,701.

O'Mahony, et al. A real time PCR assay for the detection and quantitation of *Mycobacterium avium* subsp. Paratuberculosis using SYBR Green and the Light Cycler. Journal of Microbiological Methods. 2002; 51:283-293.

Papadelli, et al. Rapid detection and identification of *Streptococcus macedonicus* by species-specific PCR and DNA hybridisation. International Journal of Food Microbiology. 2003; 81:231-239.

(56) References Cited

OTHER PUBLICATIONS

Peng, et al. Immuno-capture PCR for detection of *Aeromonas hydrophila* Journal of Microbiological Methods. 2002; 49:335-338.
Press, et al., An Integrated Microfluidic Processor for Single Nucleotide Polymorphism-based DNA Computing, Lab On A Chip. 2005, 5:10, 8 pages.
Press, et al., The Art of Scientific Computing, Numerical Recipes In C, 2nd Edition, Cambridge University Press, 1992, (table of Contents).
Quake, et al. From Micro-to Nanofabrication with Soft Materials. Science Magazine. 2000; 1536-1540.
Reyes, et al. Micro Total Analysis Systems. 1. Introduction Theory and Technology. Anal Chem. 2002; 2623-2636.
Roth, et al. Fundamentals of Logic Design, $3^{rd}$ Edition, West Publishing Company, 1985 (Table of Content).
Rowe, et al. Array Biosensor for Simultaneous Identification of Bacterial, Viral and Protein Analytes. Anal. Chem. 1999; 71:3846-3852.
Rowe-Taitt, et al., Simultaneous detection of six biohazardous agents using a planar waveguide array biosensor. Biosensors & Bioelectronics. 2000; 15:579-589.
Ruan, et al. Immunobiosensor Chips for Detection of *Escherichia coli* 0157:H7 Using Electrochemical Impedance Spectroscopy. Anal. Chem. 2002; 74:4814-4820.
Samel. Novel Microfluidic devices based on a thermally responsive PDMS composite. KTH Royal Institute of Technology, Stockholm, Sweden. 2007; 1-80.
Sanford, et al. Photoactivatable Cross-Linked Polyacrylamide for the Site-Selective Immobilization of Antigens and Antibodies Chem Mater. 1998; 10(6): 15101520.
Shi, et al. Radial Capillary Array Electrophoresis Microplate and Scanner for High Performance Nucleic Acid Analysis. Anal. Chem. 1999; 5354-5361.
Soper, et al. Polymeric Microelectro-mechanical Systems. Anal. Chem 2000; 643-651.
Stumpfle, et al. Absence of DNA sequence homology with genes of the Excherichia coli hemB locus in Shiga-toxin producing *E. coli* (STEC) 0157 Strains. FEMS Microbiology Letters. 1999; 174:97-103.
Sun, et al. A Heater-Integrated Transparent Microchannel Chip for Continuous Flow PCR. Sensors and Actuators B. 2002; 84:283-289.
Technaglas. Abrasion resistant coating for plastics. Nov. 12, 2009. www.technaglas.com/glasspages/plastic.htm.
Tian, et al. Evaluation of Silica Resins for Direct and Efficient Extraction of DNA from Complex Biological Matrices in a Miniaturized Format. Analytical Biochemistry. 2000; 283:175-191.
Verlee, et al. .Fluid Circuit Technology: Integrated Interconnect Technology for Miniature Fluidic Devices. Abbott Laboratories Hospital Division, Abbott Park, IL. 1996; 9-14.
Walt, et al. Biological Warefare Detection. Analytical Chemistry 2000; 739-746.
Waters, et al. Microchip Device for Cell Lysis, Multiplex PCR Amplification, and Electrophoretic Sizing. Anal. Chem. 1999; 158-162.
Webster, et al. Monolithic Capillary Electrophoresis Device with Integrated Fluorescence Detector. Anal. Chem. 2001;1622-1626.
White, et al. Flash detection/identification of pathogens, bacterial spores and bioterrorism agent biomarker from clinical and environmental matrices. Journal of Microbiological Methods. 2002; 48:139-147.
Yacoub-George, et al. Chemiluminescence multichannel immunosensor for biodetection Analytica Chimica Acta. 2002; 457:3-12.
Yang, et al. An Integrated Stacked Microlaboratory for Biological Agent Detection with DNA and Immunoassays. Biosensors & Bioelectronics. 2002; 17:605-618.
Zhu, et al. High-Sensitivity Capillary Electrophoresis of Double-Stranded DNA Fragments Using Monomeric and Dimeric Fluorescent Intercalating Dyes. Anal Chem. 1994; 1941-1948.
Bianco, et al. Teflon-like coatings for micro devices. CPAC Satellite Workshops. Rome, Italy. Mar. 23, 2009.
Blaga, et al. Microfluidic device for automated sample preparation. Poster. MSB Conference. Dalian, China. Oct. 2009.
Blaga, et al. Plastic chips with valves and pumps. MSB Conference. Berlin, Germany. Mar. 2008. Abstract only.
Franklin, et al. Apollo 200: an integrated platform for DNA profiling. Poster. MCB Conference. Prague, Czech Republic. Mar. 2010.
International search report and written opinion dated Apr. 30, 2012 for PCT/US2012/021217.
Japanese office action dated May 11, 2012 for Application No. 2008-553535 (English translation).
Lee, et al. Polymer nanoengineering for biomedical applications. Annals Biomed. Eng. 2006; 34:75-88.
Lu, et al. New valve and bonding designs for microfluidic biochips containing proteins. Anal. Chem. 2007; 79:994-1001.
Office action dated May 22, 2012 for U.S. Appl. No. 12/526,015.
Oh, et al. A review of microvalves. J. Micromech. Microeng. 2006; 16:R13-R39.
Tajima, et al. Physiochemical properties and morphology of fluorocarbon films synthesized on crosslinked polyethylene by capacitively coupled octafluorocyclobutane plasma. J. Phys. Chem. C. 2007; 111(11):4358-4367.
Willis, et al. Monolithic teflon membrane valves and pumps for harsh chemical and low-temperature use. Lab Chip. 2007; 7:1469-1474.
Zhang, et al. PMMA/PDMS valves and pumps for disposable microfluidics. Lap Chip. 2009; 9:3088-3094.

\* cited by examiner

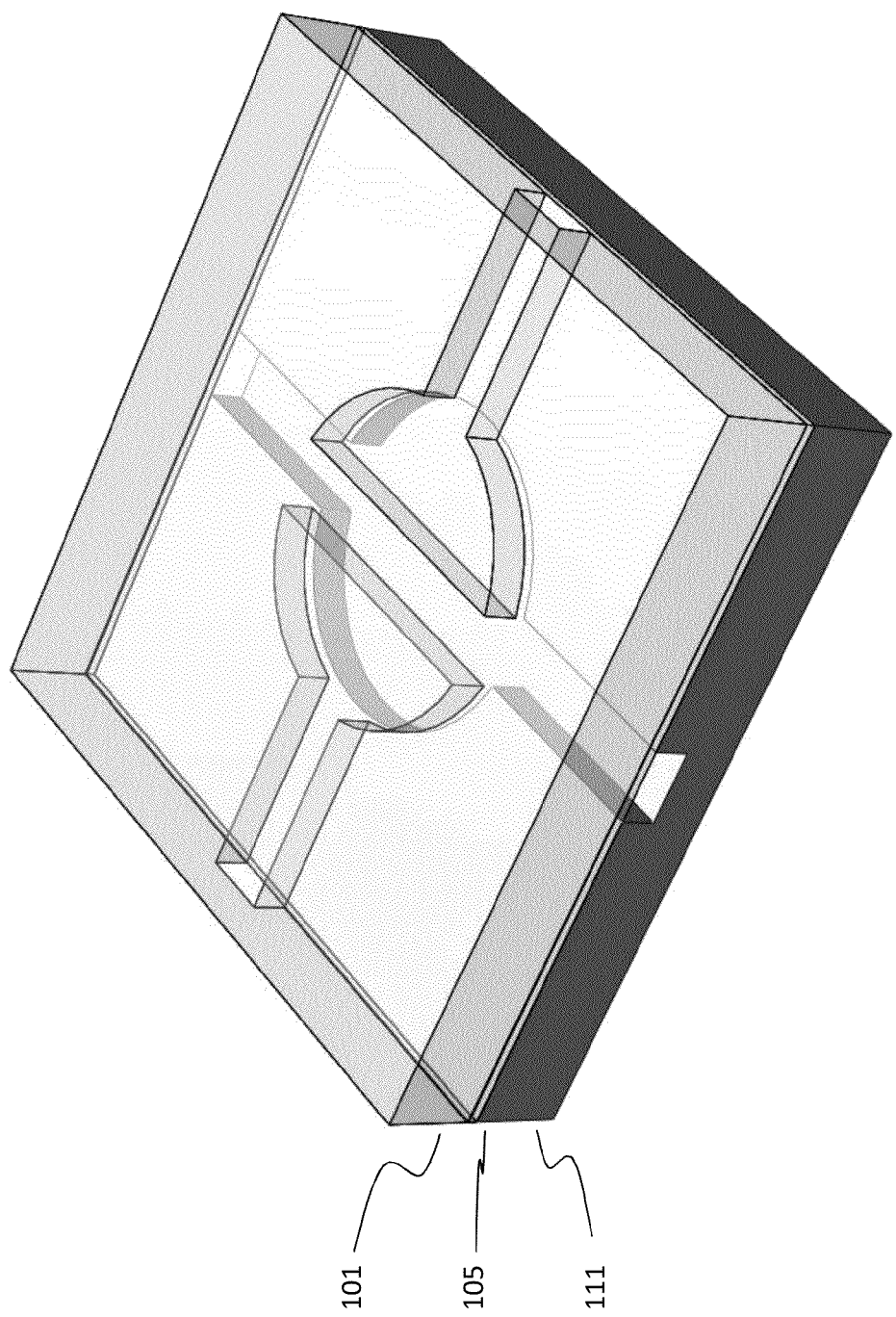

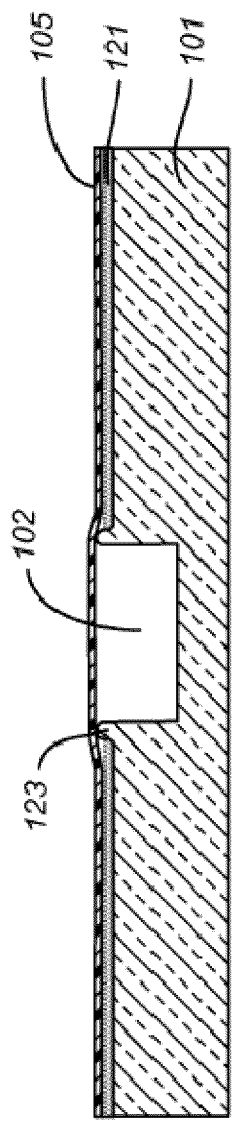
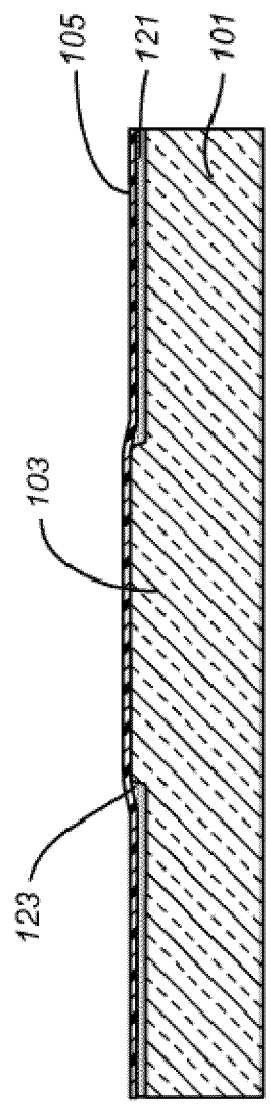
FIG. 18A
FIG. 18B

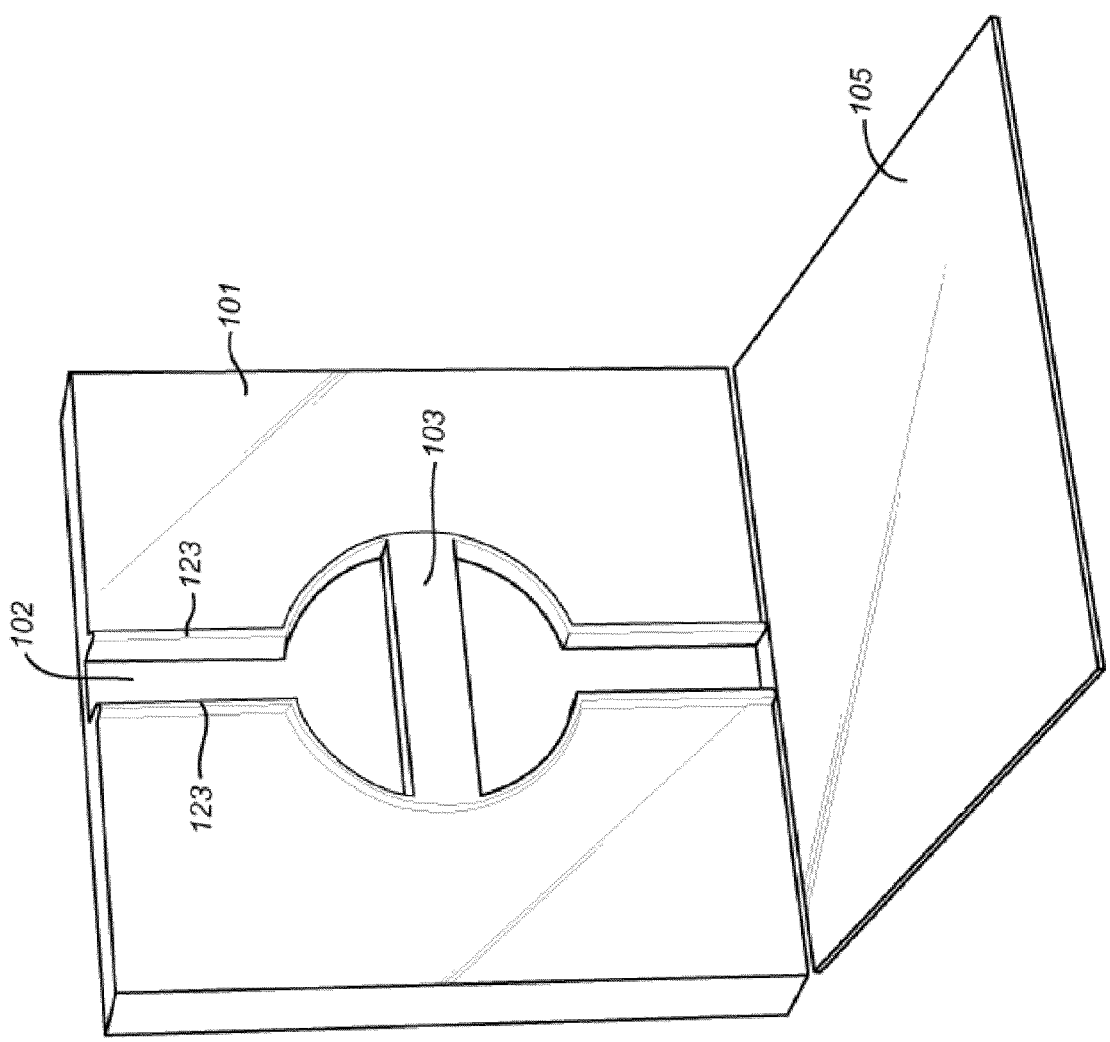

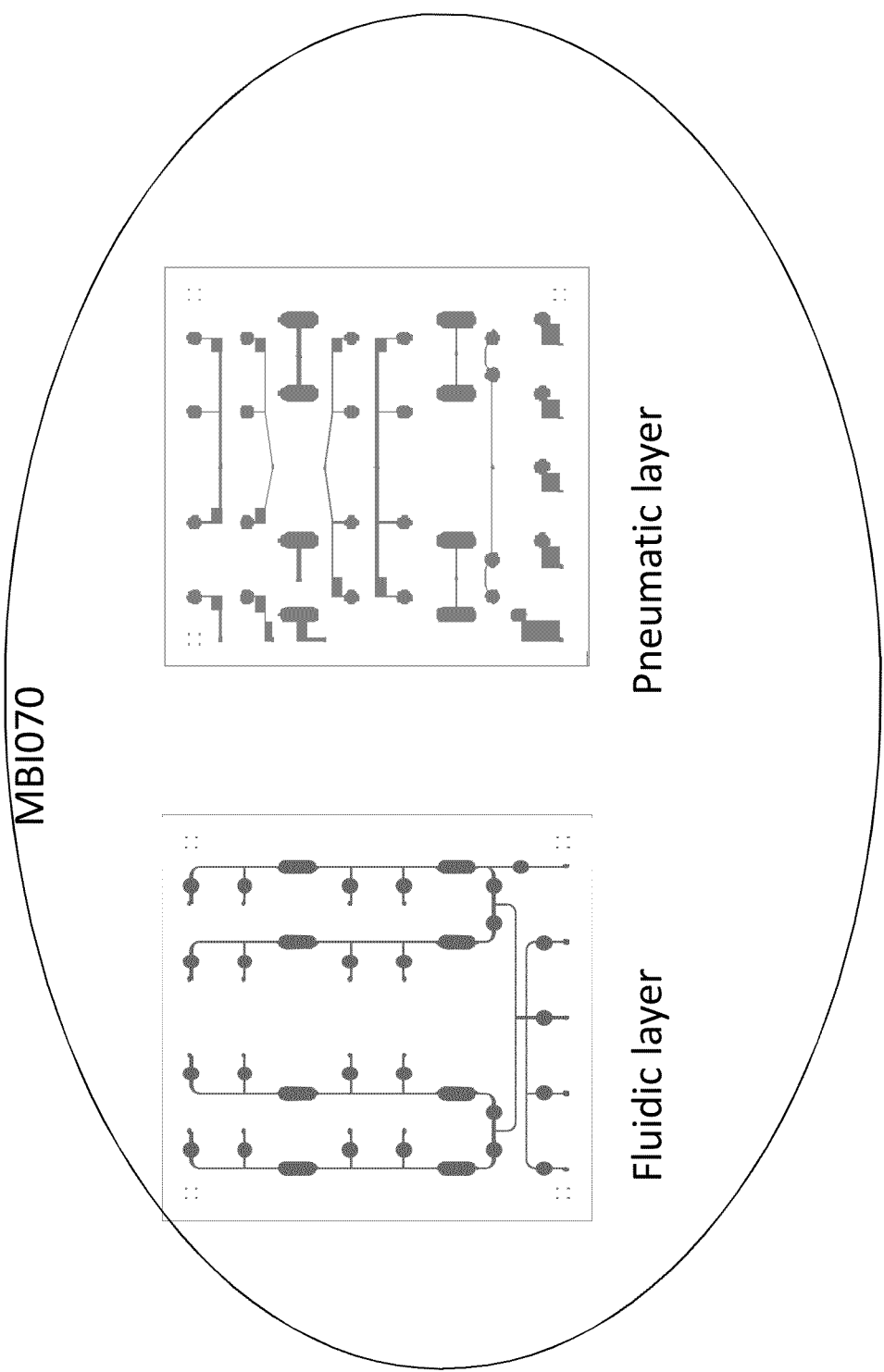

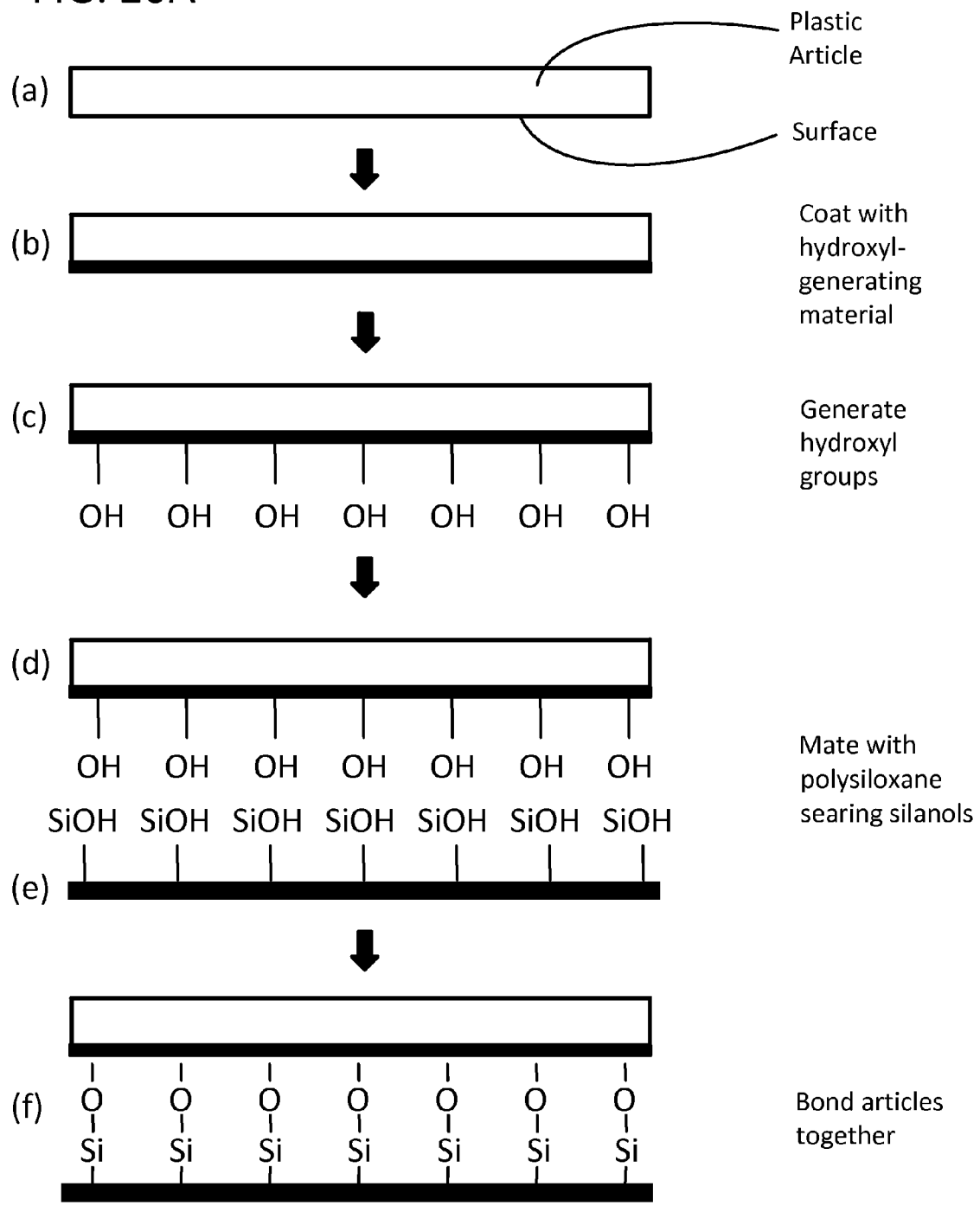

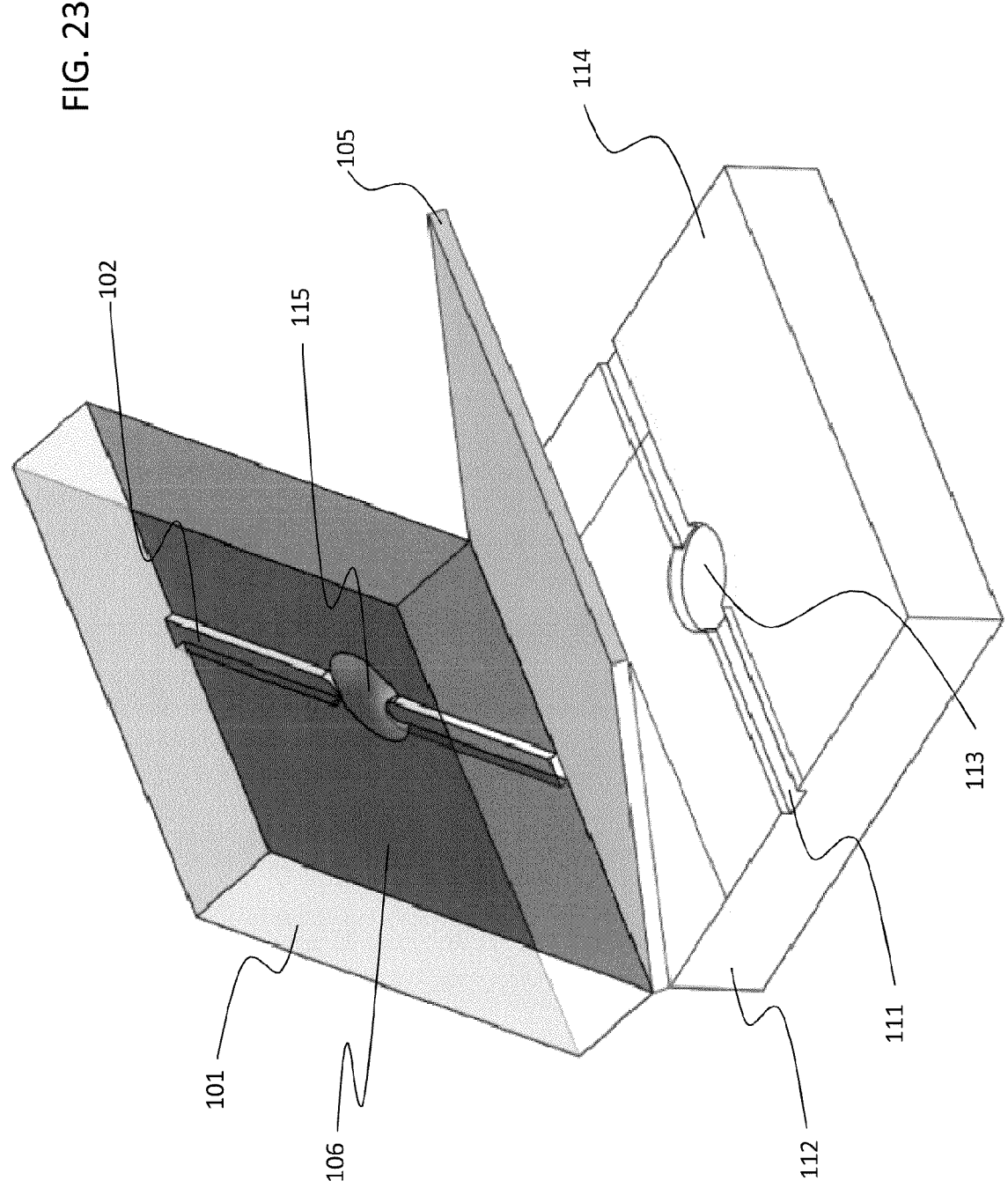

DEVICE WITH DIAPHRAGM VALVE

CROSS-REFERENCE

This application claims the benefit of the filing dates of U.S. provisional application 61/265,579, filed Dec. 1, 2009 and U.S. provisional application 61/377,635, filed Aug. 27, 2010, both of which are incorporated herein by reference in their entirety.

STATEMENT AS TO FEDERALLY SPONSORED RESEARCH

None.

BACKGROUND OF THE INVENTION

Mathies et al. (U.S. Patent Publication 2004-0209354, Oct. 21, 2004) describes a microfluidic structure comprising: a first surface including a pneumatic channel; a second surface including a fluidic channel; and an elastomer membrane located between the first and second surfaces such that the application of a pressure or a vacuum to the pneumatic channel causes the membrane to deflect to modulate a flow of a fluid in the fluidic channel. The patent further describes a method of bonding a glass wafer to a layer of PDMS by cleaning the wafer and PDMS membrane in a UV ozone cleaner prior to assembly. Fluid flow in a fluidic conduit of such devices can be regulated by a diaphragm valve in the conduit that comprises a valve seat on which the elastomer membrane sits. When in contact with the seat, the elastomer membrane blocks fluid flow across a fluidic conduit. When out of contact with the seat, a passage exists that allows fluid communication across the valve.

Mathies et al. (supra) indicates that the device can have surfaces of glass plastic or polymer. Anderson et al. (Nucleic Acids Res. 2000 Jun. 15; 28(12):E60) describes a plastic device held together using ultrasonic welding or adhesives. Samel ("Novel Microfluidic Devices Based On A Thermally Responsive PDMS Composite," School of Electrical Engineering, Royal Institute of Technology, Stockholm. Sweden, Sep. 7, 2007) discusses selectively bonding PDMS to a substrate using an anti-stiction pattern. Jovanovich et al. (WO 2008/115626, Sep. 25, 2008) describes microfluidic chips made from plastic components. The document refers, among other things, to using transfer tape or other adhesives to bond plastic parts.

SUMMARY OF THE INVENTION

In one aspect this invention provides a method of making a device comprising: a) providing a plastic substrate comprising a surface coated with a material comprising hydroxyl groups; b) providing an elastic substrate comprising a surface that comprises surface silanol groups; and c) reacting the hydroxyl groups on the surface of the plastic substrate with the silanol groups on the surface of the elastic substrate, wherein the plastic substrate is covalently bonded to the elastic substrate. In one embodiment the method further comprises: d) providing a third substrate comprising a surface that comprises hydroxyl groups; and e) reacting the hydroxyl groups on the surface of the third substrate with silanol groups on a second surface of the elastic substrate, wherein the third substrate is covalently bonded to the second surface of the elastic substrate. In another embodiment the third substrate comprises a plastic coated with a material comprising hydroxyl groups. In another embodiment the third substrate comprises glass or a semiconductor material (e.g., silicon or germanium). In another embodiment reacting comprises contacting the surface of the plastic substrate with the surface of the elastic substrate and applying a pressure and/or temperature above ambient to the contacted surfaces. In another embodiment the plastic substrate comprises a carbon-based polymer. In another embodiment the elastic substrate comprises polysiloxane. In another embodiment the polysiloxane comprises polydimethylsiloxane (PDMS). In another embodiment the material comprises an oxide. In another embodiment the oxide is a metal oxide (e.g., aluminum oxide or titanium oxide) or a semiconductor oxide (e.g., silicon oxide or germanium oxide). In another embodiment the material comprises a layer or chromium overlaid with a layer of titanium. In another embodiment the material comprises a siloxane. In another embodiment the hydroxyl groups on the surface of the plastic substrate are introduced by exposing the material to UV ozone or oxygen plasma. In another embodiment providing the plastic substrate comprises providing a plastic substrate and coating a surface of the plastic substrate with a material onto which hydroxyl groups can be introduced. In another embodiment the coating is provided by a method selected from the group consisting of chemical vapor deposition (CVD), atomic layer deposition (ALD), molecular vapor deposition (MVP), chemical deposition with pyrolytic reaction, plasma enhanced chemical vapor deposition (PECVD), deposition of a self-assembled monolayer (SAM), physical vapor deposition (PVD), application of a liquid (e.g., spraying, dipping, flowing liquid over the surface or by knife-edge coating), use of a photoresist patterned mask, an activation-deactivation method and printing. In another embodiment the silanol groups on the surface of the elastic substrate are introduced by exposing the material to UV ozone or oxygen plasma. In another embodiment the hydroxyl groups on the surface of the third substrate are introduced by exposing the material to UV ozone or oxygen plasma. In another embodiment the plastic substrate comprises at least one conduit comprising an interruption and at least one of the selected locations comprises a surface of the interruption. In another embodiment the conduits are comprised in impressions on the surface of the plastic substrate. In another embodiment one of the plastic substrate or the third substrate is configured as a fluidic layer comprising a plurality of fluidic conduits comprising interruptions that function as valve seats, wherein the valve seats are not bonded to the elastic layer. In another embodiment the other of the plastic substrate of the third substrate is configured as an actuation layer comprising at least one actuation conduit configured to transmit positive or negative pressure to the elastic layer opposite at least one valve seat. In another embodiment the method comprises removing coating material or neutralizing hydroxyl groups on the valve seats before bonding with the elastic layer. In another embodiment the coating is removed by ablation or a lift-off process. In another embodiment the valve seat is recessed with respect to the fluidic layer surface, wherein the recession inhibits bonding between the valve seat and the elastic layer. In another embodiment the third substrate comprises a carbon-based plastic coated with a material comprising hydroxyl groups. In another embodiment the fluidic layer comprises ports that communicate with the fluidic conduits and the actuation layer comprises ports that communicate with the actuation conduits. In another embodiment the fluidic layer comprises a plurality of layers, wherein an outer layer comprises fluidic conduits that communicate with the elastic layer through bores in an inner layer. In another embodiment the method comprises introducing at least one recess into the surface of the plastic substrate by embossing, etching, abrasion or injection molding. In another embodiment selected locations on the surface of the plastic substrate are not bonded to the elastic substrate.

In another aspect this invention provides a device comprising a plastic substrate comprising (1) a surface coated with a material and (2) an elastic substrate comprising a surface, wherein the surfaces are bonded together through siloxy bonds. In one embodiment the device further comprises a third substrate comprising a surface bonded to an opposite surface of the elastic substrate through a siloxy bond. In another embodiment the material coating the plastic substrate comprises an oxide or a siloxane and the elastic layer comprises a polysiloxane. In another embodiment the surfaces are not bonded together at least one selected location.

In another aspect this invention provides a microfluidic device comprising a fluidics layer, an actuation layer and an elastic layer sandwiched between them, wherein the fluidics layer and the actuation layer are covalently bonded to the elastic layer through siloxy bonds, and wherein the fluidics layer comprises a plurality of fluid conduits interrupted by valve seats which are not bonded to the elastic layer, and the actuation layer comprises at least one actuation conduit configured to transmit positive or negative pressure to the elastic layer opposite at least one valve seat; and one or both of the fluidics layer and the actuation layer comprises a plastic substrate coated with a material covalently bonded to the elastic layer. In one embodiment the siloxy bonds comprise siloxane bonds. In another embodiment the siloxy bonds are bonded through a metal. In another embodiment each of the fluidics layer and the actuation layer comprise a plastic substrate coated with a material covalently bonded to the elastic layer. In another embodiment the fluidics layer comprises the plastic coated with the material. In another embodiment the actuation layer comprises the plastic layer coated with the material. In another embodiment the polymer is a polycarbonate, an olefin co-polymer (COC) (e.g., Zeonor), a cycloolefin co-polymer (COP), an acrylic, a liquid crystal polymer, polymethylmethoxyacrylate (PMMA), a polystyrene, a polypropylene, or a polythiol. In another embodiment the material comprises an oxide selected from a metal oxide (e.g., aluminum oxide or titanium oxide) and a semiconductor oxide (e.g., silicon oxide or germanium oxide). In another embodiment the material comprises a polysiloxane. In another embodiment the material is not exposed to the elastic layer at the valve seat. In another embodiment the valve seat is recessed from the surface of the fluidics layer. In another embodiment the material is not exposed to the elastic layer at a surface of the actuation conduit opposing the valve seat. In another embodiment the elastic layer comprises PDMS. In another embodiment the fluidics layer comprises ports communicating with the fluidic conduits. In another embodiment the actuation layer comprises ports communicating with the actuation conduits. In another embodiment the device is a monolithic device. In another embodiment the valve is normally open.

In another aspect this invention provides a system comprising: a) a microfluidic device comprising a fluidics layer, an actuation layer and an elastic layer sandwiched between them, wherein the fluidics layer and the actuation layer are covalently bonded to the elastic layer through siloxy bonds, and wherein the fluidics layer comprises a plurality of fluid conduits interrupted by valve seats which are not bonded to the elastic layer, and the actuation layer comprises at least one actuation conduit configured to transmit positive or negative pressure to the elastic layer opposite at least one valve seat; and one or both of the fluidics layer and the actuation layer comprises a plastic substrate coated with a material covalently bonded to the elastic layer; b) a source of positive and/or negative pressure in communication with the actuation conduits and c) a control unit comprising logic to open and/or close valves is a programmed sequence. In one embodiment the logic is configured to operate the valves to pump liquid from one location in the device to another location. In another embodiment the system further comprises a robot configured to deliver liquid to ports in the fluidic layer that communicate with the fluidic conduits.

In another aspect this invention provides a method comprising: a) providing a microfluidic device comprising a fluidics layer, an actuation layer and an elastic layer sandwiched between them, wherein the fluidics layer and the actuation layer are covalently bonded to the elastic layer through siloxy bonds, and wherein the fluidics layer comprises a plurality of fluid conduits interrupted by valve seats which are not bonded to the elastic layer, and the actuation layer comprises at least one actuation conduit configured to transmit positive or negative pressure to the elastic layer opposite at least one valve seat; and one or both of the fluidics layer and the actuation layer comprises a plastic substrate coated with a material covalently bonded to the elastic layer; b) providing a liquid in the fluidic conduit; c) actuating the diaphragm valve using positive or negative pressure applied through actuation conduit; and d) pumping the liquid through the diaphragm valve.

In another aspect this invention provides a method comprising: a) providing a microfluidic device comprising a fluidics layer, an actuation layer and an elastic layer sandwiched between them, wherein the fluidics layer and the actuation layer are covalently bonded to the elastic layer through siloxy bonds, and wherein the fluidics layer comprises a plurality of fluid conduits interrupted by valve seats which are not bonded to the elastic layer, and the actuation layer comprises at least one actuation conduit configured to transmit positive or negative pressure to the elastic layer opposite at least one valve seat; and one or both of the fluidics layer and the actuation layer comprises a plastic substrate coated with a material covalently bonded to the elastic layer wherein a fluidic conduit comprises, in series, (1) an inlet diaphragm valve, (2) a pumping diaphragm valve that comprises a valve body in the actuation layer into which the diaphragm can be deflected and optionally comprises a valve seat; and (3) an outlet diaphragm valve; wherein the three valves form a diaphragm pump; b) providing a liquid in the fluidic conduit; c) actuating the diaphragm valves using positive or negative pressure applied through actuation conduits to pump the liquid through the valve.

In another aspect this invention provides a method of making a device comprising: a) providing a first plastic substrate comprising a surface coated with a material comprising hydroxyl groups; b) providing a second plastic substrate comprising a surface coated with a material comprising hydroxyl groups; and c) reacting the hydroxyl groups on the surfaces of the plastic substrate and the second plastic substrate, wherein the plastic substrates is covalently bonded through ether bonds. In one embodiment at least one of the materials comprises a siloxane and the hydroxyl groups on the at least one material are silanol groups. In another embodiment the method further comprises: d) providing a third substrate comprising a surface that comprises hydroxyl groups; and e) reacting the hydroxyl groups on the surface of the third substrate with silanol groups on a second surface of the elastic substrate, wherein the third substrate is covalently bonded to the second surface of the elastic substrate. In another embodiment the third substrate comprises a plastic substrate coated with a material comprising the hydroxyl groups.

In another aspect this invention provides an article comprising a first plastic layer comprising a surface coated with a material and second plastic layer comprising a surface coated with a material, wherein the first and second layers are covalently bonded together through ether bonds in the materials. In one embodiment the material comprises an oxide or a siloxane. In another embodiment the ether bonds are comprised in siloxy bonds. In another embodiment siloxy bonds are siloxane bonds. In another embodiment siloxy bonds have the formula Si—O—X wherein X is not silicon. In another embodiment the material on at least one layer is an oxide or a polysiloxane.

In another aspect this invention provides a method of making a device comprising: a) providing a plastic layer comprising a surface coated with an adhesive, wherein the surface does not comprise adhesive at least one selected location; b) providing an elastic layer comprising a surface; and c) bonding the plastic layer to the elastic layer with the adhesive; wherein the plastic layer is not bonded to the elastic layer at the at least one selected location.

In another aspect this invention provides a device comprising at least one diaphragm valve configured to regulate fluid flow in a fluidic channel and comprised in a combination that comprises a fluidics layer, an actuation layer and an elastic layer sandwiched between the fluidics layer and the actuation layer, wherein each diaphragm valve comprises: a) a diaphragm comprised in the elastic layer; b) a valve seat comprised in the fluidics layer and recessed from a surface of the fluidics layer that contacts the elastic layer so that the diaphragm does not close the diaphragm valve unless positive pressure is exerted against the diaphragm; and c) a valve inlet and a valve outlet comprised in the fluidics layer and in fluid communication with the fluidic channel; and wherein the diaphragm is configured to be actuated by positive or negative pressure transmitted to the diaphragm through an actuation conduit in the actuation layer. In one embodiment the fluidic channel is a microfluidic channel. In another embodiment the valve further comprises: d) a valve relief comprised at least in part in the actuation layer, into which the diaphragm is configured to be deflected thereby defining a valve chamber. In another embodiment the valve seat is configured substantially as a section of a sphere. In another embodiment the valve seat is recessed with respect to the surface of the fluidics layer to a depth that is less than a depth of the fluidic channel.

In another aspect this invention provides a method comprising operating the aforementioned device by applying positive pressure against the diaphragm to close the valve and negative pressure to open the valve.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 2 shows an assembled diaphragm valve in three dimensions.

FIG. 18 shows a device comprising a fluidics layer comprising a raised area bordering the channels and valve seat. FIGS. 18A and 18B are cross-sections of FIG. 18 that show the raised areas, or ridges, that are elevated above the rest of the surface of the fluidics layer. This contrasts with other embodiments in which the tops of the channels and the valve seats are flush with the contact surfaces of the fluidic layer. FIG. 18C is a clamshell view showing a face of the fluidics layer 101 that contacts the elastic layer 105.

FIG. 19 shows the layout of channels and bores in the fluidic layer and pneumatic layer of a microfluidic chip.

FIGS. 20A and 20B presents a flow chart of a method of making a composite article. In panel A, a plastic article comprising a surface (a) is coated with a material (b) onto which hydroxyl groups are introduced (c). The coating can be an oxide or a siloxane, in which case silanols would be produced. The article (d) is mated with a substrate onto which silanol groups have been introduced on a surface (e). The substrate can be, for example, a polysiloxane. The silanols and hydroxyls are reacted to covalently bond the plastic article with the substrate (f) to form a composite article. In panel B, silanol groups are introduced onto the surface of the substrate opposing the composite article (g). A second plastic article comprising a surface having a coating on which hydroxyl groups have been introduced (h) is mated with the substrate and reacted to form a covalent siloxy bond that bonds the articles together (i).

FIG. 23 shows a clamshell view of an embodiment of a normally open diaphragm valve of this invention. A fluidics layer 101 comprises a fluid conduit comprising a fluidic channel 102 interrupted by a valve seat 103. The fluidic channel opens into a recessed dome 115 that functions as a valve seat. When no pressure or negative pressure is exerted on elastic layer 105, the elastic layer sits away from the valve seat, allowing for an open valve in which a fluid path between the channels entering the valve are in fluidic contact, creating a fluid path. When positive pressure is exerted on elastic layer 105, the elastic layer deforms toward the valve seat to close the valve.

DETAILED DESCRIPTION OF THE INVENTION

1. Introduction

Figure 1:
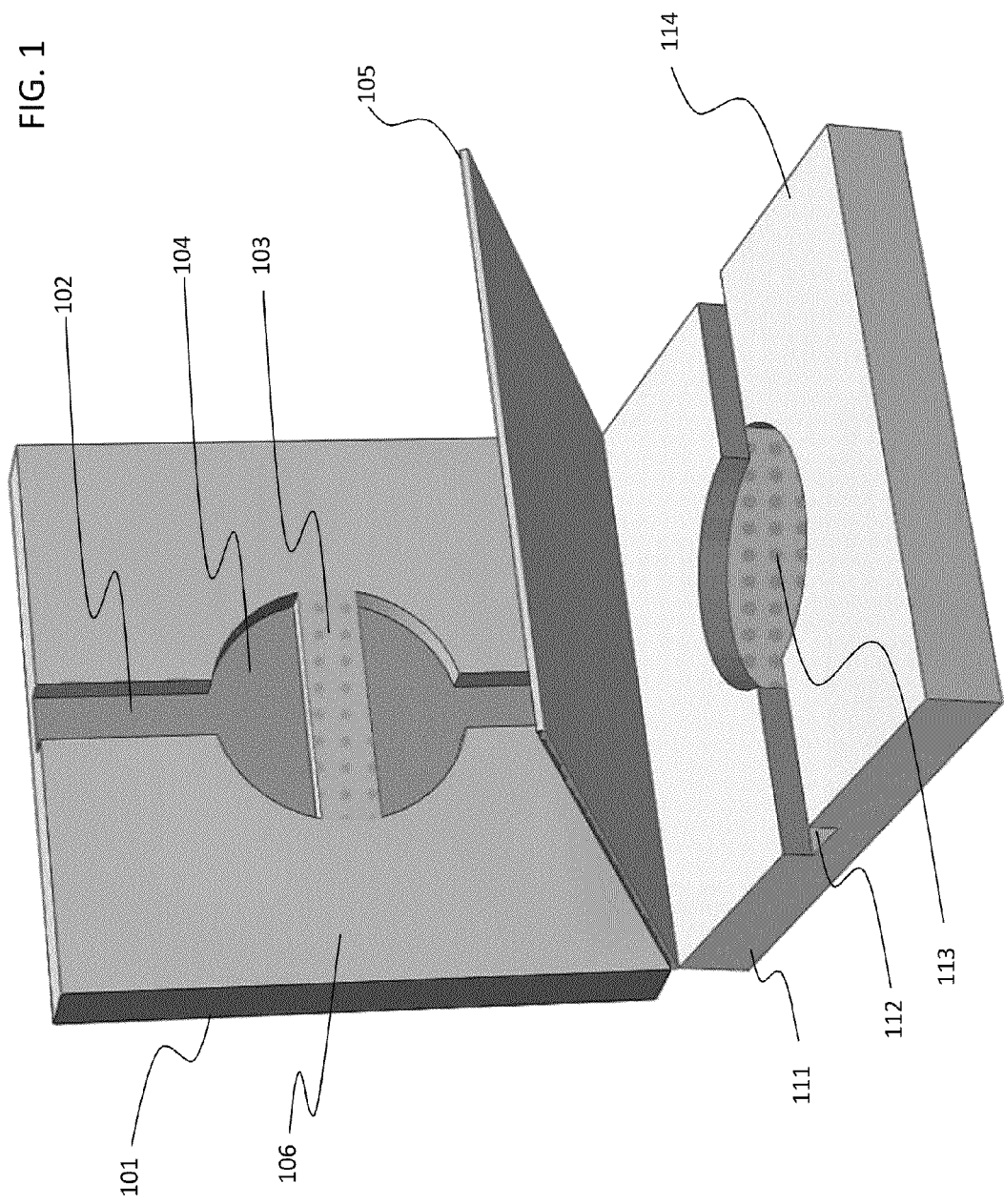
FIG. 1 shows a clamshell view of one embodiment of a diaphragm valve of this invention. A fluidics layer 101 comprises a fluid conduit comprising a fluidic channel 102 interrupted by a valve seat 103. In this embodiment, fluidic channel opens into a fluidics valve body 104. One face of the fluidics layer contacts the elastic layer 105 in the assembled device. This face comprises sealing surfaces 106, to which the elastic layer can be sealed, and exposed surfaces of the functional components—fluidic conduit including the valve seat. An actuation layer 111, comprises an actuation conduit comprising an actuation channel 112 and an actuation valve body disposed opposite the valve seat. The actuation layer also comprises a face that contacts the elastic layer in the assembled device that has sealing surfaces and exposed surfaces of functional elements. In certain embodiments of the invention, the fluidic and actuation layers comprise surfaces 106 and/or 114 coated with a material onto which hydroxyl groups are introduced during assembly. This material can be removed at locations of functional surfaces over which liquid or actuant will flow and that may come into contact with the elastic layer. For example, the material can be removed from valves seats (103) and/or valve chambers (113). This removal inhibits bonding between the elastic layer and the functional surfaces, so that valves can function without bonding or sticking to the touching surfaces.

Plastics that are not based on siloxanes (e.g., carbon-based polymers) do not bond easily to other materials, in part because such plastics do not have surface reactive groups available to engage in chemical bonding. This invention provides methods for bonding plastic to a variety of materials, including other plastics, by providing the plastic with a surface comprising a material onto which reactive groups can be introduced. These groups are available to engage in chemical bonding with materials that also have reactive groups on their surfaces, thereby bonding the articles together. In particular, this invention contemplates composite plastic articles in which a plastic article is bonded to a polysiloxane, such as PDMS. Furthermore, the plastic can be bonded to other articles at selected locations so that specified locations on the plastic are bonded to the other article and/or specified locations on the plastic are not bonded to the other article. In certain embodiments, fluidic and microfluidic devices are made from these composite articles.

In certain embodiments, the reactive groups on the surface of the plastic are hydroxyl groups. Materials such as oxides and siloxanes can be introduced onto the surface of a plastic article and hydroxyl groups can be introduced onto these materials. Hydroxyl groups can react with other functional groups, and, in particular with silanol groups.

In one method, plastic articles are provided with a surface comprising a hydroxyl-generating material, such as an oxide or a siloxane. This material can be applied to the plastic as a coating or a layer. Hydroxyl groups are introduced onto the surface of a plastic article, for example, by exposing to UV ozone or oxygen plasma. A second article having surface reactive groups, such as surface hydroxyls, or also having a material at the surface to which reactive groups can be introduced is also provided. The two articles, with each with surface reactive groups, are placed in contact. The reactive groups are allowed to react, covalently bonding the articles together.

Reactions between hydroxyl groups can require extreme reaction conditions. However, hydroxyl moieties of silanol groups react readily with other hydroxyls under ambient conditions or slightly elevated temperature or pressure. Accordingly, the plastic material, the article to which it is to be bonded, or both, can have silanol surface groups. The plastic material can be provided with a siloxane coating, onto which silanols can be introduced. A number of siloxane based coatings can be applied, e.g., coatings used to produce abrasion resistant or UV-blocking coatings on materials. Alternatively, if the material to which the plastic is to be bonded comprises siloxane, silanol groups can be introduced onto it. When two articles are placed into contact, both of which have hydroxyl groups and at least one of which has silanol groups, the silanols react with the hydroxyl groups on the plastic surface to produce siloxyl (Si—O—X) or siloxane (Si—O—Si) bonds. In certain embodiments, X can be an atom other than silicon, for example, a metal (e.g., aluminum, titanium), carbon or a non-silicon semiconductor (e.g., germanium). A condensation reaction can take place under ambient temperature and pressure. It also can be accelerated by increasing temperature, e.g., to at least 50° C., and/or by applying pressure to the contacted surfaces.

In certain embodiments, such as certain microfluidic devices of this invention, it is useful to have selected locations or areas on the surface of the plastic substrate that do not bond or stick to the other substrate. This can be accomplished by eliminating, covering, preventing the formation of, otherwise or neutralizing the material/surface hydroxyl groups at predetermined locations on one of the substrates, e.g., the plastic substrate. For example, the material at a selected location can be ablated, lifted-off or covered with another material. Also, hydroxyl groups can be neutralized after formation. Hydroxyl groups activated on a surface material can have a short half-life. Therefore, in certain embodiments, neutralized locations are created before activation of hydroxyl groups on the surface. Areas of the plastic substrate that do not comprise hydroxyl groups resist bonding to the second substrate comprising surface hydroxyl groups. It also can be accomplished by recessing the surface of the substrate so that it does not come into contact with the other surface, or does not do so for long enough for bonding to occur. It also can be accomplished by applying the coating to selected locations at which the article will bond to a second article. Such unbonded areas are useful locations for the placement of functional elements, such as valves, at which sticking between the plastic layer and the second layer and is undesired.

This method is particularly useful for bonding together two materials, at least one of which has a smooth surface. A smooth surface may be rigid or flexible. The substrate can have a generally planar, e.g., flat surface. Generally, flatter surfaces bond more completely than curved surfaces. Decreasing the thickness of the layers will improve contact and bonding. For example, at least one or both of the materials bonded together can take the form of a layer, e.g., between about 0.5 mm and 1 mm, e.g., about 0.6 mm thick. In other embodiments, if one of the surfaces is curved, the other substrate can be a material that is configured to conform to it. It is understood that in certain embodiments, the substrate will comprise indentations such as channels. These aspects generally are not meant to be bond with the other substrate and it is the contact surfaces that preferably are smooth.

Alternatively, the surface of the substrate can be provided with a reactive group such as an amine group, a methacrylate group, a disulfide group, a disilazane group, a sulfhydryl group, an acrylate group, a carboxylate group, an activated ester group, an active leaving group, an isonitrile group, an isocyanate group, a phosphoramidite group, a nitrene group, an epoxide group, a hydrosilyl group, an ester group, an arene group, an azido group, a nitrile group, a vinyl group or an alkylphosphonate group. These reactive groups can be bonded to a substrate having a surface comprising groups with which the reactive groups will react.

2. Articles and Devices 2.1 Composite Plastic Articles

This invention provides composite plastic articles comprising plastics coated with a material onto which hydroxyl groups can be introduced and bonded with a second substrate through ether bonds formed by reacting hydroxyl groups provided on the surface. In certain embodiments, the second substrate comprises silane, e.g. a siloxane, and the covalent bond is a siloxy bond or a siloxane bond. The articles can comprise layers or sheets of plastic of the same or different types bonded together, for example, as laminates. These articles can comprise at least two or at least three plastic layers bonded together in this fashion. The thickness of the plastic layers is a matter of ultimate design. However, articles comprising sheets of plastic can have plastic in thicknesses of about 1 mil to about 1000 mils, or about 10 mils to about 200 mils, or about 0.25 mm to about 5 mm, e.g., about 1 mm to 3 mm. The articles can take any desired shape, e.g., flat, curved, indented, etc. The silane-containing material generally will have a shape that conforms to the shape of the plastic piece so as to provide sufficient surface area for bonding to occur. When a plastic substrate and a second substrate that are bonded together have different expansion coefficients, changes in temperature can change the dimensions of one substrate more than another. This can result in deformities, including cracking or breaking, of one of the substrates. Articles of this invention that comprise an elastic layer between them resist such deformities. The elastic layer can absorb deformation differently on different contact surfaces.

2.2 Fluidic Devices Comprising a Plastic Layer Bonded to an Elastic Layer

A diaphragm valve uses a diaphragm to open or close a fluidic path between fluidic conduits. A diaphragm valve typically comprises a valve body having a valve inlet and a valve outlet that communicate with the fluidic conduits entering and exiting the valve. The body also has a diaphragm disposed within the body and configured to sit against a valve seat to completely or partially close the valve. The valve body also comprises a valve relief into which the diaphragm can deflect away from the valve seat. When the diaphragm is deflected away from the valve seat, a space is created referred to as a valve chamber. When the valve is open, a continuous fluid path is formed through which the valve inlet is in fluid communication with the valve outlet.

The fluidic devices of this invention comprise at least one or a plurality of fluidic conduits in which fluid flows. Flow can be controlled by on-device diaphragm valves and/or pumps actuatable by, for example, pressure, pneumatics or hydraulics. The devices typically comprise a fluidics layer bonded to an elastic layer, wherein the elastic layer functions as a deflectable diaphragm that regulates flow of fluids across interruptions (e.g., valve seats) in the fluidic pathways in the fluidics layer. The elastic layer can comprise a polysiloxane, such as PDMS. In other embodiments, the device comprises three layers: A fluidics layer, an actuation layer and an elastic layer sandwiched there-between. The actuation layer can comprise actuation conduits configured to actuate or deflect the elastic layer at selected locations, e.g., at diaphragm valves, thereby controlling the flow of fluid in the fluidic conduits. The three layers can be bonded together into a unit. Alternatively, the fluidics layer or the actuation layer can be bonded to the elastic layer to form a unit and the unit can be mated with and/or removed from the other layer. Mating can be accomplished, for example, by applying and releasing pressure, e.g., by clamping.

At least one or both of the fluidics layer and the actuation layer comprises a plastic with a surface material covalently bonded to the elastic layer by the methods described herein. If one of the layers does not comprise plastic with a surface material bonded to the elastic layer, it can comprise another material comprising surface hydroxyl groups available for bonding with a second surface of the elastic layer. For example, the other layer can comprise glass, e.g., borosilicate glass. Glass also can be covalently bonded to materials comprising silanol groups by contacting the materials and, optionally, applying a temperature and/or pressure above ambient.

Fluidic conduits and actuation conduits may be formed in the surface of the fluidic or actuation layer as furrows, dimples, cups, open channels, grooves, trenches, indentations, impressions and the like. Conduits or passages can take any shape appropriate to their function. This includes, for example, channels having, hemi-circular, circular, rectangular, oblong or polygonal cross sections. Valves, reservoirs and chambers can be made having dimensions that are larger than channels to which they are connected. Chambers can have walls assuming circular or other shapes. Areas in which a conduit becomes deeper or less than a connecting passage can be included. The conduits comprise surfaces or walls that contact fluids flowing through them. The fluid in the fluidic layer can be a liquid or a gas. In the case of an actuation layer, the fluid is referred to as an actuant. It can be a gas or a liquid.

A portion of the surface (e.g., a smooth or flat surface) that contacts the elastic layer is referred to as a contact surface. Portions of the surfaces that are indented, depressed or etched that face the elastic layer are referred to as exposed surfaces. Surfaces over which fluid flows, including conduits, channels, valve or pump bodies, valve seats, reservoirs, and the like are referred to as functional surfaces. In the construction of the fluidic device, pressure or bonding of an elastic layer to all or part of the contact surfaces can function to cover exposed conduits and contain liquid within the fluid or actuation conduits. These surfaces are referred to as sealing surfaces.

The fluidics layer, itself, can be comprised of more than one sublayer, wherein channels in certain sublayers connect through vias in other sublayers to communicate with other channels or with the elastic layer. In multiple sublayer configurations, fluidic paths can cross over one another without being fluidically connected at the point of crossover. In certain embodiments, a fluidic layer can comprise alternating layers of plastic bonded to an elastic material bonded to a plastic, etc. In such configurations, vias can traverse through both plastic and elastic materials to connect with other layers.

Diaphragm valves and pumps are comprised of functional elements in the three layers. A diaphragm valve comprises a body, a seat (optionally), a diaphragm and ports configured to allow fluid to flow into and out of the valve. The body is comprised of a cavity or chamber in the actuation layer that opens onto the surface facing the elastic layer ("actuation valve body"). Optionally, the valve body also includes a chamber in the fluidics layer that opens onto a surface facing the elastic layer and which is disposed opposite the actuation layer chamber ("fluidics valve body"). The actuation layer body communicates with a passage, e.g., a channel, through which positive or negative pressure can be transmitted by the actuant. When the actuant is a gas, e.g., air, the actuation layer functions as a pneumatics layer. In other embodiments, the actuant is a liquid, such as water, oil, Fluorinert etc.

Fluidic conduits can comprise interruptions, that is, material that partially or completely blocks fluid flow in a conduit. For example, the fluidics layer can comprise a valve seat that faces the elastic layer. The valve seat interrupts a fluidic channel either directly or by being disposed within a body chamber in the fluidics layer. The elastic layer forms the diaphragm. The valve may be configured so that the diaphragm naturally sits on the valve seat, thus closing the valve, and is deformed away from the seat to open the valve. The valve also may be configured so that the diaphragm naturally does not sit on the seat and is deformed toward the seat to close the valve (a so-called "normally open" valve). In this case, application of positive pressure to the elastic layer from the actuation conduit will push the elastic layer onto the valve seat, closing the valve. When the diaphragm is off the valve seat, it creates a fluidic chamber or passage through which fluid may flow. The channel is in fluid communication with the valve chamber through the valve ports.

In one embodiment of a normally open valve, a surface of an interruption that would otherwise form a valve seat for a normally closed valve is recessed with respect to the surface of the fluidic layer bonded to the elastic layer. In this case, the valve seat will be raised with respect to the elastic layer. Positive pressure on the elastic layer pushes the elastic layer against the valve seat, closing the valve. Valve seats can be recessed with respect to the rest of the surface by about 25 microns to about 75 microns, e.g., about 50 microns, using ablation techniques.

Figure 22:
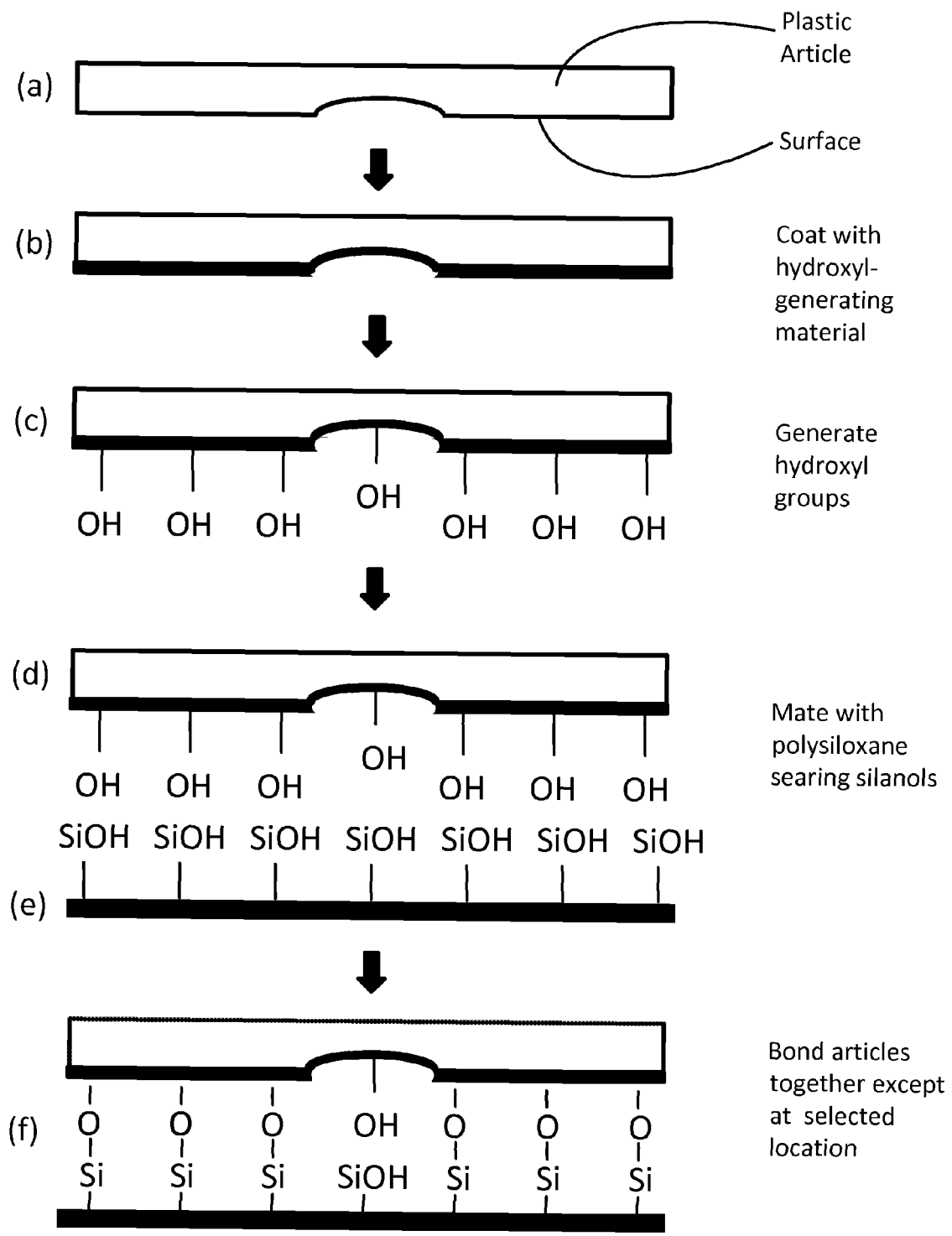
FIG. 22 presents a flow chart of a method of making a composite article with a recessed valve seat that is not bonded to an elastic layer. A plastic article comprising a surface with a recessed valve seat (a) is coated with a material (b) onto which hydroxyl groups are introduced (c). The coating can be an oxide or a siloxane, in which case silanols would be produced. The article (d) is mated with a substrate onto which silanol groups have been introduced on a surface (e). The substrate can be, for example, a polysiloxane. The silanols and hydroxyls are reacted to covalently bond the plastic article with the substrate (f) to form a composite article. However, the portion of the valve seat that is recessed with respect to the elastic layer does not have hydroxyl groups that are in proximity to the elastic layer and that can bond with the elastic layer.

In another embodiment of a normally open valve, the valve seat is not configured as an interruption in a fluidic conduit. Rather, it takes the form of a recess with respect to surface of the fluidics layer that normally contacts the elastic layer, so that the elastic layer does not sit against the recessed surface without application of pressure on the elastic layer, e.g. through the actuation chamber. In this case, the valve may not have a discrete valve chamber in the fluidics layer that is separate from the valve seat. The valve seat can take a curved shape that is concave with respect to the surface of the fluidic layer, against which the elastic layer can conform. See, e.g., FIGS. 22 and 23. For example, the valve shape can be a section of a sphere or an inverted dimple or a dome. Such a configuration decreases the dead volume of the valve, e.g., by not including a valve chamber that contains liquid while the valve is closed. This valve also comprises a surface against which the elastic layer can conform easily to close the valve. Also, this configuration eliminates the need to create a surface patterned so that valves do not comprise surface hydroxyl groups, because the recessed surfaces do not bond with the elastic layer against which they are laid during construction. In another embodiment, the concave surface can comprise within it a sub-section having a convex surface, e.g., an inverted dimple comprising an extraverted dimple within it forming, for example, a saddle shape. The convex area rises up to meet the elastic layer under pressure, creating a better seal for the valve.

In certain embodiments of a normally open valve, the concavity is recessed less than the channels to which it is connected. For example, the deepest part of the concavity can be about one-third to one-half the depth of the channel (e.g., 30 microns to 50 microns for the concavity versus 100 microns for the channel). For example, the elastic layer may be about 250 microns, the channels about 100 microns deep and the valve seat about 30 microns deep. The thinner the elastic layer, the deeper that the concavity can be, because the elastic layer can conform to the concavity without excessive deformation. In certain embodiments the channels can enter partially into the concavity, for example forming a vault. In certain embodiments, the channels and concavity are formed by micromachining. The actuation layer can comprise a valve relief into which the diaphragm deflects for opening the valve.

In another embodiment a diaphragm valve is formed from a body comprising a chamber in the actuation layer and the in the fluidics layer, but without an interruption. In this embodiment, deforming the diaphragm into the actuation chamber creates a volume to accept fluid, and deforming the diaphragm into the fluidics chamber pumps liquid out of the chamber. In this configuration, the position of the diaphragm alters the effective cross-section of the fluidic conduit and, thus, can regulate the speed of flow through the valve. In such a configuration, the valve may not completely block the flow of fluid in the conduit. This type of valve is useful as a fluid reservoir and as a pumping chamber and can be referred to as a "pumping valve".

The ports into a valve can take a variety of configurations. In certain embodiments, the fluidic channels are comprised on the surface of the fluidics layer that faces the elastic layer. A valve can be formed where an interruption interrupts the channel. In this case, the port comprises that portion of the channel that meets the interruption and that will open into the valve chamber when the diaphragm is deflected. In another embodiment, a fluidic channel travels within a fluidics layer. In this case, ports are formed where two vias made in the fluidics layer communicate between two channels and the elastic layer across from an actuation valve body. (The two adjacent vias are separated by an interruption that can function as a valve seat.) In another embodiment, a fluidic channel is formed as a bore that traverses from one surface of the fluidic layer to the opposite surface which faces the elastic layer. A pair of such bores separated by an interruption can function as a valve. When the elastic layer is deformed away from the interruption (to which it is not bonded), a passage is created that allows the bores to communicate and for fluid to travel in one bore, through the valve and out the other bore.

In the functioning of valves and pumps, a diaphragm moves on or off a valve seat or contact surface and toward or away from the surface of a body chamber in the fluidics or actuation layer. If the elastic layer sticks to a valve seat, contact surface, or to any exposed functional surface of the device, the device may not function properly. The devices are configured to decrease sticking between the elastic layer and functional elements of the device, such as fluidic or actuation conduits, valve seats, valve bodies or chambers and channels. In particular, surfaces of the fluidics and/or actuation layers that are likely to contact the elastic layer during operation of the device can be addressed to inhibit sticking or bonding. This includes valve seats in the fluidics layer and valve bodies in the actuation layer.

Microfluidic devices with diaphragm valves that control fluid flow have been described in U.S. Pat. Nos. 7,445,926 (Mathies et al.), 7,745,207 (Jovanovich et al.), 7,766,033 (Mathies et al.), and 7,799,553 (Mathies et al.); U.S. Patent Publication Nos. 2007/0248958 (Jovanovich et al.), 2010/0165784 (Jovanovich et al.); PCT Publication Nos. WO 2008/115626 (Jovanovich et al.), WO 2009/108260 (Vangbo et al.) and WO2009/015296 (Mathies et al.); PCT application PCT/US2010/40490 (Stern et al., filed Jun. 29, 2010); U.S. application Ser. No. 12/795,515 (Jovanovich et al., filed Jun. 7, 2010); and U.S. provisional application 61/330,154 (Eberhart et al., Apr. 30, 2010) and 61/375,791 (Vangbo, Aug. 20, 2010).

MOVe (Microfluidic On-chip Valve) elements, such as valves, routers and mixers are formed from sub-elements in the fluidics, elastic and actuation layers of the device. A MOVe valve is a diaphragm valve formed from interacting elements in the fluidics, elastic and actuation layers of a microfluidic chip (FIG. 1). The diaphragm valve is formed where a microfluidic channel and an actuation channel cross over each other and open onto the elastic layer. At this location, deflection of the elastic layer into the space of the fluidics channel or into the space of the pneumatics channel will alter the space of the fluidics channel and regulate the flow of fluid in the fluidics channel. The fluidics channel and actuation channels at the points of intersection can assume different shapes. For example, the fluidics channel can comprise an interruption that functions as a valve seat for the elastic layer. The fluidics channel could open into a chamber like space in the valve. The actuation channel can assume a larger space and/or cross section than the channel in other parts of the actuation layer, for example a circular chamber.

Figure 3A:
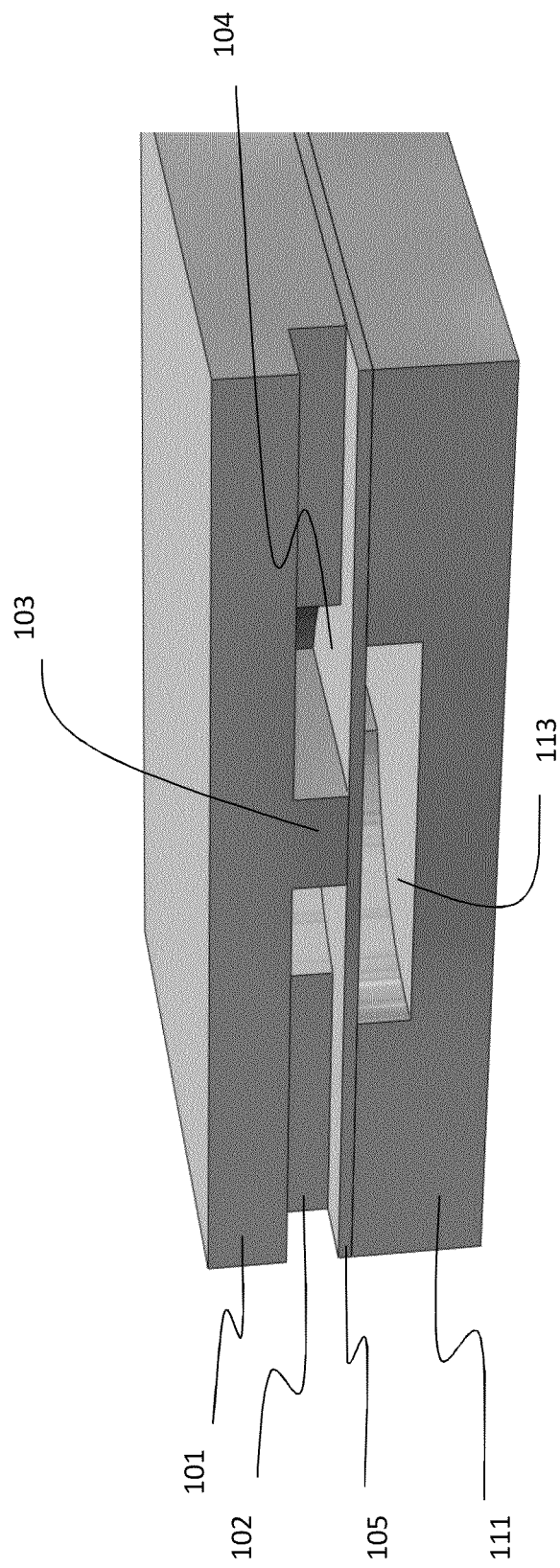
FIGS. 3A and 3B show a cross-section of a "three layer" diaphragm valve in closed (FIG. 3A) and open (FIG. 3B) configurations.
Figure 3B:
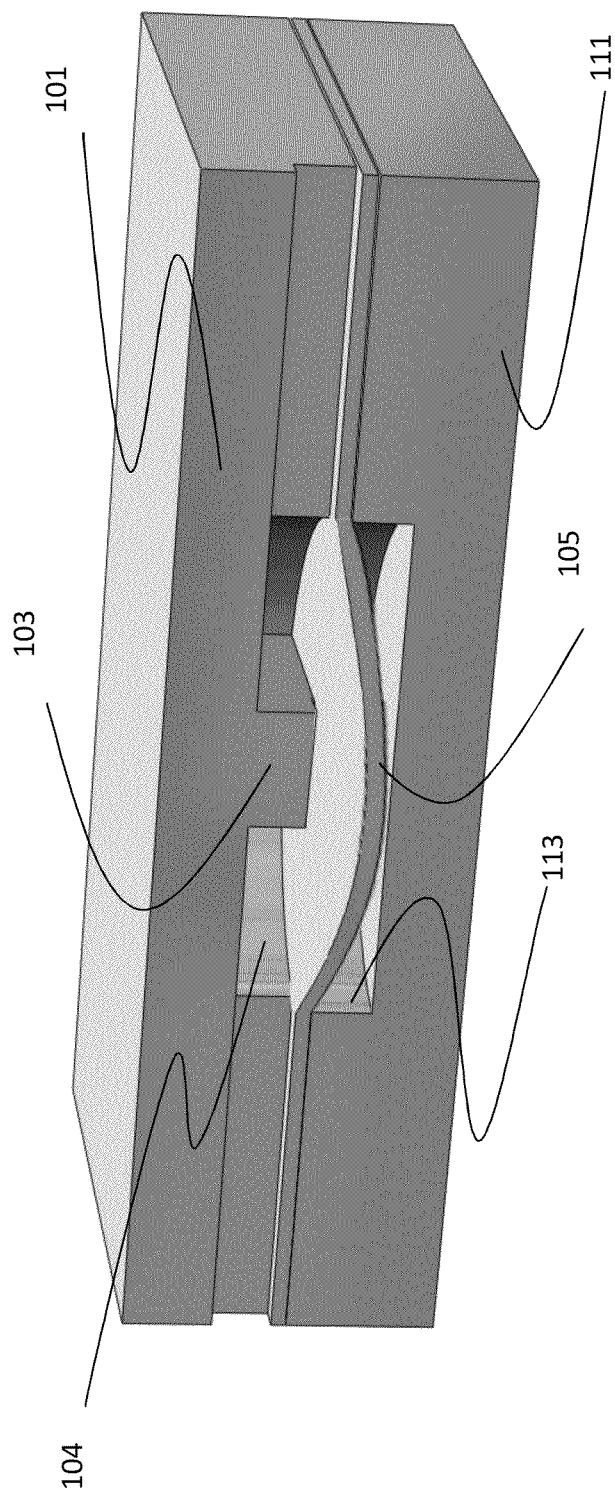
Figure 4A:
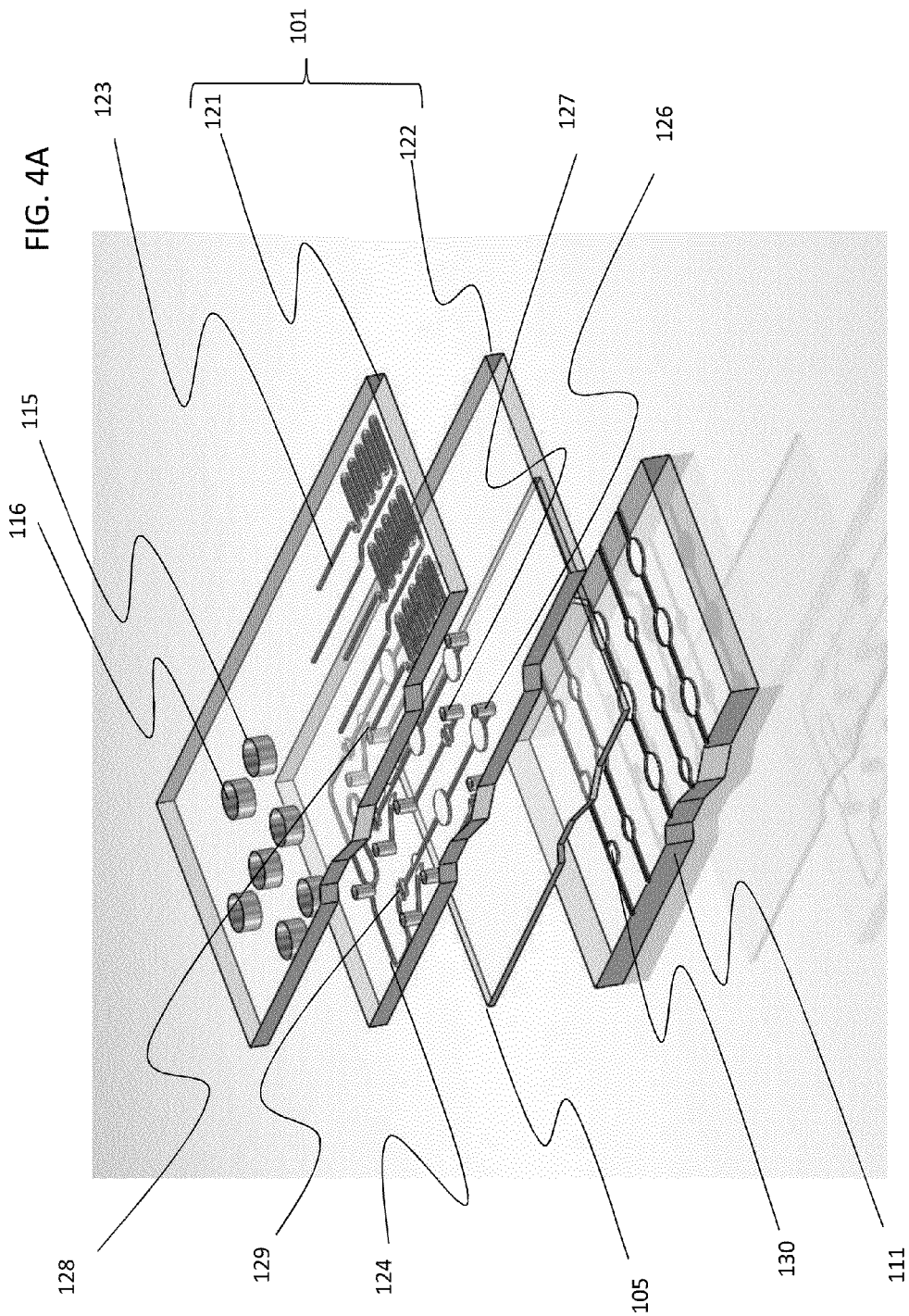
FIGS. 4A and 4B show a portion of a device in which the fluidics layer comprises a plurality of sublayers, in exploded and closed views. The top sublayer 121 is referred to as the "etch" layer and bottom sublayer 122 is referred to as the "via" layer. In this example the etch layer comprises grooves (e.g., 123 and 128) on the surface that faces the via layer to form a closed fluidic channel. The via layer comprises grooves (e.g., 124) on the surface that faces the elastic layer. When the elastic layer is bonded to or pressed against the via layer, it covers the channels and seals them against leakage. The via layer also includes vias (e.g., holes or bores) (e.g., 126 and 127) that traverse this sublayer and open onto the elastic layer on one side and the etch layer on the other. In this way, fluid traveling in a channel in the etch layer can flow into a conduit in the via layer that faces the elastic layer.
Figure 4B:
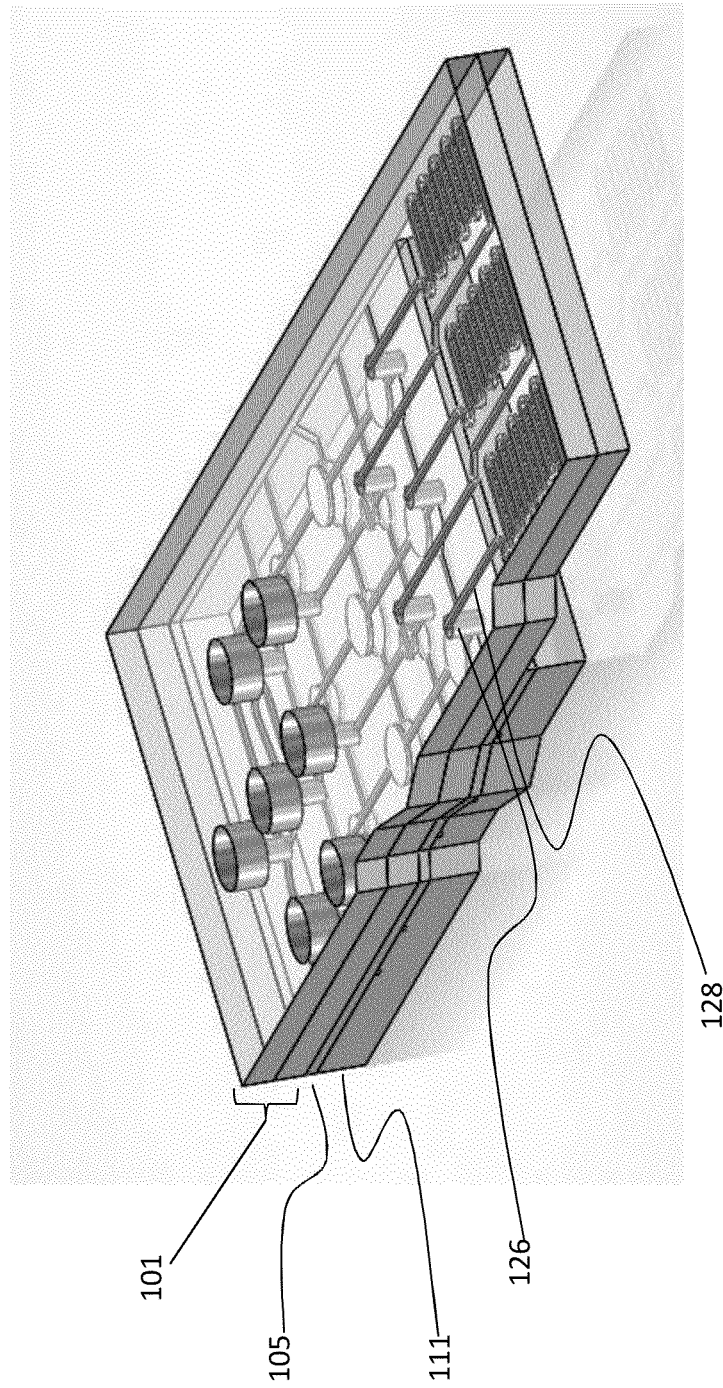
Figure 11:
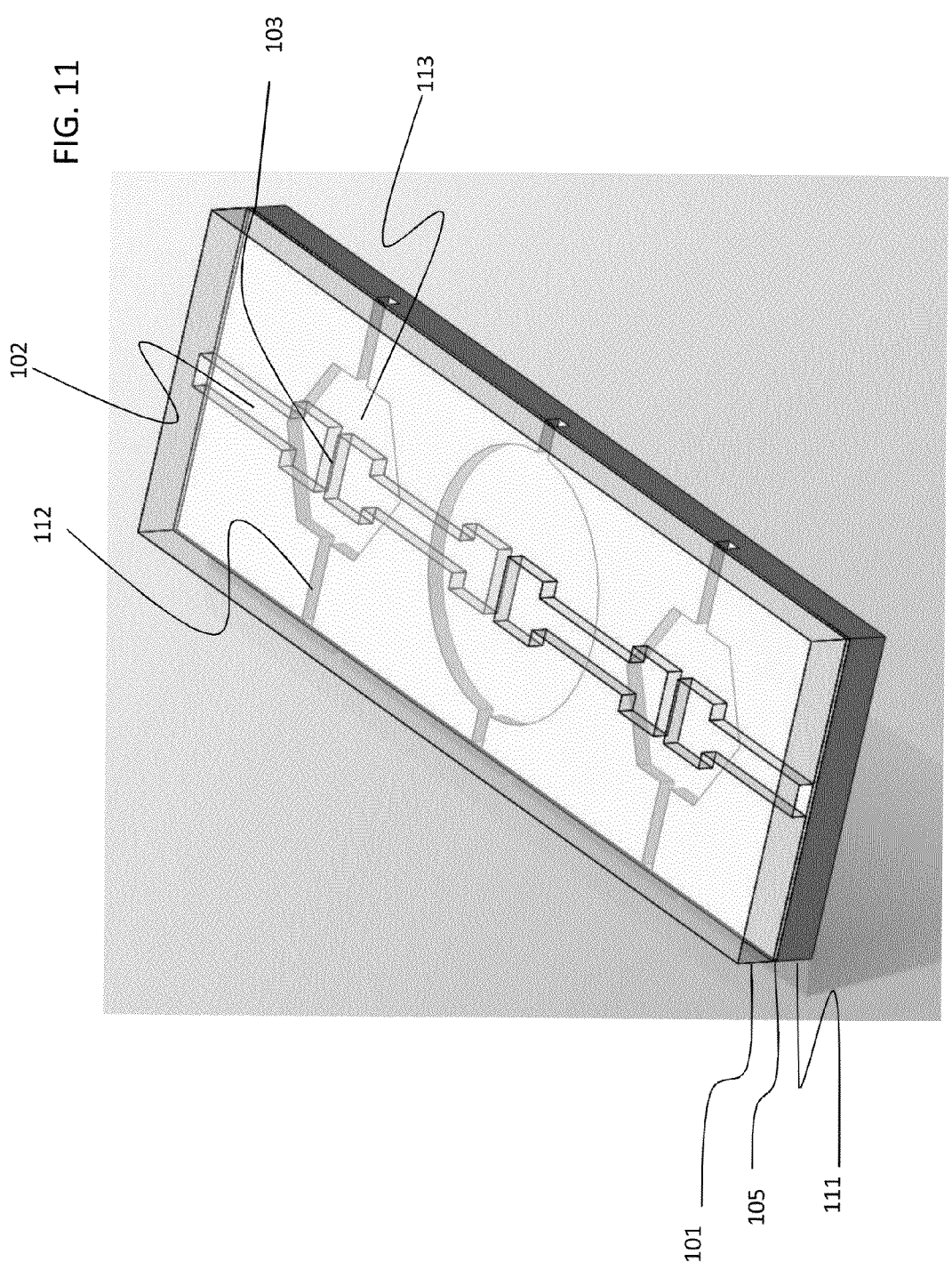
FIG. 11 shows a three-dimensional view of a device comprising three diaphragm valves in series forming a diaphragm pump.
Figure 12:
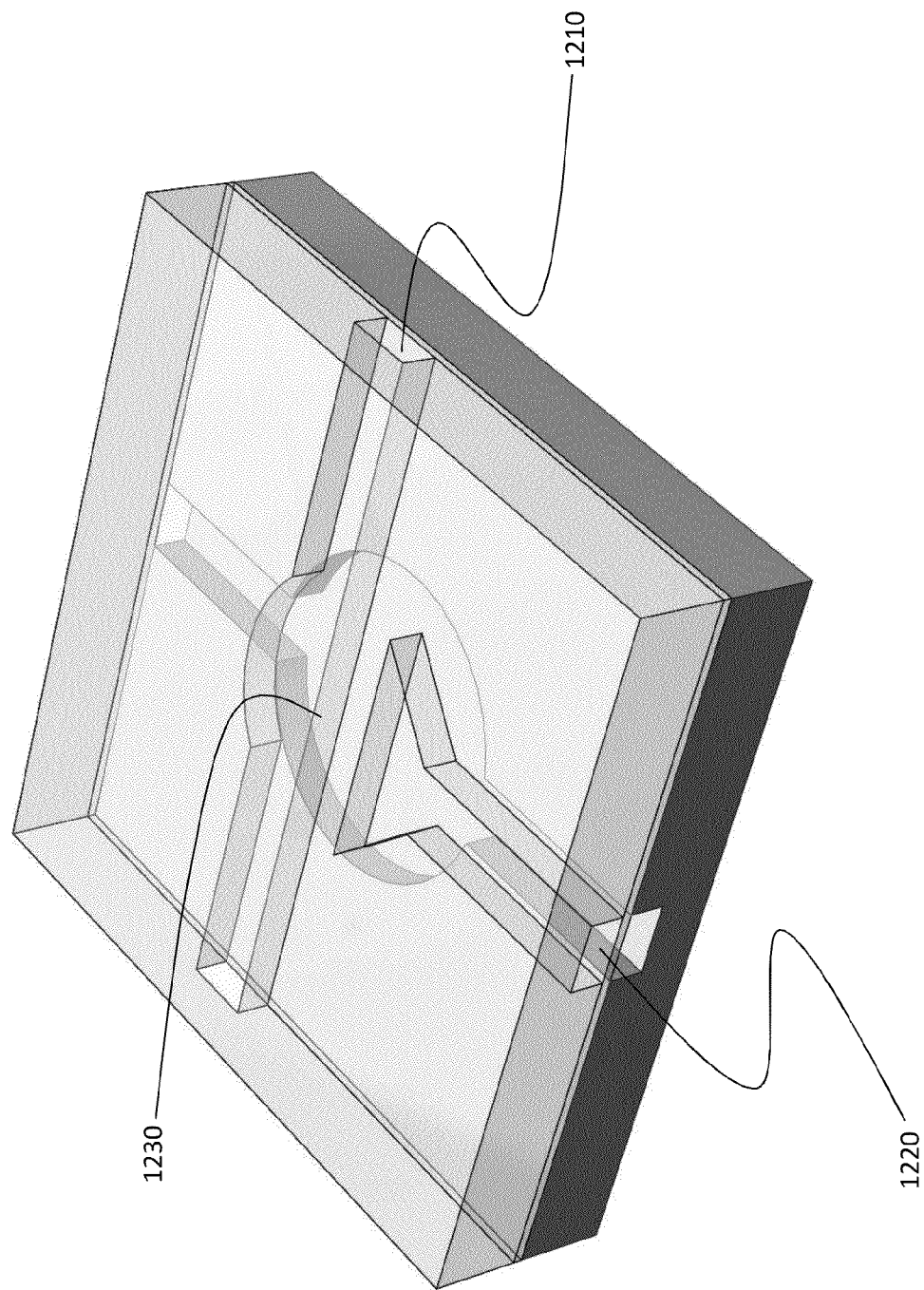
FIG. 12 shows a flow-through valve in which one channel 1210 is always open and communication with another channel 1220 is regulated by a valve. Flow-through channel 1210 intersects with intersecting channel 1220 at a junction where a flow-through valve 1230 is positioned.
Figure 13:
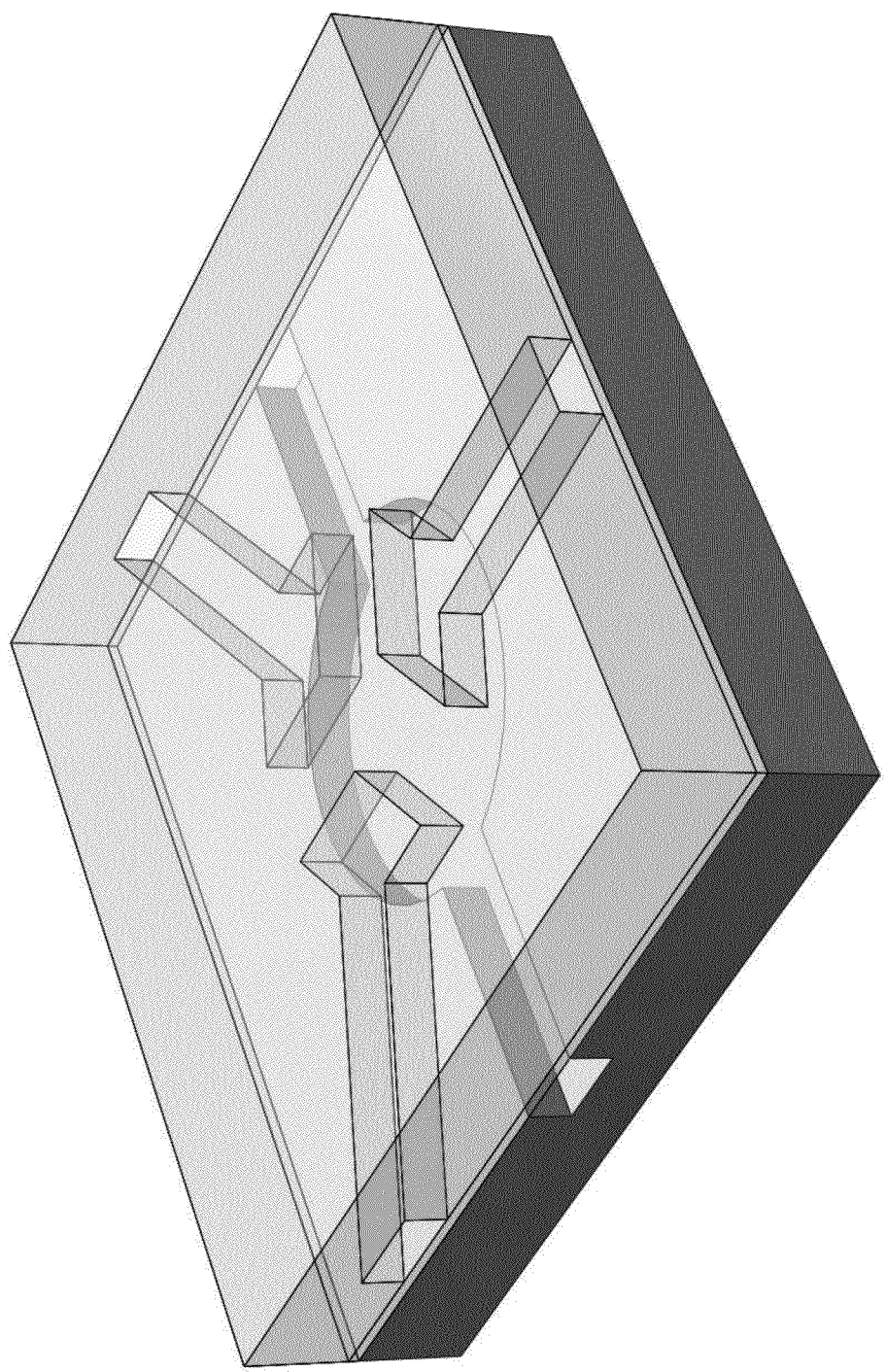
FIG. 13 shows three channels that are connected by a valve that, when closed, prevents or reduces fluid flow between all three channels and that, when open, allows fluid flow among the three channels.

FIG. 2 shows a three-dimensional view of a diaphragm valve. FIGS. 3A and 3B show a diaphragm valve in cross-section. In this case, the fluidics layer comprises channels that are formed in the surface of the fluidics layer and covered over by the elastic layer. FIG. 11 shows a three-dimensional view of a diaphragm pump formed from three diaphragm valves in series. FIGS. 4A and 4B depict a fluidics layer with internal channels that open onto the elastic layer through vias. FIG. 12 shows a flow-through valve comprising one channel that is always open and a channel that intersects in which fluid flow into the open channel is regulated by a diaphragm valve. FIG. 13 shows a valve having three inlet ports for three channels. Opening the valve allows fluid to flow from any two channels into the third channel or any one channel into the other two.

Referring to FIGS. 4A and 4B, fluidics layer 101, elastic layer 105 and actuation layer 111 are sandwiched together. Microfluidic channel 128 opens onto the elastic layer through a via 126. Valve seat 129 is in contact with the elastic layer, resulting in a closed valve. When the actuation layer is activated, the elastic layer 105 is deformed into the pneumatic chamber 130. This opens the valve, creating a path through which liquid can flow. The pressure in the pneumatic chamber relative to the microfluidic channel controls the position of the elastic layer. The elastic layer can be deformed toward the pneumatic chamber when the pressure is lower in the pneumatic chamber relative to the microfluidic channel. Alternatively, the elastic layer can be deformed toward the microfluidic channel when the pressure is lower in the microfluidic channel relative to the pneumatic chamber. When pressure is equal or approximately equal in the microfluidic channel and the pneumatic chamber, the valve can be in a closed position. This configuration can allow for complete contact between the seat and the elastic layer when the valve is closed. Alternatively, when pressure is equal or approximately equal in the microfluidic channel and the pneumatic chamber, the valve can be in an open position. The pneumatically actuated valves can be actuated using an inlet line that is under vacuum or under positive pressure. The vacuum can be approximately house vacuum or lower pressure than house vacuum, e.g., at least 15 inches Hg or at least 20 inches Hg. The positive pressure can be about 0, about 1, about 2, about 5, about 10, about 15, about 20, about 25, about 30, about 35, more than 35 psi or up to about 150 psi. The fluid for communicating pressure or vacuum from a source can be any fluid, such as a liquid or a gas. The gas can be air, nitrogen, or oxygen. The liquid can be any pneumatic or hydraulic fluid, including organic liquid or aqueous liquid, e.g., water, a perfluorinated liquid (e.g., Fluorinert), dioctyl sebacate (DOS) oil, monoplex DOS oil, silicon oil, hydraulic fluid oil or automobile transmission fluid.

Diaphragm micro-valves, micro-pumps, and micro-routers can combine a fluidic layer with a deformable membrane layer, such as polydimethyl siloxane (PDMS), that opens and closes the valve, and an actuation (e.g., pneumatic or hydraulic) layer to deform the membrane and actuate the valve. The fluidic layer can have multiple configurations. In some embodiments, an open channel, furrow or groove can be etched into the surface of one of the substrate layer. In other embodiments, the channel can be internal to the layer, e.g., in the form of a tunnel, tube or via. The fluidic channels etched in the top substrate layer can be discontinuous and lead to vias, or ports, in the second substrate layer that bridge opposing discontinuous channels at a nexus of the top substrate layer, wherein the vias act as valve seats. The elastic layer (e.g., PDMS) sits against the valve seat and normally closes the fluidic path between the two vias. On the opposite side of PDMS membrane, a pneumatic displacement chamber, formed by etching in the layer, is connected to a full-scale or smaller vacuum or pressure source.

By controlling a miniaturized off-chip solenoid, vacuum or pressure (approximately one-half atmosphere) can be applied to PDMS membrane to open or close the valve by simple deformation of the flexible membrane, e.g., application of vacuum to the membrane deflects the membrane away from a valve seat, thereby opening the valve.

Diaphragm valves of this invention can displace defined volumes of liquid. A diaphragm valve can displace a defined volume of liquid when the valve is moved into a closed or opened position. For example, a fluid contained within a diaphragm valve when the valve is opened is moved out of the diaphragm valve when the valve is closed. The fluid can be moved into a microchannel, a chamber, or other structure. The diaphragm valve can displace volumes that are about, up to about, less than about, or greater than about 1000, 750, 500, 400, 300, 200, 100, 50, 25, 20, 15, 10, 5, 4, 3, 2, 1, 0.5, 0.25, 0.1, 0.05 or 0.01 µL.

Variations on flow-through and in-line valves can include valves that are situated at intersections of greater than two, three, four, or more channels. Valve seats or other structures can be designed such that closure of the valve can prevent or reduce flow in one or more of the channels while allowing fluid to flow in one or more of the other channels. For example flow can be blocked along three of five channels, while flow can continue through two of the five channels. A flow-through valve can also be referred to as a T-valve, as described in U.S. application Ser. No. 12/026,510 and WO 2008/115626 (Jovanovich et al.).

When placed in a series of three, diaphragm valves can function as a diaphragm pump, which functions as a positive displacement pump. (See FIG. 11.) diaphragm pumps are self-priming and can be made by coordinating the operation of three valves (including but not limited to, 4, 5, 6, 7, 8, 9, 10, 11, 12, 13, 14, 15, 16, 17, 18, 19, or 20 or more valves), and can create flow in either direction. A variety of flow rates can be achieved by the timing of the actuation sequence, diaphragm size, altering channel widths, and other on-chip dimensions. Routers can similarly be formed from these valves and pumps. The routers can be formed using three or more valves each on a separate channel connecting to central diaphragm valve. A router also can be made by configuring three channels, each comprising a diaphragm pump, to meet in a common chamber, e.g. a pumping chamber. Bus structures can also be created.

Figure 5:
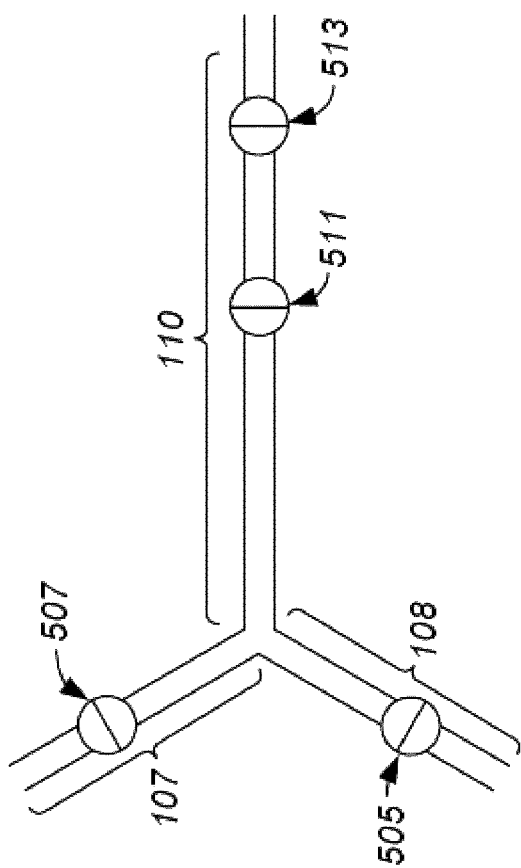
FIG. 5 shows an embodiment of a microfluidic circuit.

Examples of diaphragm valves placed along microfluidic channels are shown in FIG. 5, shows a first channel (107) and a second channel (108) that are fluidically connected to a mixing channel (110). A first in-line diaphragm valve (507) is placed along the first channel. A second in-line diaphragm valve (505) is placed along the second channel. Two in-line valves (511 and 513) are positioned along the mixing channel. A pump can be formed by three diaphragm valves that are positioned linearly along a flow path. For example, valves 507, 511, and 513 can form a first pump and valves 505, 511, and 513 can form a second pump. The centrally located valve, valve 511, can be the pumping valve. The pumping valve can have a desired stroke or displacement volume as described herein. The first pump can move liquids from the first channel to the mixing channel or vice-versa. The second pump can move liquids from the second channel to the mixing channel or vice-versa. The first pump can be operated while fluid flow in the second channel is blocked by closure of valve 505 or another valve positioned on the second channel or on other channels that are connected to the second channel.

Figure 6:
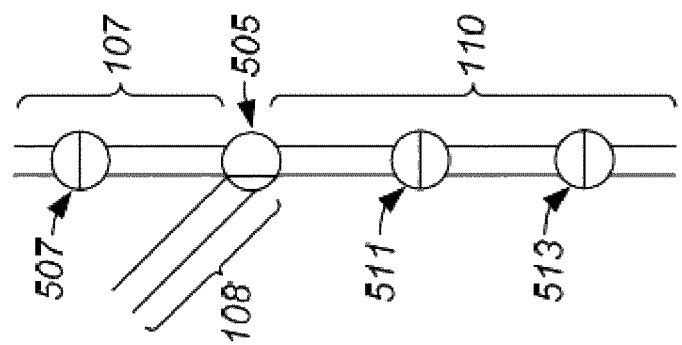
FIG. 6 shows an embodiment of a microfluidic circuit.

FIG. 6 shows a first channel 107 and a second channel 108 that are connected to a mixing channel 110. Flow through the first channel can be controlled by in-line valve 507 and flow through the second channel can be controlled by flow-through valve 505. Similar to as shown in FIG. 5, the mixing channel can have two in-line valves (511 and 513).

Figure 7:
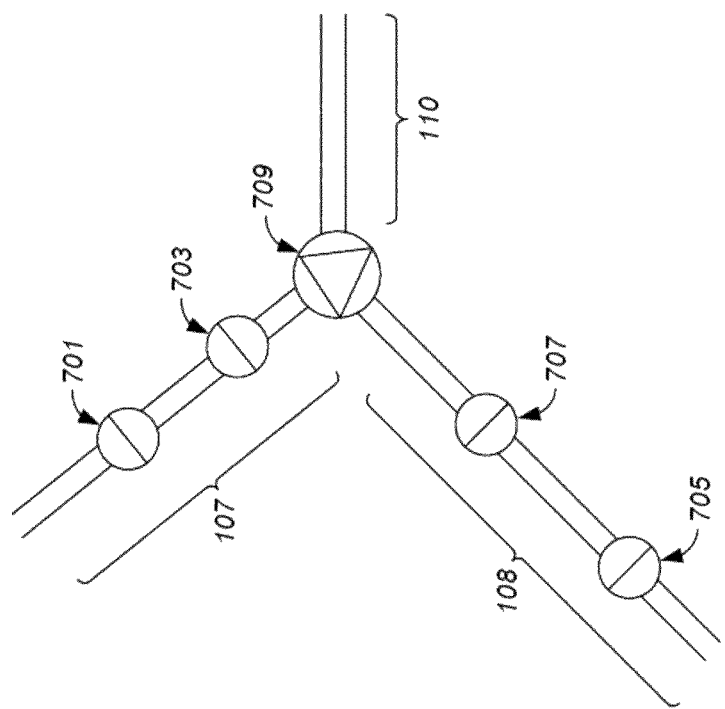
FIG. 7 shows an embodiment of a microfluidic circuit.

FIG. 7 shows an alternative arrangement of microfluidic valves positioned along three channels. The first channel 107 can have two in-line valves 701 and 703, and the second channel 108 can have two in-line valves 705 and 707. The first and second channel can be connected to a mixing channel 110. A junction valve 709 can be positioned at the intersection between the first channel, the second channel, and the mixing channel. Closure of the junction valve can prevent or reduce fluid flow in the first channel, the second channel, and the mixing channel. The junction valve 709 can have a seat that is triangular-shaped or shaped as shown in FIG. 13.

Figure 8:
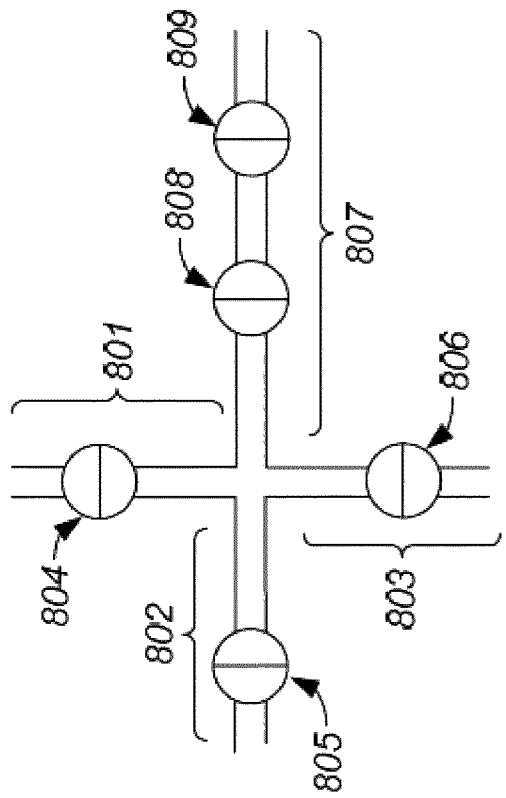
FIG. 8 shows an embodiment of a microfluidic circuit.

FIG. 8 shows a first channel 801, a second channel 805, and a third channel 803 that are connected to a mixing channel 807. The valves and channels can be operated in a similar manner as the valves and channels shown in FIG. 7. Referring to FIG. 8, fluid can be moved from the first channel to the mixing channel while preventing or reducing flow of fluid in the second channel and the third channel by closure of valve 805 and 803.

Figure 9:
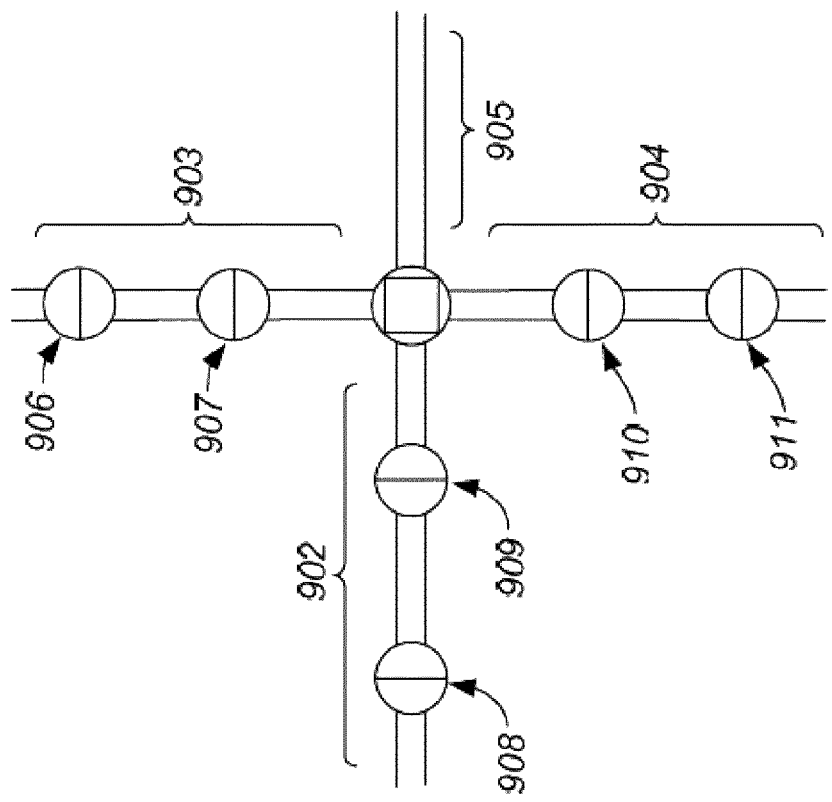
FIG. 9 shows an embodiment of a microfluidic circuit.

FIG. 9 shows a first channel 903, a second channel 902, a third channel, 904 connected to a mixing channel 905. A junction diaphragm valve can be positioned at the intersection between the first channel, the second channel, the third channel, and the mixing channel. The valves and channels can be operated in a similar manner as the valves and channels shown in FIG. 8.

Figure 10:
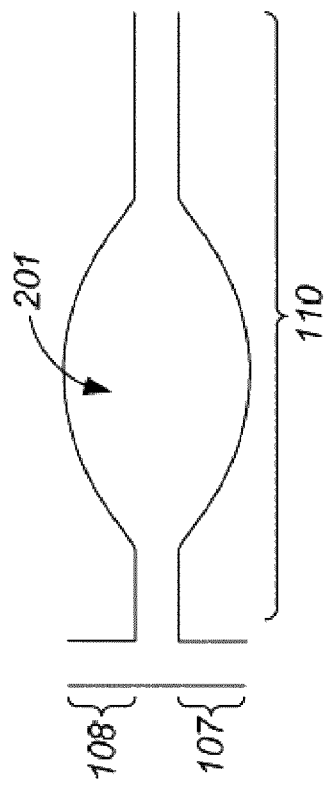
FIG. 10 shows an oval-shaped chamber.

As shown in FIG. 10, the mixing channel can have a chamber of variable cross-sectional area. The shape of the chamber can be oval 201, spherical, or rectangular. In some embodiments of the invention, the chamber can be irregularly shaped to improve mixing of fluids passing through the chamber. An elastic layer can form one wall of the chamber. The elastic layer can be deformed such that the volume of the chamber is variable. The elastic layer can be deformed at a rate such that mixing within the chamber is improved.

Using the diaphragm valves to pump fluids can move a bolus of liquid into a microchannel. In some embodiments of the invention, two different fluids can be pumped into a microchannel such that a bolus of a first fluid is layered against a bolus of a second fluid in the microchannel. The first fluid and the second fluid can be different fluids. The first fluid and the second fluid can comprise different components. The fluids can be a reagent solution and a sample solution. The reagent solution can be a solution containing magnetic or paramagnetic beads.

In some embodiments, the microfluidic chip devices herein include one or more reservoirs capable of containing a sample or a reagent (e.g., enzymes, labeled nucleotides, affinity reagents). The reservoir is preferably fluidly coupled to one or more of the microchannels or valves disclosed herein.

The ability to mix fluids on microchips and capillaries is disclosed. By actuating the proper combinations of valves, liquids from one of the channels or reservoirs can be drawn into the central diaphragm valve and expelled into a different channel to rout the liquid in a fluidic circuit. The liquids can comprise, without limitation, analytes, biological samples, chemical and biochemical reagents, buffers, binding moieties, beads, magnetic particles, detection moieties and other materials used in the performance of assays or biochemical or chemical reactions. In other embodiments, the fluid being pumped is a gas, such air.

The diaphragm valves, pumps, and routers are durable, easily fabricated at low cost, can operate in dense arrays, and have low dead volumes. Arrays of diaphragm valves, pumps, and routers are readily fabricated on microchips, such as NanoBioProcessor microchips. In one embodiment, all the diaphragm valves, pumps, and routers on a microchip are created at the same time in a simple manufacturing process using a single or monolithic membrane, such as a sheet of PDMS. It costs the same to make 5 diaphragm pumps on a chip as it does to create 500. This technology provides the ability to create complex micro- and nanofluidic circuits on microchips and integrate chemical and biochemical processes by using the circuits. Thus, the disclosure herein provides methods and the ability to create simple and complex micro-, nano-, and pico-fluidic circuits on chips, and allows the implementation of virtually any reaction or assay onto a chip. In general, this technology can be at least substantially insensitive to variations in solution ionic strength and surface contamination, and does not require applied electric fields.

Figure 14:
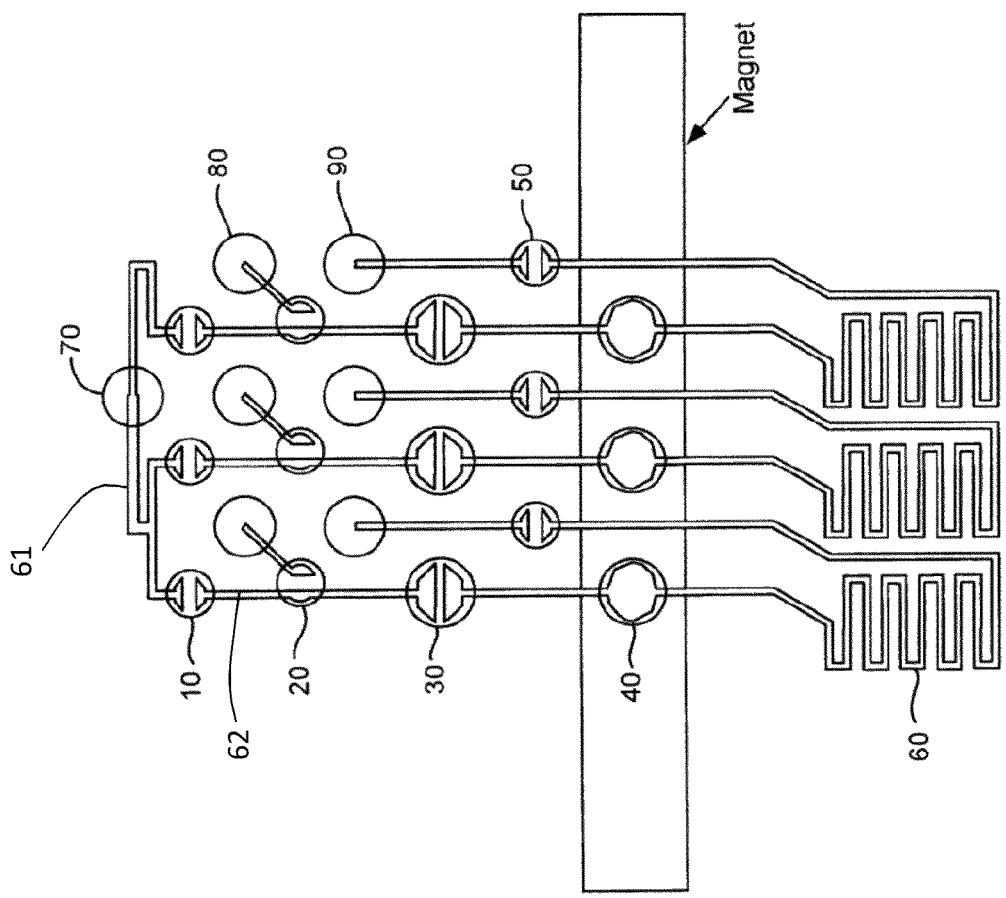
FIG. 14 shows the fluidic architecture for three microfluidic circuits connected by a common port 70.

A chip typically will comprise a plurality of fluidics circuits, each circuit comprising a microfluidic conduit in communication with external entry and exit ports. Circuits typically comprise channels and functional elements, such as valves, routers, pumps (e.g., three independently operable valves in series) and chambers. An exemplary schematic of the microfluidic circuits of the microfluidic device is shown in FIG. 14. This shows three circuits that share a common port, 70. The microfluidic circuits can move fluids from sample input areas or reservoirs 80, mix them with reagents or other materials at valve 20 and deliver them to other areas within the microfluidic chip device 30, 40, and 60. Two or three or more fluidic streams can be joined by configuration of the appropriate number of valves, pumps, and channels. The streams can contain samples, reagents, buffers, and other components. The microchannels 60, 61, 62 and ports 70 can be variable in width or height. In one embodiment, the samples and reagents are delivered to the serpentine channel 60 in an extended shelf region of the microchip for incubation and/or processing, and then returned to an output area in the microfluidics device 90 through a gated valve 50. The processed sample can also be moved to a region for removal of an analyte or other component, such as magnetic beads in area 40. The individual fluid streams can be moved by pumps comprising three or more valves including diaphragm valves or other valves such as 10, 20, 30, 40, and 50. The valves can be created actuation of a deformable structure, changes in temperature, pressure. Two or more streams can be combined using diaphragm and other microvalves.

In one embodiment the diaphragm valves are self priming and are under computer control; they may be driven in either direction and the same circuit can be used to split a sample into two streams by simply running the two co joined pumps to move samples to two areas within the microfluidic chip device or to form an archival sample.

In certain embodiments, the microfluidic devices of this invention are monolithic devices. In monolithic devices, a plurality of circuits are provides on a single substrate. In the case of devices comprising diaphragm valves, a monolithic device comprises a single elastic layer functioning as a diaphragm for a plurality of valves. In certain embodiments, one actuation channel can operate a plurality of valves on a monolithic device. This allows parallel activation of many fluidic circuits. Monolithic devices can have dense arrays of microfluidic circuits. These circuits function with high reliability, in part because the channels in each circuit are fabricated simultaneously on a single substrate, rather than being made independently and assembled together.

Figure 15:
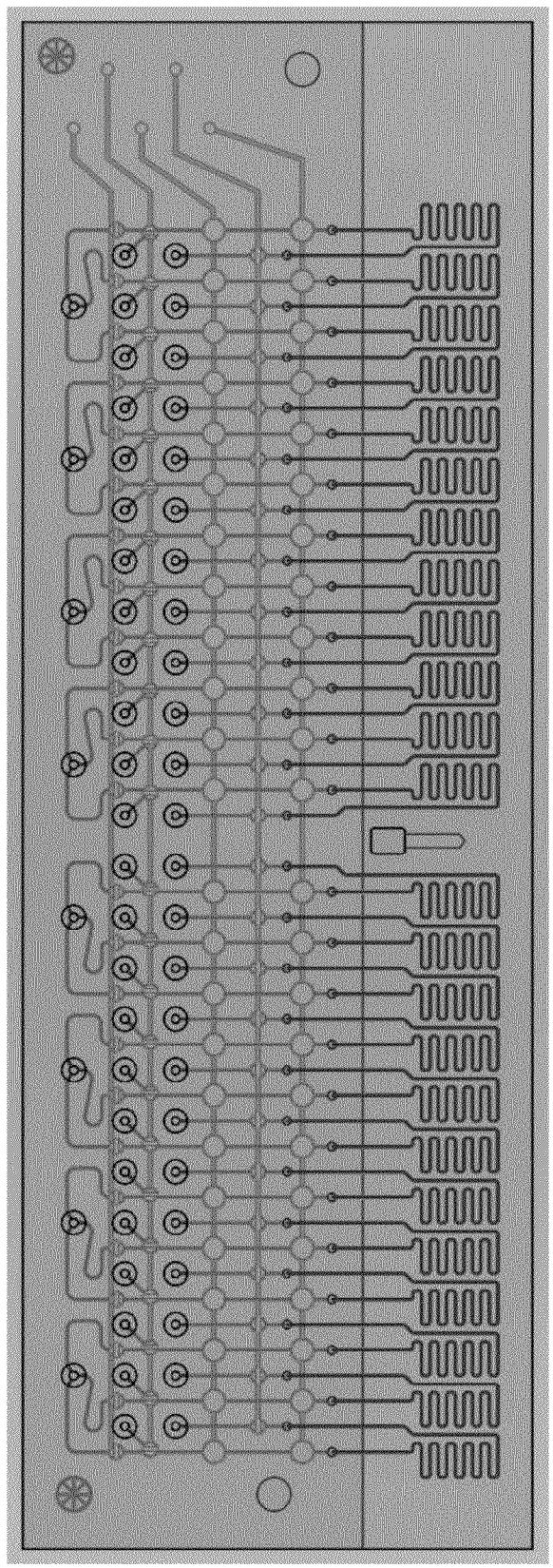
FIG. 15 shows a collection of the circuits of FIG. 14 assembled on a device comprising a total of 24 microfluidic circuits.

In certain embodiments, the chip comprises a plurality of parallel circuits. Such an embodiment is shown in FIG. 15, which illustrates a microfluidics chip configured for 24 samples, and has an array of 24 fluidic circuits arranged in a serpentine pattern on the extended shelf portion of the microfluidic chip device.

The fluidic circuits and actuation circuits of these chips are densely packed. A circuit comprises an open or closed conduit. In certain embodiments, the device can comprise at least 1 fluidic circuit per 1000 $mm^2$, at least 2 fluidic circuits per 1000 $mm^2$, at least 5 fluidic circuits per 1000 $mm^2$, at least 10 fluidic circuits per 1000 $mm^2$, at least 20 fluidic circuits per 1000 $mm^2$, at least 50 fluidic circuits per 1000 $mm^2$. Alternatively, the device can comprise at least 1 mm of channel length per 10 $mm^2$ area, at least 5 mm channel length per 10 $mm^2$, at least 10 mm of channel length per 10 $mm^2$ or at least 20 mm channel length per 10 $mm^2$. Alternatively, the device can comprise valves (either seated or unseated) at a density of at least 1 valve per $cm^2$, at least 4 valves per $cm^2$, or at least 10 valves per $cm^2$. Alternatively, the device can comprise features, such as channels, that are no more than 5 mm apart edge-to-edge, no more than 2 mm apart, no more than 1 mm apart, no more than 500 microns apart or no more than 250 microns apart.

In other embodiments, the device can comprise at most 1 fluidic circuit per 1000 $mm^2$, at most 2 fluidic circuits per 1000 $mm^2$, at most 5 fluidic circuits per 1000 $mm^2$, at most 10 fluidic circuits per 1000 $mm^2$, at most 20 fluidic circuits per 1000 $mm^2$, at most 50 fluidic circuits per 1000 $mm^2$. Alternatively, the device can comprise at most 1 mm of conduit length per 10 $mm^2$ area, at most 5 mm conduit length per 10 $mm^2$, at most 10 mm of conduit length per 10 $mm^2$ or at most 20 mm conduit length per 10 $mm^2$. Alternatively, the device can comprise valves (either seated or unseated) at a density of at most 1 valves per $cm^2$, at most 4 valves per $cm^2$, or at most 10 valves per $cm^2$. Alternatively, the device can comprise features, such as channels, that are no less than 5 mm apart edge-to-edge, no less than 2 mm apart, no less than 1 mm apart, no less than 500 microns apart or no less than 100 microns apart.

3. Methods of Making Devices Comprising a Plastic Substrate Having a Surface Coating Bonded to Substrate Having a Surface with Reactive Groups The devices of this invention comprise a first plastic substrate (e.g., an article or a layer) having a surface coated with a material having reactive groups or on which reactive groups can be introduced for covalent bonding with another material. The material can be a hydroxyl-generating material, that is, a material onto which hydroxyl groups can be introduced, for example by exposure to energy and an environment comprising oxygen gas. Such articles can be covalently bonded to a second substrate having surface hydroxyl groups, e.g., silanol groups, through ether bonds, e.g., siloxy (Si—O—X) bonds, between the surface material and the opposing surface. If both surfaces comprise silanol groups, then the bonds can be siloxane (Si—O—Si) bonds. In certain embodiments, the surface of the plastic article comprises at least one or a plurality of selected locations (e.g., a pattern) at which the plastic article is not bonded to the second substrate, for example, wherein the material on the surface of the plastic article has been treated to render the surface free of reactive groups with which to engage in binding to the surface of the second substrate. In certain embodiments, the article comprises a third substrate bonded to a second surface of the second substrate. The third substrate can comprise a plastic comprising a material or can be another material having surface reactive groups, such as hydroxyl groups, through which the third substrate is chemically bound to the second substrate.

All or part of an exposed or functional surface of a device of this invention can be a non-adhered selected location, e.g., by rendering it un-reactive with the second substrate. In certain embodiments, any surface likely to come into contact with an elastic layer during operation of a fluidic device can be a non-adhered selected location. For example, all or part of the surface of the valve seat is a non-adhered selected location. In this way, a valve is less likely to become stuck shut during manufacture or use thus producing a more reliable valve and device. Also, all or part of any other exposed surface in a valve or pump body also can be made unreactive with second substrate, including the all or part of the chambers in the actuation layer or the fluidics layer that form a valve body. In particular, surfaces of an actuation valve body can be non-adhered selected locations. All or part of fluidic or actuation channels that are exposed to the surface also can be configured to be non-adhered selected locations. The portions of the exposed fluidic or actuation surfaces can be configured to be unreactive with the second substrate enables selective bonding of the second substrate, e.g., an elastomer, to areas of a valve.

The devices of this invention have very low failure rates. A chip is considered to fail when at least one fluidic circuit fails to perform. Failure can result from delamination of the sandwich, for example when bonding between the layers fail, or from sticking of the elastic layer to functional portions of the fluidics or elastic layers, such as sticking to valve seats, valve chambers or channels on the layer surface that are exposed to the elastic layer.

The devices of this invention can perform more high reliability. A batch of chips according to this invention have failure rates of less than 20%, less than 10%, less than 1% or less than 0.1%. Valves of this invention can have a failure rate of less than 1% over 1,000 actuations, 10,000 actuations or 100,000 actuations. A batch can be at least 10, at least 50 or at least 100 devices.

3.1. Plastic Articles

Articles and devices of this invention comprise a plastic layer or article comprising a plastic substrate comprising a coating of a material comprising reactive groups or onto which reactive groups can be introduced. The coating initially can be applied to cover all or part of a bonding surface of the plastic substrate. In certain embodiments, the material will be removed or otherwise rendered unavailable for binding with a surface of a second article to create a selected location.

3.1.1. Plastic Substrates

The plastic layer, e.g., fluidics and/or actuation layers, of the device may be made out of any plastic. This includes, without limitation, a polycarbonate, an olefin co-polymer, a cycloolefin polymer ("COP") (e.g., Zeonor), a cycloolefin co-polymer ("COC") (e.g., Topaz™), an acrylic, a liquid crystal polymer, polymethylmethoxyacrylate (PMMA), a polystyrene, a polypropylene, and a polythiol. In certain fluidic devices of this invention, the plastic substrate can be a flat and/or rigid object having a thickness of about 0.1 mm or more, e.g., about 0.25 mm to about 5 mm. In certain microfluidic devices of this invention that comprise a flexible diaphragm layer, the fluidics and actuation layers are more rigid than the elastic layer.

In some embodiments the surface of the plastic substrate that is to be bonded with the second layer comprises a pattern of functional elements. Features can be introduced onto mating surfaces of plastic substrates in a number of ways. Hot embossing, laser cutting and injection molding are useful. Plastic substrates can be made out of plastic using a hot embossing technique. The structures are embossed into a surface of the plastic. This surface may then be mated with an elastic layer or with another plastic layer in configurations in which the fluidic layer comprises channels and vias in a plurality of stacked layers. Injection molding is another approach that can be used to create a plastic substrate. Injection molding is particularly useful for plastics such as COC, COP and polycarbonates. Soft lithography may also be utilized to create functional elements, e.g., conduits and interruptions. Such a structure can be bonded to another substrate to create closed conduits. Yet another approach involves the use of epoxy casting techniques to create the obstacles through the use of UV or temperature curable epoxy on a master that has the negative replica of the intended structure. Laser or other types of micromachining approaches (ablation) may also be utilized to create the flow chamber. Laser cutting using a $CO_2$ laser is a cost-effective way of making devices from acrylics. Other suitable polymers that may be used in the fabrication of the device are polycarbonate, polyethylene, and poly(methyl methacrylate). In addition, metals like steel, bronze, nickel and nickel-cobalt alloys may also be used to fabricate the master of the device of the invention, e.g., by traditional metal machining. Three-dimensional fabrication techniques (e.g., stereolithography) may be employed to fabricate a device in one piece. Other methods for fabrication are known in the art.

The microfluidic device typically comprises multiple microchannels and vias that can be designed and configured to manipulate samples and reagents for a given process or assay. In some embodiments the microchannels have the same width and depth. In other embodiments the microchannels have different widths and depths. In another embodiment a microchannel has a width equal to or larger than the largest analyte (such as the largest cell) separated from the sample. For example, in some embodiments, a microchannel in a microfluidics chip device can have a width greater than 50, 60, 70, 80, 90, 100, 110, 120, 130, 140, 150, or 300 microns. In some embodiments, a microchannel has a width of up to or less than 100, 90, 80, 70, 60, 50, 40, 30 or 20 microns. In some embodiments a microchannel in a microstructure can have a depth greater than 50, 60, 70, 80, 90, 100, 110, 120, 130, 140 or 150 microns. In some embodiments, a microchannel has a depth of up to or less than 100, 90, 80, 70, 60, 50, 40, 30 or 20 microns. In some embodiments a microchannel has side walls that are parallel to each other. In some other embodiments a microchannel has a top and bottom that are parallel to each other. In some other embodiments a microchannel comprises regions with different cross sections. In some embodiments, a microchannel has a cross section in the shape of a cheese wedge, wherein the pointed end of the wedge is directed downstream.

3.1.2. Coatings

The plastic can be coated with a material comprising available reactive groups. In particular, the reactive groups can be hydroxyl groups, such as silanol groups. Materials on which hydroxyls can be introduced include, without limitation, siloxanes and oxides.

3.1.2.1. Siloxane Coatings

The plastic can be coated with a siloxane, e.g., a polysiloxane. Such materials are commercially available. Silane coatings are described, for example, in U.S. Pat. Nos. 4,113,665 (Law et al.); 4,847,120 (Gent); 5,275,645 (Ternoir et al.) and 6,432,191 (Schutt). Scratch-resistant coatings used in optical applications are useful. Commercially available materials include, for example, 3M 906 Abrasion Resistant Coating (3M®), Duravue (TSP, Inc., Batavia Ohio), PSX (Coatings West, Brea, Calif.) and GR-653LP (Techneglas, Perrysberg, Ohio). Silicones from Momentive Performance Materials are useful coatings. SHC 5020 is particularly useful for acrylics and PHC 587 is particularly useful for polycarbonates and COC. These coatings can be applied to plastic by well known methods such as dipping, spraying, etc.

Plastics coated with such materials are commercially available. They include, for example, Acrylite AR® (Evonik Industries) which uses 3M 906, and TEC-2000 (ACP Noxtat, Santa Ana, Calif.).

Another silane-based coating useful in this invention is described in US 2009/0269504 (Liao, Oct. 29, 2009). The method involves (a) providing a dual curable organosilane possessing a UV curable group, a thermally curable silane group, and a bridging group having at least two carbon atoms connecting the UV curable group and the thermally curable silane group; (b) carrying out acid hydrolysis of the dual curable organosilane in the presence of water and a solvent to convert the silane group to a corresponding silanol group to provide an organosilanol; (c) condensing no more than a portion of the silanol groups of step (b) with —OH groups present on the surface of the silica particles to covalently bond the organosilanol with the silica; (d) combining a photoinitiator and a thermal curing catalyst with the organosilanol resulting from the condensing step (c) to provide a fluid coating mixture; (e) applying the fluid coating mixture to a substrate; (f) drying the coating mixture; (g) subjecting the dried coating mixture to UV radiation to crosslink the UV curable groups of the organosilanol to provide a hard coat having sufficient flexibility to permit forming of the coated substrate without damage to the hard coat; and (h) heating the coated substrate of step to a temperature sufficient to bring about condensation of uncondensed silanol groups to provide a fully cured hard coat.

A method of bonding PDMS to substrates useful in this invention is described in WO 2010/042784 (Lee et al., Apr. 15, 2010). The method involves associating a molecule comprising at least two silane-derivative groups with a first surface, e.g., a plastic, and contacting with a second surface, e.g., a flexible elastomer such as PDMS.

3.1.2.2. Oxide Coating

The plastic substrate can be coated with oxide before or after creation of any functional surfaces in the plastic, so long as that process is compatible with providing a plastic layer comprising an oxide surface for bonding with the second article. The oxide can be a metal oxide, for example, aluminum oxide or titanium oxide. In another embodiment, a layer of plastic can be adhered to a layer of metal foil, e.g., an aluminum foil. Surfaces of such metal foils oxidize on exposure to air, creating a coating of a metal oxide. This process can be accelerated by heating and/or exposure to increased concentrations of oxygen. The metal foil can have a thickness of about 10 nm to about 0.1 mm.

The metal oxide can be applied to a surface already coated with another material, such as a refractory metal that facilitates adhesion of the metal oxide to the surface. Refractory metals include, for example, chromium, titanium, tungsten, molybdenum, niobium, tantalum and rhenium. The chromium layer need only be thick enough to allow the metal to adhere, for example, between 25 Angstroms and 1000 Angstroms, e.g., between about 25 Angstroms and 520 Angstroms, e.g., around 30 Angstroms, or around 100 Angstroms. The metal oxide layer also can be thin enough to just cover the surface and provide sufficient hydroxyls for bonding. Thus, the metal oxide layer can be between 25 Angstroms and 1000 Angstroms, e.g., around 30 Angstroms, or around 100 Angstroms. The metal can be applied by sputtering, evaporation, or atomic layer deposition using a shadow mask that exposes the surfaces to be coated, or by other techniques. Sputtering can use, for example, Rf or DC energy. So, for example, a 30 Angstrom layer of chromium can be applied to selective surfaces, followed by a 30 Angstrom layer of titanium oxide.

The oxide can comprise a layer of a semiconductor oxide, for example, silicon oxide or germanium oxide deposited on a substrate. Alternatively, the substrate can be a silicon or germanium material (e.g., a silicon wafer or a germanium wafer), the surface of which comprises the semiconductor oxide.

Oxide can be deposited on the plastic substrate by a number of different methods known in the art. Certain of these methods are particularly compatible with producing a patterned substrate in which selected locations are not coated with the oxide. The surface of the plastic can be prepared for example by cleaning with oxygen plasma or any method of cleaning a plastic surface known in the art.

3.1.3. Coating Methodologies

A non-exhaustive list of coating methodologies follows.

3.1.3.1. Chemical Vapor Deposition (CVD)

One way to provide a material on a plastic substrate is to deposit the material with a chemical vapor deposition (CVD) system, e.g., by diffusion of the vapor into exposed compartments.

3.1.3.2. Plasma Enhanced Chemical Vapor Deposition (PECVD)

A material can be deposited by plasma-enhanced chemical vapor deposition processes (PECVD). The chamber is evacuated to a few millitorr. A gas of the coating material is introduced into the reactor. The gas is exposed to an electrical discharge, such as DC, AC or radio frequency. This ionizes the gas into a plasma and reforms on the exposed surface.

3.1.3.3. Physical Vapor Deposition (PVD) (Sputtering or Evaporation)

In another method, the coating material and the surfaces to be coated can be placed in a chamber. The coating material, e.g. an oxidizable metal, e.g., titanium, is bombarded with an inert gas, such as argon. The released material coats the surface, e.g. to a thickness of about 100 A to 500 A. In a further step, the coating is oxidized using an argon/air sputter etch. This produces a metal oxide layer on the surface.

3.1.3.4. Application of Liquid

Another method to coat surfaces involves applying a liquid comprising the coating material over the surface, e.g., by flowing or dipping.

3.1.3.5. Atomic Layer Deposition (ALD)

In atomic layer deposition, thin film of a material is applied through a series of cycles. Each cycle comprises a series of steps in which the surface is exposed to chemical. The steps result in a reaction that forms the desired material. For example, an aluminum oxide ($Al_2O_3$) or titanium oxide coating can be laid down by exposing a surface to multiple cycles of exposure to trimethyl aluminum followed by exposure to water.

3.1.4. Selected Locations

Generally, selected locations at which the surface of the plastic article will not bind to the second substrate are created by treating selected locations. Also, the material can be laid down over surfaces while the selected locations are protected from covering. Three methods to create selected locations include lift-off processes, ablation and covering the material. Alternatively, these processes can be carried out after hydroxyl groups are introduced onto the surface of the material.

3.1.4.1 Lift-Off Processes Using Photoresist Patterned Masks

Figure 16A:
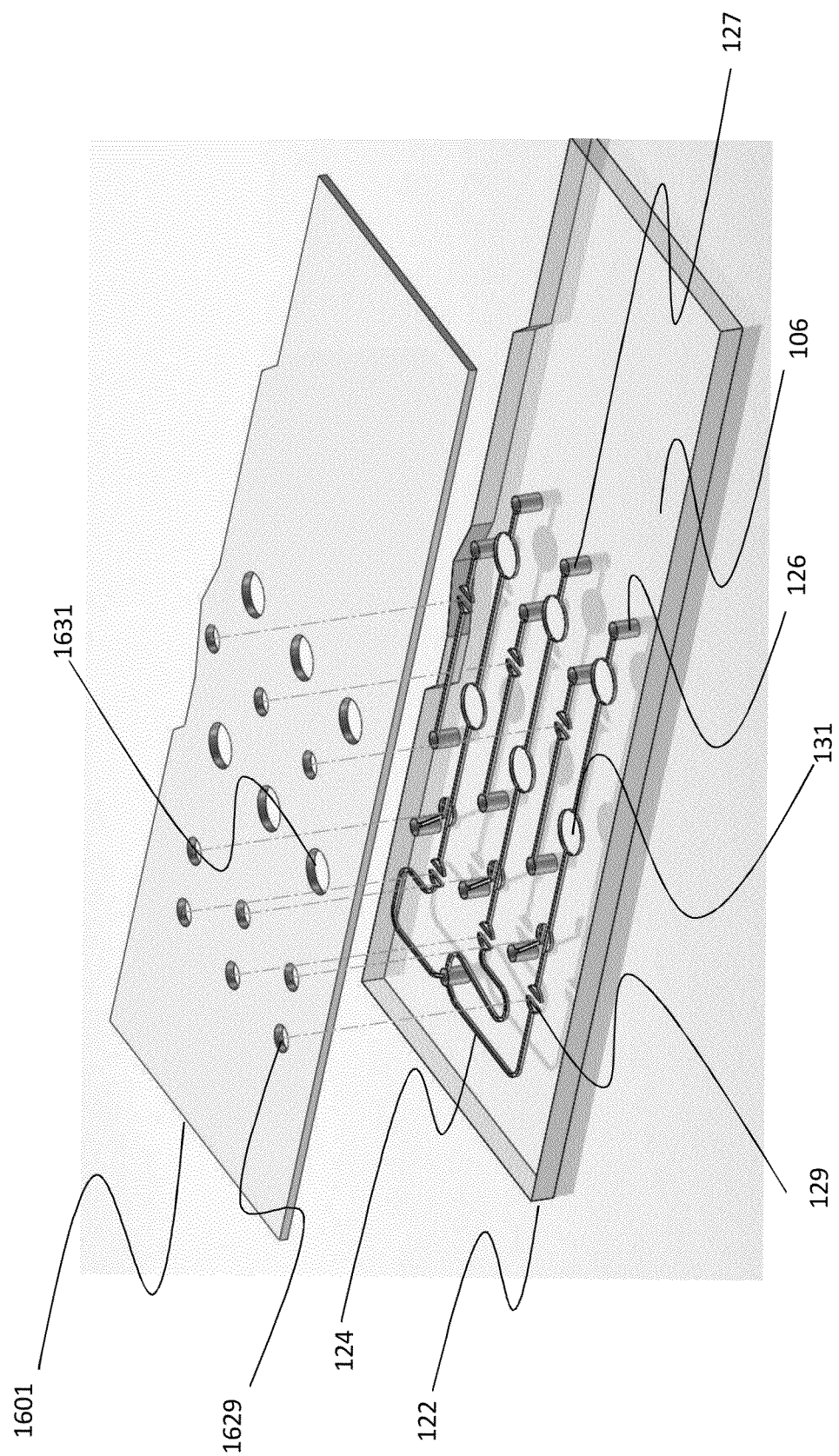
FIGS. 16A and 16B shows a fluidics layer comprising a plurality of fluidic circuits and valve seats that interrupt the circuits, and a shadow mask comprising openings over valve seats to allow deposition of a removable material, e.g., a photoresist, in exploded and closed configurations. For example, hole 1629 is aligned with valve 129 and hole 1631 is aligned with valve 131.
Figure 16B:
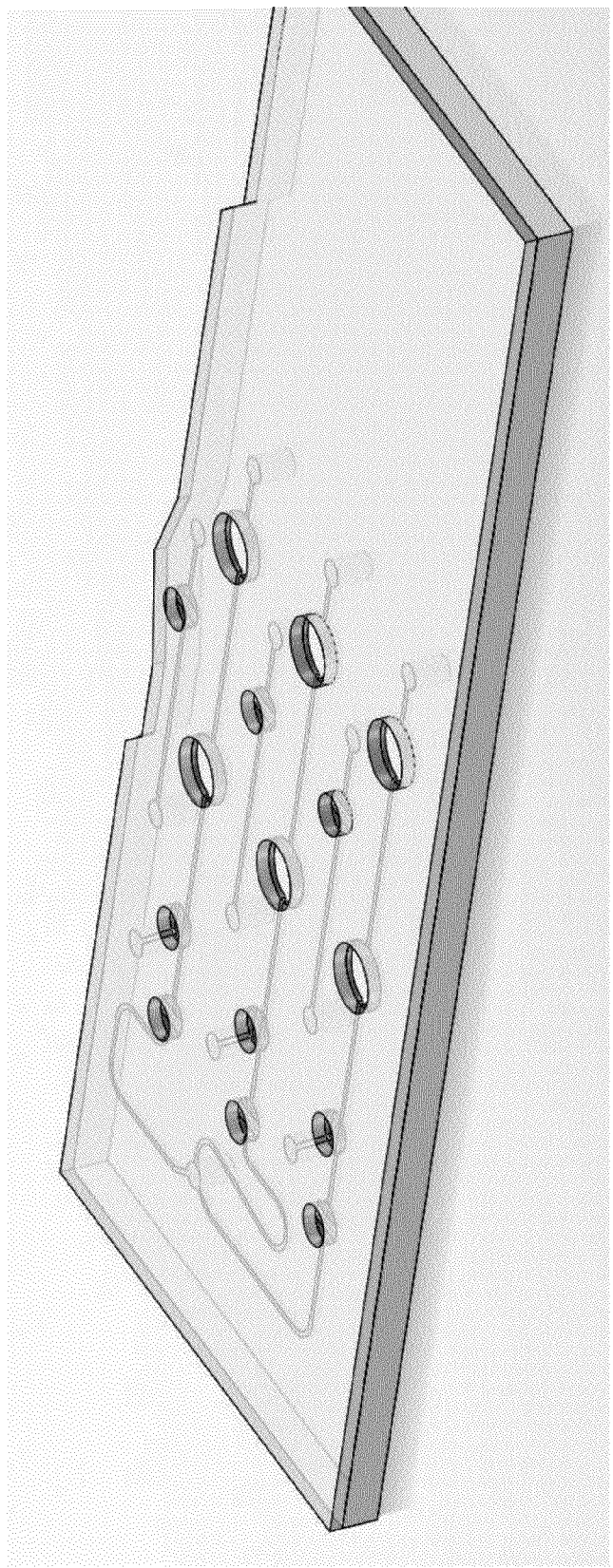
Figure 17A:
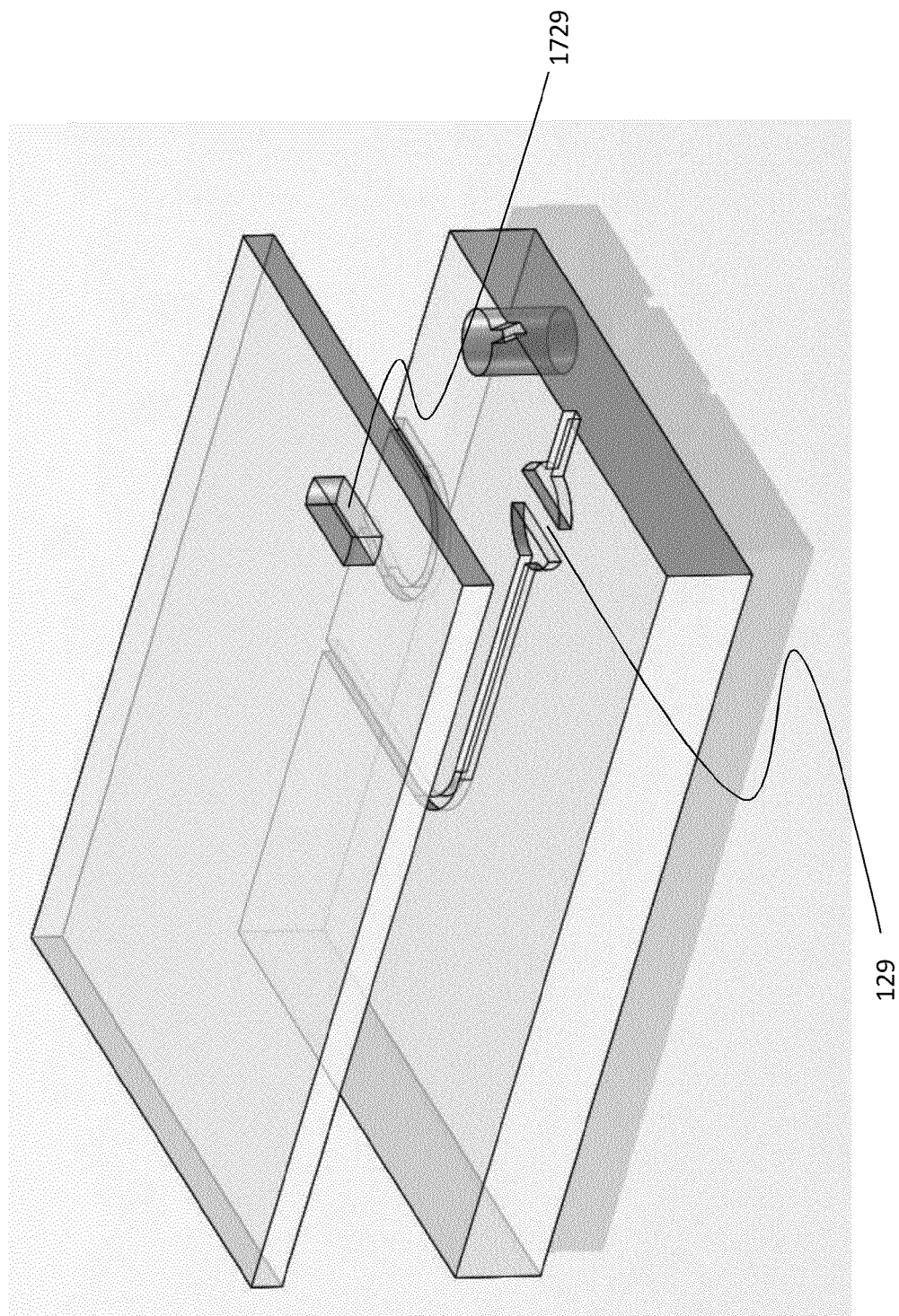
FIGS. 17A and 17B show a shadow mask comprising a hole 1729 that matches the valve seat only of valve 129.
Figure 17B:
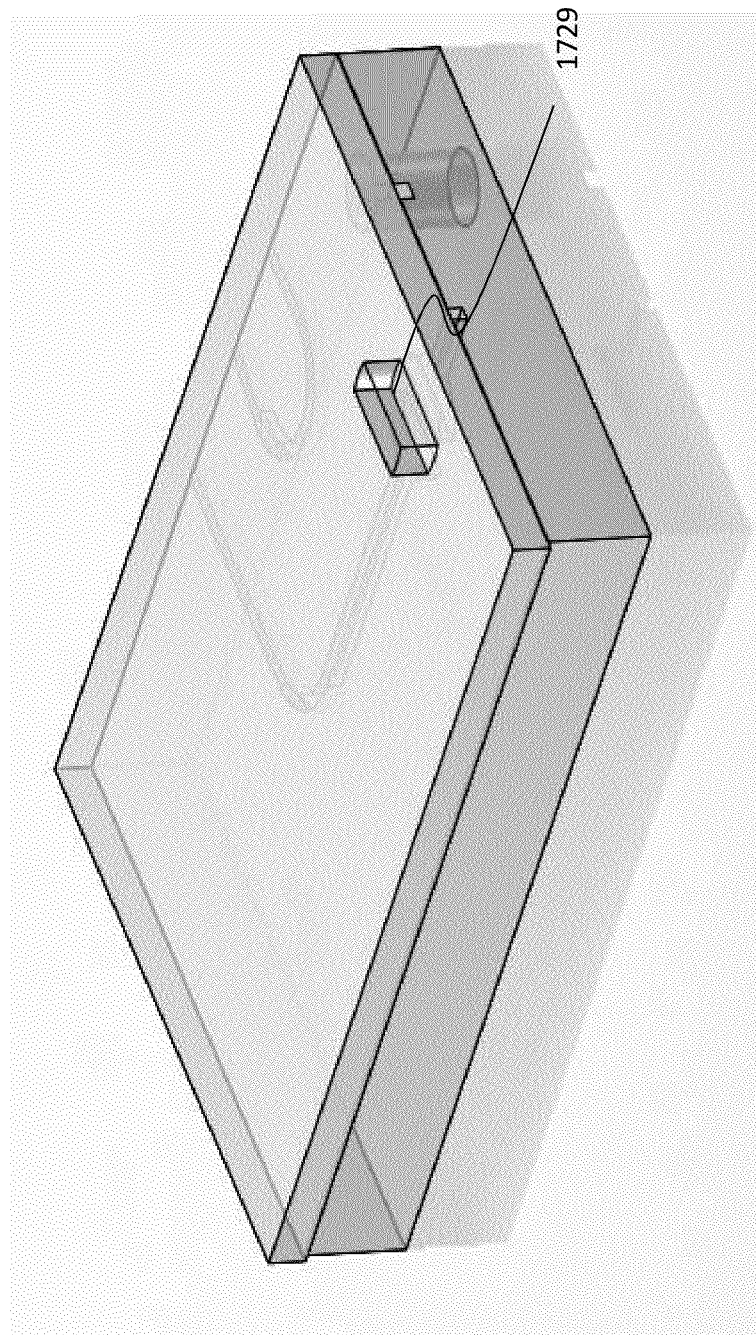
Figure 20B:
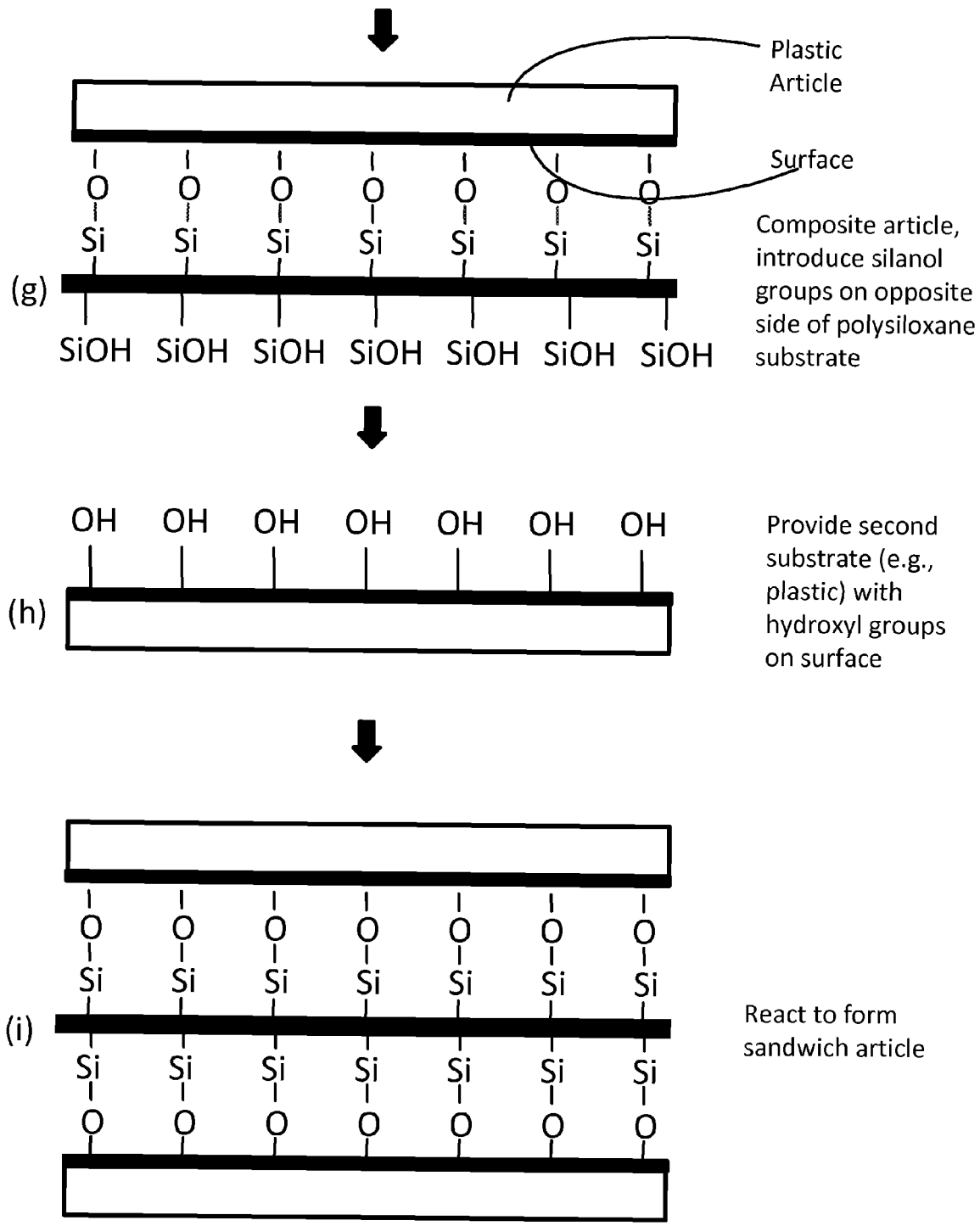
Figure 21:
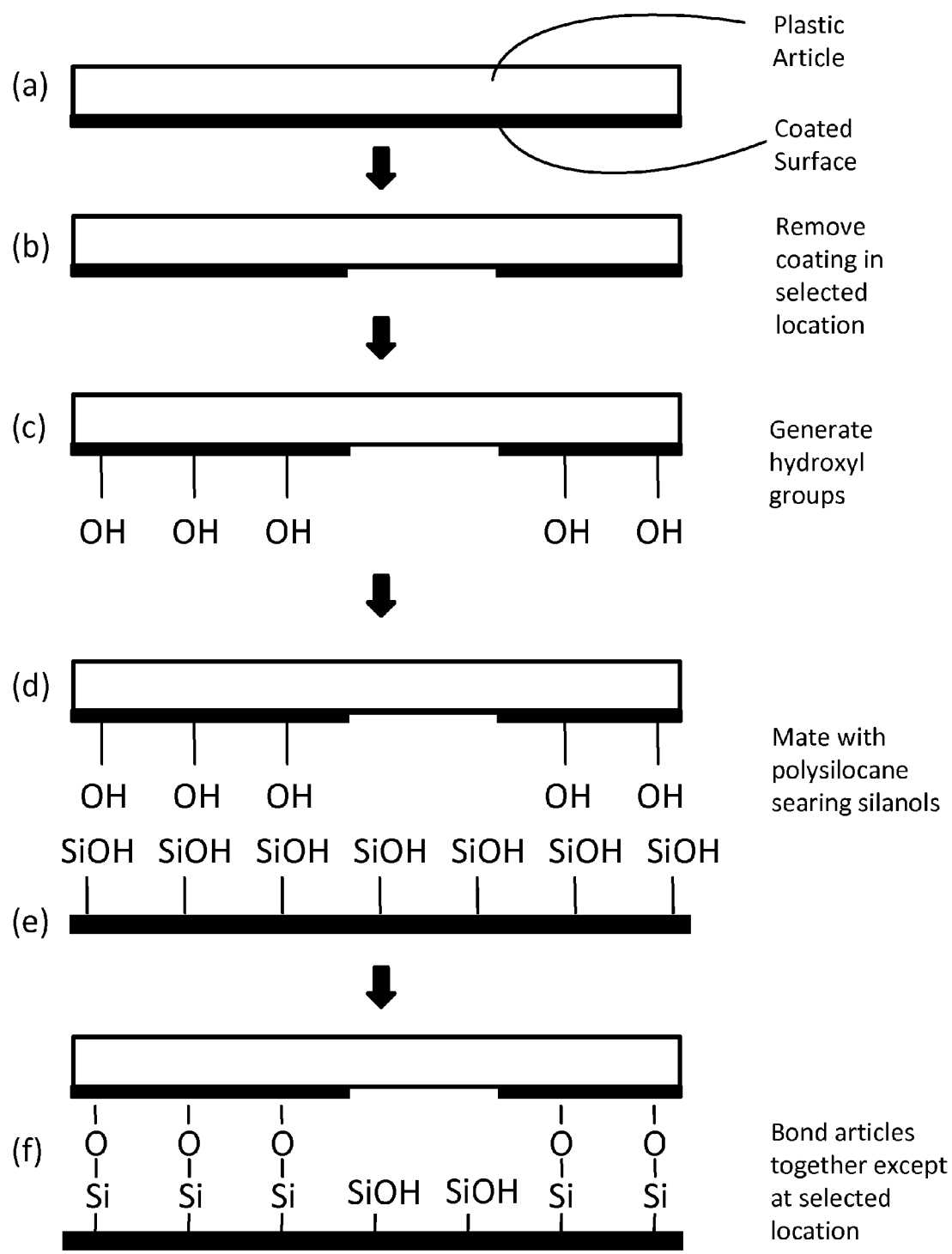
FIG. 21 presents a flow chart of an embodiment of this invention in a coated substrate (a) is treated to remove the coating from a selected location (b). Reactive groups are introduced onto the surface still comprising the coating, in this case, hydroxyls (c). The substrate (d) is mated with a second substrate comprising reactive groups on its surface, in this case, silanol groups (e). After reacting, the two substrates are bonded through siloxy bonds, except at the location at which the reactive groups were removed (f).

One way to neutralize the material at selected locations so that it does not bind to the second substrate is a lift-off process, in which a material is deposited onto the plastic substrate at selected location prior to deposition of the material. Then, after the material is deposited, the material and the material are removed from the selected location. For example, a shadow mask is made of an appropriate material that contains openings in appropriate locations. When the layer is overlaid with the mask and properly aligned, surfaces to be coated are exposed. Examples of masks include glass, metal sheet, foil or semiconductor wafer. An example of a portion of a mask useful for this process is shown in FIGS. 16A and 16B. In this case, via layer 122 has contact surface 106 comprising etched channels, e.g., 124, valve seat 129, fluidic valve body 131 that does not comprise a valve seat and vias, e.g., 126 and 127. Mask 1601 has holes, e.g., 1629, that mate with valve bodies/seats and holes, e.g., 1631, that mate with seatless valve bodies. When mated, as in FIG. 16B, the holes expose functional surfaces that are to be coated with the removable energy material. FIGS. 17A and 17B show a shadow mask comprising a hole that mates with a valve seat, but not a fluidic valve body. In one such method, a negative photoresist, e.g., DNQ, is deposited at selected locations using a patterned mask. The oxide is deposited on the surface. Then, the photoresist is dissolved in a solvent, exposing the plastic surface.

3.1.4.2. Ablation

In another method, oxide is removed from the surface at the selected locations by ablation. Material can be ablated by using laser energy directed to locations at which oxide is to be removed. Also, the power of the laser can be selected to remove portions of the plastic surface, as well, creating, for example, slightly recessed valve seats.

3.1.4.3. Covering the Material

In another embodiment, the ability of the material to bond to the second substrate can be rendered neutral by covering the material at selected locations with another material. The other material can by laid down on selected locations by any appropriate method. These include, for example, chemical vapor deposition, plasma enhanced chemical vapor deposition, and the other methods described above. Typically, where only a portion of a surface is to be coated, substrate is covered with a mask that exposed those areas desired to be coated. Methods and materials for such coating are described in more detail in U.S. provisional application 61/227,186, filed Jul. 21, 2009 (Blaga et al.).

3.2 Second Substrate with Reactive Hydroxyl Groups

The plastic layer comprising a coated surface is bonded to a substrate having a surface with reactive hydroxyl groups. Typically, hydroxyl groups require high temperature conditions for reaction. However, certain hydroxyl groups, such as silanols, react easily with other hydroxyl groups in condensation reactions that produce a silanol bond. Also, when the second substrate is an elastic layer, the elastic nature of the elastic layer allows the layer to conform better to the plastic surface, enhancing bonding.

The substrate can be any on which surface silanols can be introduced. This includes materials coated with silanes. In particular, silicones comprise siloxane groups onto which silanols can be introduced.

In certain embodiments of this invention, the substrate has elastic properties and can function as a diaphragm in diaphragm valves of devices of this invention. In this case, the layer can be referred to as an elastic layer. The elastic layer typically is formed of a substance that can deform when vacuum or pressure is exerted on it and can return to its un-deformed state upon removal of the vacuum or pressure, e.g., an elastomeric material. Because the deformation dimension is measure in less than ten mm, less than one mm, less than 500, or less than 100 µm, the deformation required is lessened and a wide variety of materials may be employed. Generally, the deformable material has a Young's modulus having a range between about 0.001 GPa and 2000 GPa, preferably between about 0.01 GPa and 5 GPa. Examples of deformable materials that comprise silanes include silicones (e.g., polydimethylsiloxane). Typically, the elastic layer is formed of a flat sheet, e.g., a sheet that is not sculpted.

At points where the fluidic channels or actuation channels open onto or are otherwise in contact with the elastic layer, functional devices such as valves can be formed. Such a valve is depicted in cross section in FIGS. 3A and 3B. Both the fluidics layer and the actuation layer can comprise ports that connect channels to the outside surface. Such ports can be adapted to engage fluidics manifolds, e.g., cartridges, or pneumatics manifolds.

3.3. Preparation of the Elastic Layer

To improve the seal between the elastic layer, such as PDMS, and the fluidics and actuation layers, the elastic layer can be subjected to treatments to activate reactive groups on the surface that will bond with reactive groups on the surface of the fluidics and elastic layers, e.g., hydroxyl groups.

For example, in one embodiment, the elastic layer comprises a silicone polymer (polysiloxane), such as poly(dimethylsiloxane) (PDMS). Silicones typically are water repellant due, in part, to an abundance of methyl groups on their surfaces. In order to increase the strength of bonding between polysiloxanes and substrates comprising reactive groups, such as hydroxyls (e.g., glass), the siloxanes can be made more hydrophilic by UV ozone, corona discharge, plasma oxidation, or other methods that places silanol groups (Si—OH) on the surface. When activated PDMS is contacted with glass or other materials comprising active hydroxyl groups and preferably subjected to heat and pressure, a condensation reaction will produce water and covalently bond the two layers through, e.g., siloxane bonds. This produces a strong bond between the surfaces. However, in order for the valves to be functional, the elastic layer cannot bind to the valve seats, and, preferably, does not bind to any surface of the valve or to any channel in the surface of the fluidic or elastic layer that faces the elastic layer. The low energy coating is one embodiment to prevent binding.

3.4. Assembling the Device

The devices of this invention are assembled so that the functional portions, such as valves, pumps, reservoirs and channels, are sealed to prevent leakage of fluids, and the elastic layer does not stick to functional exposed surfaces.

In one method, the layers are sealed by bonded together with covalent or non-covalent bonds (e.g., hydrogen bonds). This can be achieved by mating the layers, e.g., fluidics, elastic and actuation layers, together as a sandwich and applying pressure and heat. For example, when the elastic layer comprises a silicone, such as PDMS treated as above to render the surface more hydrophilic, and the fluidics and actuation layers are coated with a material comprising surface hydroxyl groups, the pieces can be pressed together at a pressure of 100 kg to 500 kg, e.g., about 300 kg. They can be baked between 25° C. and 100° C., e.g., about 90° C. or at about 150° C. for about 5 minutes to about 30 minutes, e.g., about 10 minutes, depending on the combination of temperature and pressure used. This will cure the bonding between the elastic layer and the sealing surfaces. After bonding the layers together, conduits can be flushed with, for example, PEG (e.g., PEG-200) or 1-2 propane diol (Sigma #398039).

3.5. Functional, Exposed Surfaces Comprising Low Surface Energy Materials

Devices of this invention also can be provided that have functional surfaces treated to decrease their surface energy.

Low surface energies decrease sticking of the elastic layer to the fluidics or actuation layer to which it is attached. When the elastic layer is a silicone, such as poly(dimethylsiloxane) (PDMS), the water contact angle of the treated surface should be at least 90°, at least 100° degrees, at least 115°, at least 120° degrees or at least 140° degrees. (See, e.g., U.S. patent application Ser. No. 12/789,186, Blaga et al., filed May 27, 2010.)

Many materials are useful to create low surface energies on exposed surfaces. In one embodiment, the material is a low energy polymer such as a perfluorinated polymer or a poly(p-xylylene) (e.g., parylene). Teflon is a known low surface energy material, which is also inert and biocompatible. The material can be a self-assembled monolayer. Self-assembled monolayers can be made from silanes, including for example, chlorosilanes or from thiol alkanes. They typically have a thickness between about 5 Angstroms and about 200 Angstroms. The low energy material can be a metal (e.g., a noble metal such as gold, silver or platinum). Other materials that can be used to provide low surface energy surfaces include hard diamond, diamond-like carbon (DLC) or a metal oxide (e.g., titania, alumina or a ceramic).

Perfluorinated polymers include, for example, Teflon-like materials deposited from fluorinated gases, PTFE (polytetrafluoroethylene, Teflon®), PFA (perfluoroalkoxy polymer resin), FEP (fluorinated ethylene-propylene), ETFE (poly-ethylenetetrafluoroethylene), PVF (polyvinylfluoride), ECTFE (polyethylenechlorotrifluoroethylene), PVDF (polyvinylidene fluoride) and PCTFE (polychlorotrifluoroethylene). The material can have a thickness of about 100 Angstroms to about 2000 Angstroms.

In one embodiment, the material comprises a noble metal, such as gold. The noble metal can be applied directly to the surface to be coated. Also, the noble metal can be applied to a surface already coated with another material, such as a refractory metal that facilitates adhesion of the noble metal to the surface, as described above. In one embodiment, the material comprises a noble metal, such as gold. The noble metal can be applied directly to the surface to be coated. Also, the noble metal can be applied to a surface already coated with another material, such as a refractory metal that facilitates adhesion of the noble metal to the surface, as described above. Refractory metals include, for example, chromium, titanium, tungsten, molybdenum, niobium, tantalum and rhenium. For example, a 1000 Angstrom layer of chromium can be applied to selective surfaces, followed by a 2000 Angstrom layer of gold. The chromium layer need only be thick enough to allow the gold to adhere, for example, at least 30 Angstroms, at least 50 Angstroms, at least 100 Angstroms, at least 500 Angstroms or at least 1000 Angstroms. The noble metal, also, need only be thick enough to inhibit binding of the elastic layer. For example the noble metal can have a thickness of at least 50 Angstroms, at least 100 Angstroms, at least 500 Angstroms, at least 1000 Angstroms or at least 2000 Angstroms. The metal can be applied by sputtering, evaporation, or atomic layer deposition using a shadow mask that exposes the surfaces to be coated, or by other techniques. Sputtering can use, for example, Rf or DC energy.

3.6. Valve and Compartment Surfaces Coated with Binding Functionalities

Certain functional surfaces in the fluidics layer can be functionalized to have chemical or biochemical binding functionalities attached thereto. These surfaces typically will include functional surfaces of seated or unseated valves. In various embodiments, valve seats and/or functional surfaces that not part of a valve, such as a channel or a chamber in the fluidics layer that does not oppose a chamber in the actuation layer. These materials can selectively or specifically bind analytes. For example, the binding functionality could be a nucleic acid, a metal or metal chelate, a carbohydrate or a protein, such as an antibody or antibody-like molecule, enzymes, biotin, avidin/streptavidin, etc.

These materials can be bound to surfaces, e.g., valve chamber surfaces, by any attachment chemistry known in the art. For example, a surface can be derivatized with a functionalized silane, such as an amino silane or an acryl silane, and the functional group reacted with a reactive group on the molecule comprising the binding functionality.

4. System

A fluidic system can comprise a fluidic assembly and an actuation assembly. The fluidic assembly can comprise (1) the fluidic portion of a microfluidic device that comprises fluidic conduits, (2) a fluidic manifold configured to mate or align with ports on the microfluidic device and to deliver fluid into the fluidic conduits and (3) a fluid delivery assembly, such as a robot, configured to deliver fluids to the fluidic manifold or to the microfluidic conduits directly. The actuation assembly can comprise (1) the actuation portion of a microfluidic device that comprises actuation conduits, (2) an actuation manifold configured to mate or align with ports on the microfluidic device and to deliver actuant into the actuation conduits microfluidic device; and (3) an actuant delivery assembly, configured to deliver fluids to the actuation manifold or to the actuation conduits directly. The actuant delivery assembly can comprise a source of positive or negative pressure and can be connected to the actuation conduits through transmission lines. The instrument can also comprise accessory assemblies. One such assembly is a temperature controller configured to control temperature of a fluid in a fluidic conduit. Another is a source of magnetic force, such as a permanent or electromagnet, configured to apply magnetic force to containers on the instrument that can comprise, for example, particles responsive to magnetic force. Another is an analytic assembly, for example an assembly configured to receive a sample from the fluidic assembly and perform an procedure such as capillary electrophoresis that aids detection of separate species in a sample. Another is a detector, e.g., an optical assembly, to detect analytes in the instrument, for example fluorescent or luminescent species. The instrument also can comprise a control unit configured to automatically operate various assemblies. The control unit can comprise a computer comprising code or logic that operates assemblies by, for example, executing sequences of steps used in procedure for which the instrument is adapted.

5. Methods of Using the Device

A device of this invention can be used to perform reactions on fluidic samples. Typically, it will be part of a system that includes assemblies configured to deliver liquids to the fluidic conduits, a source of positive and/or negative pressure configured to communicate the pressure to the pneumatics conduits and computers comprising logic that directs the introduction of fluids into the device at specific time or in specific sequence and/or that controls the operation of valves in a pre-programmed sequence.

A fluidics robot, such as a Tecan robot, can robotically add fluid to ports in the fluidics layer. The actuation layer can be engaged with a manifold, such as a pneumatic manifold, that mates ports in the pneumatic layer with a source of positive or negative pressure. In certain embodiments, a single pneumatic channel operates valves in a plurality of different fluidic conduits in parallel. Then, by pneumatically actuating the valves in various sequences, liquids can be pumped between chambers. The chambers can be provided with reagents to allow reactions.

In one embodiment, the instrument comprises a computer that can be programmed to introduce the samples and reagents into the isolated region and then move them into a recovery region after the reaction is complete to permit withdrawal of the sample for subsequent analysis. In another embodiment, the microfluidics device can be programmed to move the reacted sample into a reservoir or a fluid zone and add additional reaction reagents and reintroduce the sample into the isolated region for additional reaction. In other embodiments, the microfluidics device can be programmed to move the reacted sample into a reservoir or a fluid zone and add capture reagents and then move the sample into a capture region for the physical separation of analytes of interest; e.g., through the use of a magnetic field to capture magnetic beads coated with binding moieties. In other embodiments, the microfluidics device can be programmed to move the reacted sample into a reservoir or a fluid stream and add detection reagents or moieties and then move the sample into a recovery region to permit withdrawal of the sample for subsequent analysis. A detection device, such as laser induced fluorescence Raman, Plasmon resonance, immunocapture and DNA analysis devices known in the art, can be used to interrogate the sample in a diaphragm valve or within the channel of the shelf region or other part of the microfluidic device. See, e.g., WO 2008/115626 (Jovanovich). A microfluidic device having a monolithic membrane is one example of a particularly suitable device for implementing a detection system on a chip. According to various embodiments, the detection system can also include immunocapture and DNA analysis mechanisms such as polymerase chain reaction (PCR), and capillary electrophoresis (CE) mechanisms.

FIG. 14 shows an example of microfluidic device that can be used to prepare samples for cycle sequencing nucleic acid analysis. In this design, nucleic acid samples introduced into wells 80 can be moved and mixed at diaphragm valve 20 with cycle sequencing reagents and enzymes introduced into well 70 and pumped by actuation of valves 10, 20, 30, and 40 into the serpentine channel 60 of the isolated region. Alternatively, valves 10, 20, 30, and 50 may be used for pumping. The mixing of the reagents and samples can be performed as described herein. Plurality of boluses of reagents and sample can be sequentially and/or alternately moved into a microfluidic channel of the microchip by alternatively using sets of pumping valves to move the reagent (valves 10, 30, and 40) and sets of pumping valves to move the sample (valves 20, 30, and 40). The reagents and samples can be combined in valve 20 and become mixed before reaching valve 40. The mixed reagents and samples can then be pumped into the serpentine channel 60 which is located on an isolated region of the microfluidic device. Because the isolated region is in thermal contact with the thermal regulator, the samples introduced into the reaction region of the shelf can be heated or cooled under controlled conditions selected by the operator. The reagents and sample can undergo thermal conditions for cycle sequencing. In one embodiment, the sample can be introduced through valves into the shelf region and the valves surrounding the chamber, e.g., 40 and 50, can be closed for thermal cycling or other thermally-controlled reaction conditions of the samples by the thermal regulator. The excellent volume-to-surface ratio and approximately 100-fold longer pathlength benefits the sample preparation biochemistry and temperature regulation by the higher volume-to-surface ratio. After cycle sequencing, the samples and/or reaction mixture can be moved to wells 80. Magnetic beads that may have binding moieties can be introduced to well 80 such that the sample and/or reaction mixture are mixed with the magnetic beads. In some embodiments of the invention, the magnetic beads are coated with carboxyl groups and can adsorb nucleic acids. The magnetic beads with adsorbed nucleic acid can then be further moved to a capture region 40, and be captured by application of a magnetic field. The capture of the beads by the magnetic field can be accompanied by a deformation of the capture valve. The magnetic field can be applied by actuation of the magnetic assembly described herein. The capture valve can be deformed such that the chamber size is increased. The increased size of the capture valve can reduce the flow velocity through the chamber. The magnetic beads can be washed while the beads are captured by the magnetic field. The on-chip diaphragm pumps, e.g., 10, 20, 30, and 40 can move the beads, which may be washed with a buffer, with bound purified nucleic acids. The beads can be moved to one of the removal ports 90 or nucleic acids which may have been released by the local application of heat or eluted with water or a buffer can be moved to one of the removal ports 90.

In another embodiment, the device is programmed to integrate multiple steps of reactions for DNA sequencing applications. Common reagent reservoir 70 is loaded with cycle sequencing reagents which are mixed with DNA containing samples loaded into sample reservoirs 80 with the samples being in one embodiment PCR, plasmid, or other nucleic acid amplification products that are to be sequenced. The mixture containing the sample and cycle sequencing reagents can be moved by the programmable fluidics using microvalves to a reaction chamber 60 located on the extended shelf region of the device where cycle sequencing reactions are performed using thermal cycling. The cycle sequencing products can then be moved to Product reservoirs 90 for movement off the device for further processing or in a preferred embodiment the cycle sequencing products are moved to a reservoir and beads such as Agencourt SPRI beads are added to the cycle sequencing products with appropriate chemistry to have the desired cycle sequencing products bound to the beads to separate the products from the salts and unincorporated dye labeled terminators or primers. It is obvious to one skilled in the art that rather than binding the cycle sequencing products to the beads the reverse can be performed where the cycle sequencing products are left in solution and the salts and unincorporated dyes are bound to the beads. The term bead is used without restriction to include particles, paramagnetic particles, nanoparticles, monoliths, gels, gels with affinity capture property or non-specific properties.

If the bead and cycle sequencing products were contained in reservoir 80 the combined mixture is pumped through microvalves 20 and 30 to microvalve 40 which may be opened and have a fixed or movable magnet in proximity. The beads such as SPRI beads which are paramagnetic are captured as the flow slows down in the opened microvalve and the beads are captured in the magnetic field. For example, the valve can be opened and a magnet, such as comprised in magnet assembly of this invention can be moved into a functional position close to the valve so that beads passing into the chamber are captured by the magnetic force exerted by the magnet.

Fluids such as ethanol may be added to reservoirs to then process the beads and remove the undesired impurities such as salts and unincorporated dye labeled reactants. The magnet can then be removed to release the force on the beads. The beads may be then pumped to product reservoirs 90 or the cycle sequencing products can be eluted into water which is then pumped to product reservoirs 90. For cycle sequencing the eluted products are ready to be analyzed on a separate device such as a CAE or microchip with separation. It is obvious to one skilled in the art that the different reservoirs may have other configurations and a single sample can be added to reservoirs 70 and multiple reagents may be added to reservoirs 80 to perform three different reactions on a single sample.

EXAMPLES

Example 1

Bonding PDMS to Plastic with Abrasion Resistant Coating

I. Wafer Manufacture

The substrate material is CYRO® Acrylite AR-1 or AR-2 or acrylic sheet with thickness 3 mm. It was machined down to 1.5 mm for use. This acrylic sheet is coated with an abrasion resistant coating on one side to which laser machining was applied. This side was demonstrated to be able to bond to PDMS. (Acrylite Abrasion Resistant acrylic one-sided sheet Colorless 0A000 MR1 or MR2 from Evonic Industries, at 0.049" thick also bonds to PDMS.)

The laser engraver is Epilog laser Mini 18 which has a 40 watts $CO_2$ laser source. The system is connected to a PC computer as a printer. The pattern or drawing was performed with graphic software CorelDRAW. A printer driver provided by the laser engraver manufacture can set up the laser power and speed of the laser spot as well as the laser mode such as raster or vector. The design of the fluidic and pneumatic layers is depicted in FIG. 19 (Chip A).

Laser power, cutting depth and raster mode versus vector mode are variables in the etching process. The optimized laser power settings were chosen for different designated depth. Each feature on the chip, such as valve, valve seat, channel and chamber or through hole is machined with a different approach. For valve seats, the AR coating need to be removed in order to prevent PDMS from bonding to it so the valve can be opened. The power settings to remove the coating are 50% speed and 8% power in raster mode. 50% speed and 28% of power were used to machine channels, valves and chambers. Through holes were cut with vector mode at 100% power and 15% speed for 3 mm and 30% for 1.5 mm thick substrates.

II. Chip Assembly

Two microstructured plastic parts (fluidic and pneumatic) from the process above were cleaned in an Ultrasonic bath for 20 min. The pieces were rinsed in "Biological" grade water. The pieces were dried with Nitrogen. The fluidic part was exposed to UV Ozone for 3 min (placed the part in UV Ozone tool with channels side towards the UV lamp).

PDMS was exposed to UV Ozone for 3 min. The fluidic part was bonded to the PDMS by contacting the surfaces.

The pneumatic part was exposed to UV Ozone for 3 min (placed the part in UV Ozone tool with channels side towards the UV lamp). PDMS bonded to fluidic part was exposed to UV Ozone for 5 min. The two parts were aligned and bonded together by contacting the surfaces. The bonded parts were placed into a press at 300 Kg pressure for 30 min at 80° C.

III. Chip Testing

The assembled chip was mounted on liquid interface manifold and pneumatic manifold designed for this chip type. A pumping script was written for the computer operating station and water was pumped through the chip. Observation showed that fluid moved through the chip. There was no cross talk of liquid between channels. There was no delamination of the chip. Pumping was even in terms of boluses reaching target points at appropriate times. A circular pumping cycle was set up that pumped liquid from a reservoir, into the chip and back into the reservoir. The chip continued to operate through 5000 pump strokes of water and 5000 pump strokes of ethanol.

Example 2

Titanium Oxide Coating on Zeonor 1440R

I. Wafer Manufacture

Titanium oxide coatings were deposited from aqueous solution as an adhesion promoter on different materials including plastics like polycarbonate. A Tyzor LA solution can be used for a very uniform coating of polycarbonate. A similar solution was used for coating Zeonor 1420R embossed chips.

COP embossed chips: Zeonor 1420R is a cyclo-olefin polymer (COP) with a glass transition temperature around 135° C., produced by Zeonex (www.zeonex.com). The Architecture was that of Chip A.

Tyzor LA: DuPont™ Tyzor® organic titanates and zirconates are adhesion promoters and cross-linkers that are additives for flexographic and gravure printing inks. For flexo and gravure package printing, Tyzor® titanates and zirconates help improve the final product properties. This is achieved by increasing the cross-linking which provides the following benefits: (1) Improved adhesion of the ink to the substrate; (2) Enhanced curing; (3) Improved chemical, solvent, and water resistance; (4) Enhanced heat resistance; (5) Decreased drying times or lower cure temperatures; (6) Increased lamination bond strength.

A 1% Tyzor LA (titanium lactate, DuPont) in 0.1 M HCl solution was prepared just before the coating process and heated to 70° C.

Coating Protocol:
Scrub the embossed chips with detergent, rinse with deionized water and dry
Place the chips for 4 min in the UV ozone oven
Immerse the chips for 5 min in Tysor LA solution at 70° C.
Rinse the chips with deionized
Store the chips in DIW until ready to be assembled II. Chip Assembly Parts are scrubbed with detergent, rinsed and dried. The pneumatic part and PDMS are exposed to UV ozone for 3 minutes. PDMS layer is paced on the pneumatic part. The composite and the fluidic part are exposed to UV ozone for 3 minutes. The fluidic layer is laid on the PDMS and aligned. The pieces are pressed at 300 kg at 80° C. for 30 minutes.

III. Chip Testing

The assembled chip was mounted on a liquid interface manifold and pneumatic manifold designed for this chip type. A pumping script was written for the computer operating station and water was pumped through the chip. Observation showed that fluid moved through the chip. There was no cross talk of liquid between channels. There was no delamination of the chip. Pumping was even in terms of boluses reaching target points at appropriate times. A circular pumping cycle was set up that pumped liquid from a reservoir, into the chip and back into the reservoir. The chip continued to operate through 5000 pump strokes of water and 5000 pump strokes of ethanol.

Example 3

Titanium Oxide Coating on Polycarbonate

An injection molded part of polycarbonate was coated with a 200 Å thick layer of titanium using a Perkin Elmer sputtering system.

In a first step, the polycarbonate substrate was cleaned using an Ar/air sputter etch for 1 minute. In a second step, the surface of the polycarbonate was coated with titanium using sputter deposition in an Ar plasma using a 30% RF setting for 10 minutes. Then, the deposition process was continued for another five minutes in an argon/air mixture to oxidize the titanium surface.

This process also was performed using a COP substrate.

Example 4

Momentive Performance Materials PHC 587 on COC and Polycarbonate

COC and polycarbonate parts were immersed and dip-coated in PHC 587 (a silicone hard coat). The coating is allowed to dry at room temperature for 10 to 20 minutes. The sample is cured in an oven at 125° C. for two hours.

Example 5

Titanium Coated on Chromium Surface

Plastics (e.g., acrylic, polycarbonate and cyclo-olefine polymer (COP)) are first coated with chromium to promote adhesion of titanium to produce hydroxyls for promoting PDMS adhesion. Most inert metals like Cr, Ti develop a thin and dense oxide layer in atmosphere, which is a good bonding material to PDMS.

All plastic parts are cleaned with 50% EtOH and Liquinox 5%. Most plastics absorb water and a dehydration step is needed before the vacuum deposition. Polycarbonate and COP pieces were incubated at 90° C. for 30 minutes just prior to vacuum chamber loading. A sputtering machine is an automated load-lock Perkin Elmer 4400 with four programmed steps:

1. Etch: 0.5 min in 40% Ar and 5% $O_2$, 20% power
2. Deposit: Cr, 1 min, 40% Ar, 30% power
3. Deposit: Ti, 2 min, 40% Ar, 30% power
4. End: unload After the Cr/Ti deposition the plastic chips can be activated with, e.g., UV ozone and bonded with the PDMS membrane.

REFERENCES

U.S. Pat. No. 3,801,852; FUURUCHI et al., Apr. 2, 1974
U.S. Pat. No. 4,029,842; YOSHIDA et al., Jun. 14, 1977
U.S. Pat. No. 4,113,665; LAW et al., Sep. 12, 1978
U.S. Pat. No. 4,364,731; NORLING et al., Dec. 21, 1982
U.S. Pat. No. 4,847,120; GENT; Jul. 11, 1989
U.S. Pat. No. 5,275,645; TERNOIR et al., Jul. 4, 1994
U.S. Pat. No. 5,378,535; MONCUR et al., Jan. 3, 1995
U.S. Pat. No. 6,432,191; SCHUTT; Aug. 13, 2002
U.S. Pat. No. 7,445,926; MATHIES et al., Nov. 4, 2008
U.S. Pat. No. 7,745,207; JOVANOICH et al., Jun. 29, 2010
U.S. Pat. No. 7,766,033; MATHIES et al., Aug. 3, 2010
U.S. Pat. No. 7,799,553; MATHIES et al., Sep. 29, 2010
U.S. Patent Publication 2004/0209354; MATHIES et al., Oct. 21, 2004
U.S. Patent Publication 2006/0073484; MATHIES et al., Apr. 6, 2006
U.S. Patent Publication 2007/0248958; JOVANOVICH et al., Oct. 25, 2007
U.S. Patent Publication 2007/0289941; DAVIES, Dec. 20, 2007
U.S. Patent Publication 2008/0014576; JOVANOVICH et al., Jan. 17, 2008
U.S. Patent Publication 2010/0165784; JOVANOVICH et al., Jul. 1, 2010
PCT Publication WO 2008/115626; JOVANOVICH et al., Sep. 25, 2008
PCT Publication WO 2009/108260; VANGBO et al., Sep. 3, 2009
PCT Publication No. WO2009/015296; MATHIES et al., Jan. 29, 2009
PCT Publication No. WO 2010/042784; LEE et al., Apr. 15, 2010
PCT application PCT/US2010/40490; STERN et al., filed Jun. 29, 2010
3M MSDS for 3m 906 Abrasion Resistant Coating, Sep. 17, 2008
Anderson R C, Su X, Bogdan G J, and J. Fenton. "A miniature integrated device for automated multistep genetic assays." Nucleic Acids Res. 2000 Jun. 15; 28(12):E60
Baskaran, S et al., Titanium Oxide Films on Organic Interfaces through Biomimetic Processing, J. Am. Ceram. Soc, 81 [2] 401-408 (1998)
Chow et al., "Low Temperature Polymer-Based Substrates Bonding Using PDMS for Microfluidic Applications," Asia Pacific Conference of Transducers and Micro-Nano Technology 2004 (APCOT MNT 2004), Jul. 4, 2004.
Lee et al., "Polymer Nanoengineering for Biomedical Applications," Annals Biomed. Engineer., 2006, 34:75-88
Lu et al., Anal. Chem., 2007, 79, 994-1001
Oh et al., "A review of microvalves", J. Micromech. Microeng., 16 (2006) R13-R39
Samel, "Novel Microfluidic Devices Based On A Thermally Responsive PDMS Composite," School of Electrical Engineering, Royal Institute of Technology, Stockholm. Sweden,
Sep. 7, 2007
Willis et al., Lab on a Chip, 2007, 7, 1469-1474
Zhang et al., "PMMA/PDMS valves and pumps for disposable microfluidics," Lab Chip 2009 9:3088 (Aug. 20, 2009)

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A microfluidic device comprising a plurality of diaphragm valves configured to regulate fluid flow along each of a plurality of microfluidic channels and comprised in a combination that comprises a fluidics layer, an actuation layer and an elastic layer sandwiched between the fluidics layer and the actuation layer, wherein each diaphragm valve comprises:
a) a diaphragm comprised in the elastic layer;
b) a valve seat comprised in the fluidics layer and recessed from a surface of the fluidics layer that contacts the elastic layer so that the diaphragm does not close the diaphragm valve unless positive pressure is exerted on the diaphragm; and
c) a valve inlet and a valve outlet comprised in the fluidics layer and in fluid communication with the microfluidic channel;

wherein both of the fluidics layer and the actuation layer comprise a plastic substrate coated with a material covalently bonded to the elastic layer and wherein the fluidics layer and the actuation layer are covalently bonded to the elastic layer through siloxy bonds and wherein the elastic layer is not bonded to all or part of the surface of the valve seat; and wherein the diaphragm is configured to be actuated by positive or negative pressure transmitted to the diaphragm through an actuation conduit in the actuation layer and wherein one actuation conduit is configured to actuate a plurality of diaphragm valves in parallel.

2. The device of claim 1, wherein the valve seat has a concave surface with respect to the surface of the fluidics layer.

3. The device of claim 2, wherein the valve seat has a shape of a dome, a section of a sphere, or an inverted dimple.

4. The device of claim 3, wherein the elastic layer comprises a polysiloxane.

5. The device of claim 2, wherein the concave surface of the valve seat comprises at least one area which has a convex surface and meets the elastic layer when positive pressure is exerted on the diaphragm.

6. The device of claim 5, wherein the concave surface of the valve seat comprising at least one convex area has a shape of a saddle or an inverted dimple comprising an extraverted dimple.

7. The device of claim 1, wherein the actuation layer comprises a chamber which is disposed opposite the valve seat.

8. The device of claim 1, wherein the elastic layer comprises a polysiloxane.

9. The device of claim 8, wherein the polysiloxane is polydimethylsiloxane (PDMS).

10. The device of claim 1, wherein the fluidics layer or the actuation layer, or both, comprise a polymer selected from the group consisting of a carbon-based polymer, a cycloolefin polymer, a cycloolefin copolymer, an olefin copolymer, an acrylic, polymethylmethoxyacrylate (PMMA), a polypropylene, a polystyrene, a polycarbonate, a polythiol, and a liquid crystal polymer.

11. The device of claim 1, wherein the material coating the fluidics layer or the actuation layer comprises an oxide.

12. The device of claim 11, wherein the oxide is silicon oxide.

13. The device of claim 1, wherein the fluidics layer comprises a plurality of sublayers.

14. An instrument comprising the device of claim 1.

15. The instrument of claim 14 wherein the valve seat has a concave surface with respect to the surface of the fluidics layer, wherein the valve seat has a shape of a dome, a section of a sphere, or an inverted dimple.

16. A microfluidic device comprising a pump configured to regulate fluid flow along a microfluidic channel and comprised in a combination that comprises a fluidics layer, an actuation layer and an elastic layer sandwiched between the fluidics layer and the actuation layer, wherein the pump comprises, in series, a first diaphragm valve, a pumping valve, and a second diaphragm valve;

(I) wherein each diaphragm valve comprises:
a) a diaphragm comprised in the elastic layer;
b) a valve seat comprised in the fluidics layer and recessed from a surface of the fluidics layer that contacts the elastic layer so that the diaphragm does not close the diaphragm valve unless positive pressure is exerted on the diaphragm; and
c) a valve inlet and a valve outlet comprised in the fluidics layer and in fluid communication with the microfluidic channel; and (II) wherein the pumping valve comprises:
a) a diaphragm comprised in the elastic layer;
b) a chamber comprised in the actuation layer and in the fluidics layer and recessed from a surface of the fluidics layer that contacts the elastic layer; and
c) a pumping valve inlet and a pumping valve outlet comprised in the fluidics layer and in fluid communication with the microfluidic channel;

wherein deforming the diaphragm of the pumping valve into the actuation chamber creates a volume to accept fluid, and deforming the diaphragm into the fluidics chamber pumps liquid out of the chamber and wherein the pumping valve does not completely block fluid flow in the microfluidic channel; and wherein the diaphragms in the diaphragm valves and the pumping valve are configured to be actuated by positive or negative pressure transmitted to the diaphragm through an actuation conduit in the actuation layer, and wherein both of the fluidics layer and the actuation layer comprises a plastic substrate coated with a material covalently bonded to the elastic layer and wherein the fluidics layer and the actuation layer are covalently bonded to the elastic layer through siloxy bonds and wherein the elastic layer is not bonded to all or part of the surface of the valve seat.

17. The device of claim 16 comprising a plurality of said pumps, wherein a first actuation channel is configured to actuate the first diaphragm valve in each of the pumps in parallel, a second actuation channel is configured to actuate the second diaphragm valve in each of the pumps in parallel, and a third actuation channel is configured to actuate the pumping valve in each of the pumps in parallel.

18. The device of claim 17, wherein both of the fluidics layer and the actuation layer comprises a plastic substrate coated with a material covalently bonded to the elastic layer and wherein the fluidics layer and the actuation layer are covalently bonded to the elastic layer through siloxy bonds and wherein the elastic layer is not bonded to all or part of the surface of the valve seat.

* * * * *